United States Patent
Xu et al.

(10) Patent No.: US 11,581,582 B2
(45) Date of Patent: *Feb. 14, 2023

(54) LIQUID-TYPE ROOM-TEMPERATURE FLUORIDE ION BATTERIES

(71) Applicants: Honda Motor Co., Ltd., Minato-ku (JP); California Institute of Technology, Pasadena, CA (US)

(72) Inventors: Qingmin Xu, Dublin, OH (US); Christopher J. Brooks, Dublin, OH (US); Kaoru Omichi, Tochigi (JP); Ryan K. McKenney, Upper Arlington, OH (US); Simon Jones, Whittier, CA (US); Victoria Davis, Santa Clarita, CA (US); Stephen Munoz, Pasadena, CA (US); Jeongmin Kim, Pasadena, CA (US); Keith Billings, Yorba Linda, CA (US); Thomas Miller, III, South Pasadena, CA (US); Robert H. Grubbs, South Pasadena, CA (US); William Wolf, Pasadena, CA (US); Nam Hawn Chou, Dublin, CA (US)

(73) Assignees: HONDA MOTOR CO., LTD., Tokyo (JP); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/703,654

(22) Filed: Dec. 4, 2019

(65) Prior Publication Data

US 2020/0108229 A1 Apr. 9, 2020

Related U.S. Application Data

(63) Continuation-in-part of application No. 16/702,327, filed on Dec. 3, 2019, which is a continuation-in-part
(Continued)

(51) Int. Cl.
*H01M 10/0569* (2010.01)
*H01M 4/36* (2006.01)
(Continued)

(52) U.S. Cl.
CPC ....... *H01M 10/0569* (2013.01); *H01M 4/366* (2013.01); *H01M 4/38* (2013.01);
(Continued)

(58) Field of Classification Search
None
See application file for complete search history.

(56) References Cited

U.S. PATENT DOCUMENTS 4,052,539 A 10/1977 Shropshire et al.
4,931,172 A 6/1990 Kobos et al.
(Continued)

FOREIGN PATENT DOCUMENTS

CA 2781043 A1 5/2011
CN 101156260 A 4/2008
(Continued)

OTHER PUBLICATIONS

Tanguy, François et al. "Lowering Interfacial Chemical Reactivity Of Oxide Materials For Lithium Batteries. A Molecular Grafting Approach". Journal Of Materials Chemistry, vol. 19, No. 27, 2009, p. 4771. Royal Society Of Chemistry (RSC), https://doi.org/10.1039/b901387c. (Year: 2009).*
(Continued)

*Primary Examiner* — Robert S Carrico
(74) *Attorney, Agent, or Firm* — ArentFox Schiff LLP; Mark Duell

(57) ABSTRACT

The present disclosure relates to fluoride ion batteries and structures of metal based electrode materials for various fluoride ion batteries. The structures of the metal based electrode materials comprise one or more shells or inter-
(Continued)

faces, enabling the electrodes to operate at room temperature with a liquid electrolyte.

**12 Claims, 32 Drawing Sheets
(21 of 32 Drawing Sheet(s) Filed in Color)**

Related U.S. Application Data of application No. 16/445,022, filed on Jun. 18, 2019, which is a continuation-in-part of application No. 16/444,854, filed on Jun. 18, 2019, which is a continuation-in-part of application No. 16/013,739, filed on Jun. 20, 2018, now Pat. No. 11,177,512, and a continuation-in-part of application No. 16/013,739, filed on Jun. 20, 2018, now Pat. No. 11,177,512, which is a continuation-in-part of application No. 15/844,079, filed on Dec. 15, 2017, now Pat. No. 11,251,420, said application No. 16/013,739 is a continuation-in-part of application No. 15/844,079, filed on Dec. 15, 2017, which is a continuation-in-part of application No. 15/228,876, filed on Aug. 4, 2016, now Pat. No. 10,720,666.

(60) Provisional application No. 62/863,114, filed on Jun. 18, 2019, provisional application No. 62/863,114, filed on Jun. 18, 2019, provisional application No. 62/776,978, filed on Dec. 7, 2018, provisional application No. 62/776,978, filed on Dec. 7, 2018, provisional application No. 62/775,748, filed on Dec. 5, 2018, provisional application No. 62/775,748, filed on Dec. 5, 2018, provisional application No. 62/775,690, filed on Dec. 5, 2018, provisional application No. 62/775,690, filed on Dec. 5, 2018, provisional application No. 62/775,748, filed on Dec. 5, 2018, provisional application No. 62/687,653, filed on Jun. 20, 2018, provisional application No. 62/676,693, filed on May 25, 2018, provisional application No. 62/453,295, filed on Feb. 1, 2017, provisional application No. 62/434,611, filed on Dec. 15, 2016, provisional application No. 62/200,998, filed on Aug. 4, 2015.

(51) Int. Cl.
| | | |
|---|---|---|
| *H01M 4/38* | | (2006.01) |
| *H01M 4/58* | | (2010.01) |
| *H01M 10/05* | | (2010.01) |
| *H01M 10/0568* | | (2010.01) |
| *H01M 10/36* | | (2010.01) |

(52) U.S. Cl.
CPC ........... *H01M 4/381* (2013.01); *H01M 4/582* (2013.01); *H01M 10/05* (2013.01); *H01M 10/0568* (2013.01); *H01M 10/36* (2013.01)

(56) References Cited

U.S. PATENT DOCUMENTS

| | | | |
|---|---|---|---|
| 7,007,972 | B1 | 3/2006 | Radhakrishnan et al. |
| 7,722,993 | B2 | 5/2010 | Potanin |
| 9,166,249 | B2 | 10/2015 | Darolles et al. |
| 9,705,124 | B2 | 7/2017 | Walker et al. |
| 2003/0008145 | A1 | 1/2003 | Goldstein |
| 2006/0070491 | A1 | 4/2006 | Yang et al. |
| 2009/0029237 | A1 | 1/2009 | Yazami |
| 2010/0178227 | A1 | 7/2010 | Kim et al. |
| 2010/0285358 | A1 | 11/2010 | Cui et al. |
| 2011/0143219 | A1 | 6/2011 | Weiss et al. |
| 2011/0274832 | A1 | 11/2011 | Dai et al. |
| 2012/0202112 | A1 | 8/2012 | Yushin et al. |
| 2012/0270231 | A1 | 10/2012 | Smith et al. |
| 2013/0078510 | A1 | 3/2013 | Reynolds et al. |
| 2013/0092885 | A1 | 4/2013 | Cho et al. |
| 2013/0115484 | A1 | 5/2013 | Li et al. |
| 2013/0122361 | A1 | 5/2013 | Yazami |
| 2013/0130109 | A1 | 5/2013 | Archer et al. |
| 2013/0133934 | A1 | 5/2013 | Flores et al. |
| 2013/0171060 | A1 | 7/2013 | Vo-Dinh et al. |
| 2013/0189574 | A1 | 7/2013 | Crepel et al. |
| 2013/0196844 | A1 | 8/2013 | Keller et al. |
| 2013/0248775 | A1 | 9/2013 | Kurihara |
| 2013/0288892 | A1 | 10/2013 | Lauterbach et al. |
| 2013/0323595 | A1 | 12/2013 | Sohn et al. |
| 2014/0377457 | A1 | 12/2014 | Liu et al. |
| 2015/0053464 | A1 | 2/2015 | Jeong et al. |
| 2015/0099182 | A1 | 4/2015 | Singh et al. |
| 2015/0118496 | A1 | 4/2015 | Cho et al. |
| 2015/0155546 | A1 | 6/2015 | Yushin et al. |
| 2015/0194661 | A1 | 7/2015 | Ju et al. |
| 2015/0311508 | A1 | 10/2015 | Cairns |
| 2015/0328629 | A1 | 11/2015 | Cho et al. |
| 2016/0017180 | A1 | 1/2016 | Schmidt et al. |
| 2016/0029482 | A1 | 1/2016 | Young et al. |
| 2016/0351896 | A1 | 1/2016 | Yushin et al. |
| 2016/0043384 | A1 | 2/2016 | Zhamu |
| 2017/0062874 | A1 | 3/2017 | Jones et al. |
| 2017/0352921 | A1 | 12/2017 | Nakamoto et al. |
| 2018/0175382 | A1 | 6/2018 | Chou et al. |
| 2018/0214945 | A1 | 8/2018 | Chou et al. |
| 2018/0301764 | A1 | 10/2018 | Chou et al. |

FOREIGN PATENT DOCUMENTS

| | | |
|---|---|---|
| CN | 101341614 A | 1/2009 |
| CN | 101501790 A | 8/2009 |
| CN | 102106025 A | 6/2011 |
| CN | 102612776 A | 7/2012 |
| CN | 102714099 A | 10/2012 |
| CN | 102812586 A | 12/2012 |
| CN | 103087805 A | 5/2013 |
| CN | 104332609 A | 2/2015 |
| CN | 104936728 A | 9/2015 |
| CN | 106063004 A | 10/2016 |
| DE | 10 2014 211 907 A1 | 12/2014 |
| JP | 2007-294196 A | 11/2007 |
| JP | 2010-080221 A | 4/2010 |
| JP | 2015-8136 A | 1/2015 |
| JP | 2016-505704 A | 2/2016 |
| JP | 2016-076499 A | 5/2016 |
| JP | 2018-063905 A | 4/2018 |
| KR | 20160047022 A | 5/2016 |
| WO | WO 2007146453 A2 | 12/2007 |
| WO | WO 2008/048716 A2 | 4/2008 |
| WO | WO 2009/157033 A2 | 12/2009 |
| WO | WO 2010/107720 A2 | 9/2010 |
| WO | WO 2011/063541 A2 | 6/2011 |
| WO | WO 2012/118446 A1 | 9/2012 |
| WO | WO 2014-074405 A1 | 5/2014 |
| WO | WO 2016/047906 A1 | 3/2016 |
| WO | WO 2016/068594 A1 | 5/2016 |
| WO | WO 2017025957 A1 | 2/2017 |
| WO | WO 2019/226663 A1 | 11/2019 |
| WO | WO 2019/246265 A1 | 12/2019 |

OTHER PUBLICATIONS

Assresahegn, Birhanu Desalegn et al. "Advances On The Use Of Diazonium Chemistry For Functionalization Of Materials Used In Energy Storage Systems". Carbon, vol. 92, 2015, pp. 362-381. Elsevier BV, https://doi.org/10.1016/j.carbon.2015.05.030. (Year: 2015).*

B.P. Sobolev et al., "Mechanochemical Synthesis of Nonstoichiometric Fluorite Ca1—xLaxF2+x Nanocrystals from CaF2 and LaF3 Single Crystals" Crystallography Reports, vol. 50, No. 3, pp. 478-485, 2005.

(56) References Cited

OTHER PUBLICATIONS

Charles J. McDonald et al., "Hollow latex particles: synthesis and applications" Advanced in Colloid and Interface Science, vol. 99, pp. 181-213, 2002.
Christene A. Smith et al., "N-Heterocyclic Carbenes in Materials Chemistry", Chem. Rev. 119, 2019 American Chemical Society, pp. 4986-5056, (2019).
David Lou et al., "Hollow Micro-/Nanostructures: Synthesis and Applications", Advanced Materials, vol. 20, pp. 3987-4019, 2008.
David W. Oxtoby et al., "Electrochemistry", Principles of Modern Chemistry, 4th Edition, Saunders College Publishing pp. 401-443, 1999.
F. Gschwind et al., Review: Fluoride ion batteries: Theoretical performance, safety, toxicity, and a combinatorial screening of new electrodes, Journal of Fluorine Chemistry, vol. 182, pp. 76-90, (2016).
Fan Cui et al., "Synthesis of Ultrathin Copper Nanowires Using Tris(trimethylsilyl)silane for High-Performance and Low-Haze Transparent Conductors", American Chemical Society, NANO Letters, DOI:10.1021/acs.nanolett.5b03422, (2015), (6 Pages total).
Hiroyuki Ohno, "Electrochemical Aspects of Ionic Liquids" Wiley-Interscience, New York, 2005.
Hoe Jin Hah et al. "New synthetic route for preparing rattle-type silica particles with metal cores" Chem. Commun., pp. 1012-1013, 2004.
International Search Report and Written Opinion, issued by International Searching Authority in related International Application No. PCT/US2019/037994, dated Sep. 3, 2019, (PCT/ISA/210, PCT/ISA/220 & PCT/ISA/237).
International Search Report and Written Opinion, issued by International Searching Authority in related International Patent Application No. PCT/US2019/033334, dated Aug. 2, 2019, (PCT/ISA/210, PCT/ISA/220 & PCT/ISA/237).
J. McBreen et al., "New approaches to the design of polymer and liquid electrolytes for lithium batteries", Journal of Power Sources, vol. 89, pp. 163-167, 2000.
Lukasz Gorski et al. "Complexes of tetra-tert-butyl-tetraazaporphine with Al(III) and Zr(IV) cations as fluoride selective ionophores" Analytica Chimica Acta 633, pp. 181-187, 2009.
Lukasz Gorski et al., "Fluoride-selective polymeric membrane electrodes based on Zr(IV)-and Al(III)-salen ionophores of various structures", Analytica Chimica Acta 655, pp. 39-46, 2010.
M. Anji Reddy et al., "Batteries based on fluoride shuttle" , Journal of Materials Chemistry, vol. 21, No. 43, pp. 17059-17062, Nov. 21, 2011.
N. I. Sorokin et al., "Nonstoichiometric Fluorides-Solid Electrolytes for Electrochemical Devices: A Review" Crystallography Reports, vol. 52., No. 5., pp. 842-863, 2007.
Nanditha G. Nair et al., "Fluorinated Boroxin-Based Anion Receptors for Lithium Ion Batteries: Fluoride Anion Binding, Ab Initio Calculations, and Ionic Conductivity Studies", The Journal of Physical Chemistry A, vol. 113, pp. 5918-5926, May 2009.
P.J. Gellings et al., "The CRC Handbook of Solid State Electrochemistry", pp. 195-222, 1997.
Perrin Walker et al., "Handbook of Metal Etchants", CRC 1991.
Philippe Cordier et al., "Self-healing and thermoreversible rubber supramolecular assembly", Nature Letters, vol. 451, 2008 Nature Publishing Group, (4 Pages Total), Feb. 21, 2008.
PubChem. Citrate May 27, 2016. Retrieved from Internet: <URL: http://pubchem.ncbi.nlm.nih.gov/compound/citrate>. as viewed on Feb. 6, 2018.
Shinobu Fujihara et al., "Sol-Gel Processing of LaF3 Thin Films" Journal of the Ceramic Society of Japan vol. 106, pp. 124-126, 1998.
Shlomo Magdassi et al., "Copper Nanoparticles for Printed Electronics: Routes Towards Achieving Oxidation Stability" Materials, vol. 3, pp. 4626-4638, 2010.
Stephan Rudiger et al., "The fluorolytic sol-gel route to metal fluorides—a versatile process opening a variety of application fields", Dalton Transactions, No. 9, pp. 1117-1127, 2008.

V. Trnovcova et al., "Fluoride Solid Electrolytes", Russian Journal of Electrochemistry, vol. 45, No. 6, pp. 630-639, 2009.
William C. West et al., "Reversible Intercalation of Fluoride-Anion Receptor Complexes in Graphite", Journal of the Electrochemical Society, vol. 154, pp. A929-A936, 2007.
Written Opinion and International Search Report of related foreign application No. PCT/US2017/066800 dated Mar. 5, 2018.
Benjamin C-K. Tee et al., "An electrically and mechanically self-healing composite with pressure- and fexion-sentitve properties for electronic skin applications", Nature Nanotechnology, vol. 7, 2012 Macmillan Publishers Limited, (8 Pages Total), Dec. 2012.
Michael A. Webb et al., "Systematic Computational and Experimental Investigation of Lithium-Ion Transport Mechanisms in Polyester-Based Polymer Electrolytes", 2015 American Chemical Society, ACS Cent. Sci. 2015, 1, pp. 198-205, (2015).
Michael A. Webb et al., Supporting Information, Chemically Specific Dynamic Bond Percolation Model for Ion Tnansport in Polymer Electrolytes, Macromolecules, 48, 7346 (2015) (12 pages total).
Thomas F. Miller, III, et al., "Designing Polymer Electrolytes for Safe and High Capacity Rechargeable Lithium Batteries", 2017 American Chemical Society, Acc. Chem. Res. 2017, 50, pp. 590-593, (2017).
European Search Report issued by the European Patent Office in corresponding European Patent Application No. 17880278.1, dated May 29, 2020.
Jacobsohn, L.G., et al., "Preparation and Characterization of Rare Earcth Doped Fluoride Nanoparticles", Materials. XP055699488, vol. 3, No. 3, pp. 2053-2068, Mar. 19, 2010.
Lukosi, M., et al., "Recent Advances in Gold-Metal Oxide Core-Shell Nanoparticles: Synthesis, Characterization, and Their Application for Heterogeneous Catalysis", Frontiers of Chemical Science and Engineering, Higher Education Press, Heidelberg. XP035946662, vol. 10, No. 1, pp. 39-56, Jan. 25, 2016.
Bhatia, H. et al., "Conductivity Optimization of Tysonite-type La1—xBaxF3-x Solid Electrolytes for Advanced Fluoride Ion Battery", ACS Applied Materials & Interfaces, vol. 9, issue 28, DOI:10.1021/acsami.7b04936 , pp. 23707-23715, (Jun. 1, 2017).
International Search Report and the Written Opinion issued by the International Searching Authority in corresponding International Patent Application No. PCT/US19/64736, dated Feb. 25, 2020.
International Search Report issued by the International Searching Authority in corresponding International Patent Application No. PCT/US19/64792, dated Mar. 2, 2020.
Kim, H. K. et al., "Reduction ofthe Work Function of Gold by N.Heterocyclic Carbenes", Chemistry of Materials, vol. 29, issue 8, 10.1021/acs.chemmater.6b04213, pp. 3403-3411, (Apr. 12, 2017).
"Lutensol(R) AO types" [online], retrieved from internet: < https://biakhim.com.uatindex.php?option=com_k2&Itemid=1174&id=901_f6cc99717606104a2a bc418ab94cc6b1&lang=ru&task=download &view=item >, pp. 7, especially pp. 2, (Mar. 2014).
Zeb, G. et al., "Surface Treatments for Controlling Solid Electrolyte Interphase Formation on Sn/Graphene Composite Anodes for High-Performance Li-Ion Batteries", Journal of Physical Chemistry C, vol. 121, issue 31, DOI: 10.1021/acs.jpcc.7b02784, pp. 16682-16692 (Jul. 10, 2017).
Communication issued by the Chinese Patent Office related to Chinese Application No. 201780073648.3, dated Mar. 28, 2022.
Li, Ting, et al., "Electrochemical Conversion Reactions and Their Applications for Rechargeable Batteries", Journal of Electrochemistry, vol. 21, No. 2, pp. 115-122, 2015, <http://electrochem.xmu.edu.cn>.
Guerin, Katia, et al., "Core-Shell Ni—NiF2 As Cathode Materials for Secondary Lithium Batteries", The Electrochemical Society, 18th International Meeting on Lithium Batteries, Abstract #221, 2016.
Notice of Reasons for Rejection issued by the Japanese Patent Office related to Japanese Application No. 2019-532014, dated Dec. 7, 2021.
Office Action dated Nov. 29, 2022, issued by the Korean Patent Office in related Korean Application No. 10-2019-7019489.

* cited by examiner

Me = Metal or Metal Alloy Core
Metal Halide or Metal Oxyhalide Shell = CeF3, CeOF, LaF3, and LaOF (illustrative examples)

$MFx + e^- \rightarrow M + xF^-$   $M + xF^- \rightarrow MFx + xe^-$
Valence Change 2~3

SEI formation of silane (FOTS) derivative on the surface of anode

Cu@LaF$_3$    Cu@La$_{0.97}$Ba$_{0.03}$F$_{2.97}$ 5 nm of $La_{1-x}Ba_xF_{3-x}$
or $LaF_3$ shell

LIQUID-TYPE ROOM-TEMPERATURE FLUORIDE ION BATTERIES

CROSS REFERENCE TO RELATED APPLICATIONS

This application is a continuation-in-part of U.S. patent application Ser. No. 15/844,079, filed Dec. 15, 2017, and U.S. patent application Ser. No. 15/844,079 claims priority to U.S. Provisional Patent Application No. 62/453,295, filed Feb. 1, 2017, and U.S. patent application Ser. No. 15/844,079 claims priority to U.S. Provisional Patent Application No. 62/434,611, filed Dec. 15, 2016. This application is a continuation-in-part of U.S. patent application Ser. No. 16/445,022, filed Jun. 18, 2019, and U.S. patent application Ser. No. 16/445,022 claims priority to U.S. Provisional Patent Application No. 62/687,653, filed Jun. 20, 2018, and U.S. patent application Ser. No. 16/445,022 claims priority to U.S. Provisional Patent Application No. 62/775,748, filed Dec. 5, 2018, and U.S. patent application Ser. No. 16/445,022 is a continuation-in-part of U.S. patent application Ser. No. 16/013,739, filed Jun. 20, 2018, and U.S. patent application Ser. No. 16/013,739 claims priory to U.S. Provisional Patent Application No. 62/676,693, filed May 25, 2018, and U.S. patent application Ser. No. 16/013,739 is a continuation-in-part of U.S. patent application Ser. No. 15/844,079, filed Dec. 15, 2017, and U.S. patent application Ser. No. 15/844,079 claims priority to U.S. Provisional Patent Application No. 62/453,295, filed Feb. 1, 2017, and U.S. patent application Ser. No. 15/844,079 claims priority, to U.S. Provisional Patent Application No. 62/434,611, filed Dec. 15, 2016, and U.S. patent application Ser. No. 16/445,022 is a continuation-in-part of U.S. patent application Ser. No. 16/444,854, filed Jun. 18, 2019, and U.S. patent application Ser. No. 16/444,854 claims priority to U.S. Provisional Patent Application No. 62/775,748, filed Dec. 5, 2018. This application is a continuation-in-part of U.S. patent application Ser. No. 16/444,854, filed Jun. 18, 2019, and U.S. patent application Ser. No. 16/444,854 claims priority to U.S. Provisional Patent Application No. 62/775,748, filed Dec. 5, 2018. This application claims priority to U.S. Provisional Patent Application No. 62/775,748, filed Dec. 5, 2018. This application is a continuation-in-part of U.S. patent application Ser. No. 16/013,739, filed Jun. 20, 2018, and U.S. patent application Ser. No. 16/013,739 claims priority to U.S. Provisional Patent Application No. 62/676,693, filed May 25, 2018, and U.S. patent application Ser. No. 16/013,739 is a continuation-in-part of U.S. patent application Ser. No. 15/844,079, filed Dec. 15, 2017, and U.S. patent application Ser. No. 15/844,079 claims priority to U.S. Provisional Patent Application No. 62/453,295, filed Feb. 1, 2017, and U.S. patent application Ser. No. 15/844,079 claims priority to U.S. Provisional Patent Application No. 62/434,611, filed Dec. 15, 2016. This application claims priority to U.S. Provisional Patent Application No. 62/863,114, filed Jun. 18, 2019. This application is a continuation-in-part of U.S. patent application Ser. No. 15/228,876, filed Aug. 4, 2016, and U.S. patent application Ser. No. 15/228,876 claims priority to U.S. Provisional Patent Application No. 62/200,998, filed Aug. 4, 2015. This application is a continuation-in-part of U.S. patent application Ser. No. 16/702,327, filed Dec. 3, 2019, and U.S. patent application Ser. No. 16/702,327 claims priority to U.S. Provisional Application No. 62/776,978, filed Dec. 7, 2018, and U.S. patent application Ser. No. 16/702,327 claims priority to U.S. Provisional Application No. 62/775,690, filed Dec. 5, 2018, and U.S. patent application Ser. No. 16/702,327 claims priority to U.S. Provisional Application No. 62/863,114, filed Jun. 18, 2019. This application claims priority to U.S. Provisional Application No. 62/776,978 filed Dec. 7, 2018. This application claims priority to U.S. Provisional Application No. 62/775,690, filed Dec. 5, 2018. The disclosures of the preceding applications are hereby incorporated in their entirety by reference.

STATEMENT REGARDING FEDERALLY SPONSORED RESEARCH OR DEVELOPMENT

This invention was made with government support under Grant numbers DE-AC05-00OR22725 & DE-AC02-05CH11231 awarded by the US Department of Energy, CHE1335486 awarded by the National Science Foundation, and 80NMO0018D0004 awarded by NASA (JPL). The government has certain rights in the invention.

BACKGROUND

Fluoride ion batteries are a novel and underexplored alternative next generation energy storage technology. The energy densities of fluoride ion batteries can be much higher than lithium ion batteries. Much of the research being conducted is focused on all-solid-state fluoride ion batteries, which may be rechargeable at elevated temperatures to some extent. However, slow reaction kinetics impose significant challenges to all-solid-state fluoride ion batteries. Reaction kinetics are better in liquid type fluoride ion batteries. However, this type of fluoride ion battery still faces many challenges, such as the lack of efficient, rechargeable electrolytes and reversible cathode and anode materials at room temperature. Metal nanoparticles are highly desirable for use in a number of applications including as catalysts and as electrode materials for batteries. However, the use of metal nanoparticles may be limited in fluoride ion batteries due to dissolution of the metal in the liquid electrolyte. Prevention of dissolution may lead to stable, higher energy densities. As energy demands are increasing for electric vehicles, portable electronic devices, and portable energy storage, there is an increasing need for advanced fluoride ion batteries with higher energy densities.

SUMMARY

The present disclosure is directed to fluoride (F) ion batteries and F shuttle batteries that can comprise an anode comprising a rare-earth metal or an alkaline earth metal (or a mixture of metals) with a solid electrolyte interphase layer, a cathode comprising a transition metal and one or more shell (or layer) structures, and a liquid fluoride battery electrolyte. The solid electrolyte interphase (SEI) layer on an anode can comprise a fluorinated compound. In some embodiments, the SEI layer can comprise a chemical compound that is stable on the surface of an anode, for example, a reaction derivative formed between a diazonium salt/saline and a surface of an anode. The present disclosure is also related to coatings, layers, or shells utilized with a cathode comprising a core structure. As used herein, a cathode core is not limited in form and encompasses structures including, but not limited to, nanoparticles, nanotubes, nanowires, frames, flakes, nanoporous materials, sheets, thin films, and foams. In some embodiments, one or more dimensions of a cathode core material can be determined either by electron conductivity or F— ion mobility. In a non-limiting example, 20 nm may be a distance limit of F— ion penetration in the core material. In some embodiments, the fluoride ion batteries disclosed herein can be F shuttle batteries with multi-electron transfer (FIG. 1A, FIG. 2). The electrode layers, shells, or coatings disclosed herein can prevent dissolution of core metal or material in anodes and cathodes in liquid electrolyte fluoride ion batteries or/and expand negative potentials of electrolytes while enabling efficient charge/discharge at room temperature. The present disclosure is also directed to specialized methods of making fluoride ion batteries and the various components therein.

BRIEF DESCRIPTION OF THE DRAWINGS

This patent or application file contains at least one drawing executed in color. Copies of the patent or patent application publication with color drawing(s) will be provided by the Office upon request and payment of the necessary fee.

(FIG. 9A) FH grafted calcium anode in $NpMe_3NF$-BTFE electrolyte; and (FIG. 9B) FOTS grafted calcium anode in $Et_3MeN.BF_4$-BTFE electrolyte.

FIG. 10A shows XPS spectra of FH SEI grafted on calcium anode; FIG. 10B shows XPS spectra of FOTS SEI grafted on calcium anode; FIG. 10C shows ratios (F/Ca) between fluorine in SEI layer and calcium active surface material for FH and for FOTS.

DETAILED DESCRIPTION

The present disclosure is directed to fluoride ion batteries and components of fluoride ion batteries. Various aspects of the durability and efficiency of the components of a fluoride ion battery while utilizing a liquid, non-aqueous fluoride electrolyte are disclosed herein to enable a room-temperature, rechargeable fluoride ion battery.

Fluoride ion batteries and F shuttle batteries can provide higher energy density than lithium ion batteries (FIG. 1), but due, for example, to the high energy density and ionic strength of a liquid fluoride electrolyte, metal electrodes in fluoride (F) ion batteries and F shuttle batteries may readily dissolve in the liquid electrolyte. Electrode structures comprising a metal material core and a protective shell (or layers) made from ionic conductors have been investigated to protect the metal material from dissolution. In the present disclosure, protective shell or layer materials are provided that can protect the electrode core material from dissolution, while providing electrode functionality, for example charge/discharge at room temperature.

Figure 1A:
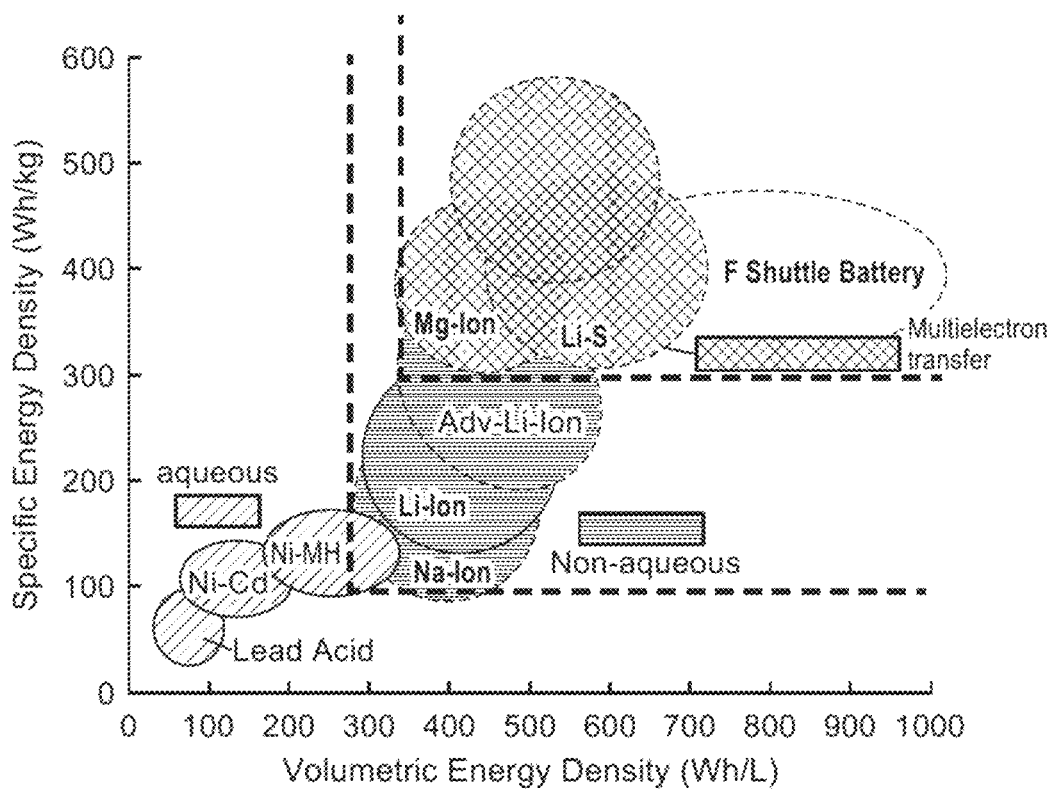
FIG. 1A depicts energy densities of various types of batteries.
Figure 1B:
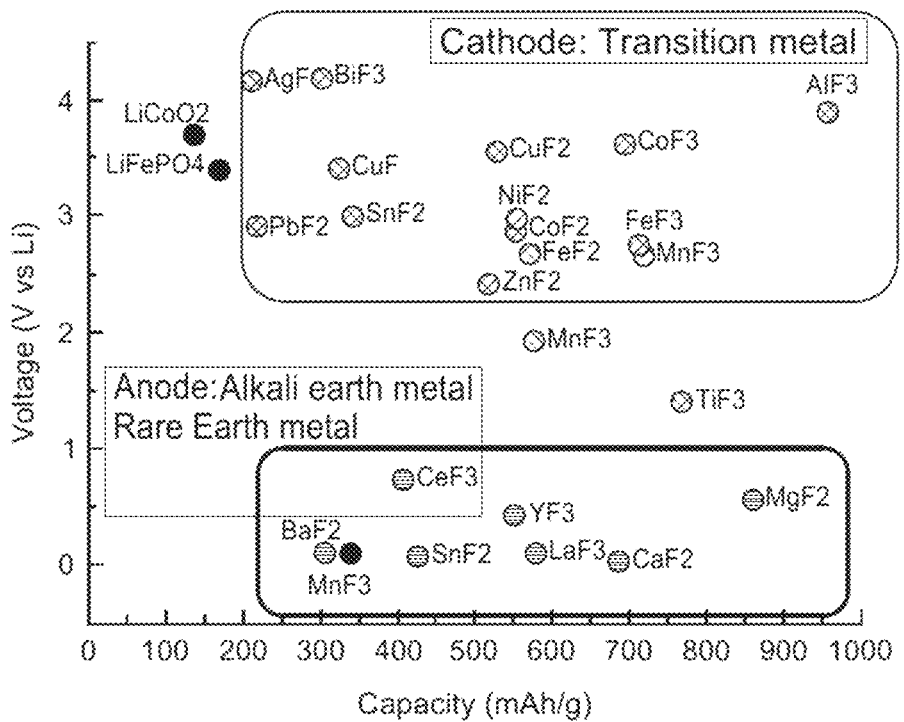
FIG. 1B depicts examples of suitable anode and cathode metals.
Figure 3:
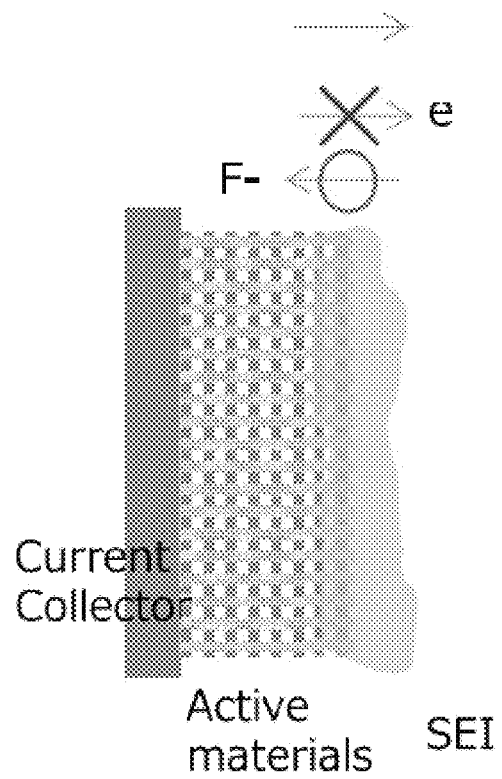
FIG. 3 is a non-limiting schematic illustrating a solid-electrolyte interphase (SEI) layer that allows passage of ions but not passage of electrons, while being stable on the surface of active materials, anode, or a current collector, according to some aspects of the present disclosure.

According to some aspects, anodes for fluoride ion batteries are disclosed herein, the anodes comprising a solid-electrolyte interphase layer on an alkali earth metal or rare earth metal anode. It should be understood that the anode metal or material may comprise an alloy or other suitable materials. FIG. 1B illustrates examples of various anode metals and materials. According to some aspects of the present disclosure, the anodes disclosed herein comprise an outer layer of a solid-electrolyte interphase (SEI), which provides for expanding negative potentials of electrolytes or/and preventing dissolution of the anode metal to realize reversilibity of the anode while enabling transfer of F— from the electrolyte to the anode (FIG. 3). Suitable compounds and methods for formation of an SEI are disclosed herein.

Figure 4:
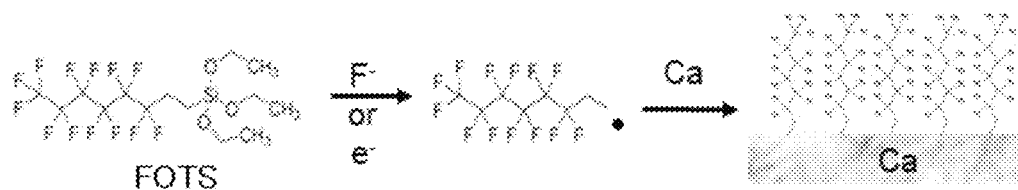
FIG. 4 illustrates a reaction (radical) mechanism of silane (FOTS) with the surface of an anode in SEI (solid-electrolyte interphase formation), according to some aspects of the present disclosure.
Figure 5:
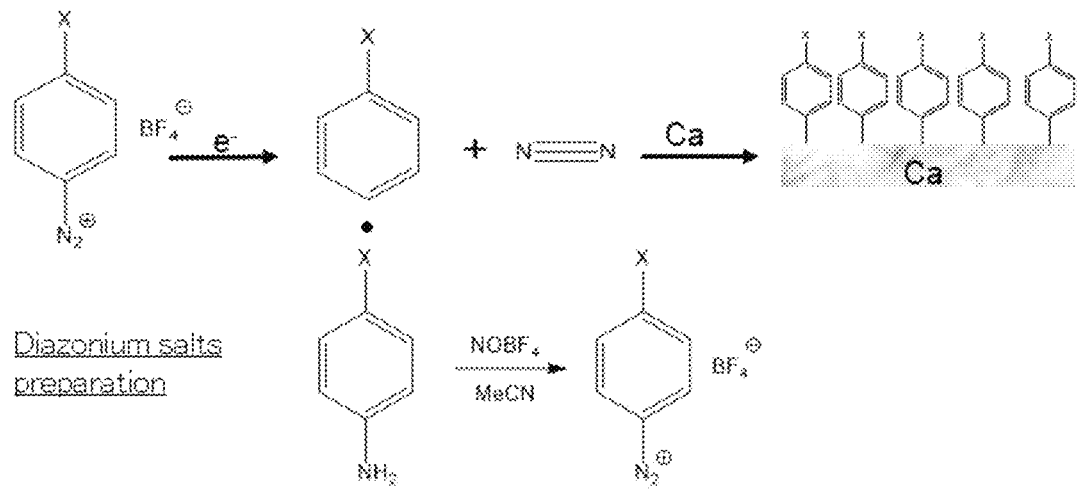
FIG. 5 illustrates a reaction (radical) mechanism of diazonium salts with the surface of an anode in SEI (solid-electrolyte interphase formation), according to some aspects of the present disclosure.

According to some aspects, the outer SEI layer is covalently attached to the anode metal. Non-limiting examples of SEI attachment are illustrated in FIG. 4 and in FIG. 5. The outer solid electrolyte interphase layer can comprise $CF_3(CF_2)_5CH_2$, $CF_3(CF_2)_2CH_2$, para-tert-butylphenyl, para-methoxyphenyl, para-(dimethylamino) phenyl, para-nitrophenyl, para-trifluoromethylphenyl, or combinations thereof. In some embodiments, the outer solid electrolyte interphase layer comprises 1H, 1H, 2H, 2H-perfluorooctyltriethoxysilane; 3, 3, 4, 4, 5, 5, 6, 6, 6-nonafluorohex-1-ene (FIG. 4); 4-tert-butylbenzene diazonium salt; 4-methoxybenzene diazonium salt; 4-(dimethylamino)benzene diazonium salt; 4-nitrobenzene diazonium salt; 4-trifluoromethylbenzene diazonium salt, or combinations thereof as is shown in FIG. 5. In some embodiments, the outer solid electrolyte interphase layer can be a film on the anode, and can comprise 4-tert-butylbenzenediazonium salt; 4-methoxybenzene diazonium salt; 4-(dimethylamino)benzene diazonium salt; 4-nitrobenzene diazonium salt; 4-trifluoromethyl benzene diazonium salt, or combinations thereof further containing a salt counter anion comprising $BF_4(-)$.

According to some aspects, methods of solid-electrolyte interphase formation are disclosed herein. A method of making an anode with an SEI layer suitable for a fluoride ion battery can comprise coating a working electrode by: providing a liquid electrolyte comprising an additive; providing a working electrode comprising an alkali earth metal, a rare earth metal, or combinations thereof in contact with the electrolyte; providing a counter electrode in contact with the electrolyte; and varying the voltage potential between the working electrode and the counter electrode between a first potential and a second potential for a number of cycles until the additive forms an outer solid electrolyte interphase layer on the working electrode, with the second voltage potential being higher than the first voltage potential. In some embodiments, the working electrode can comprise calcium, cerium, lanthanum, or combinations thereof.

In some embodiments, the first potential can be about −0.8V and the second potential can be about +0.7 V vs $Li^+/Li$, potential range may vary depending of working electrode and addtives used, the number of cycles can be up to five, and the additive can comprise 1H, 1H, 2H, 2H-perfluorooctyltriethoxy-silane (FOTS); 3, 3, 4, 4, 5, 5, 6, 6, 6-nonafluorohex-1-ene (FH), or combinations thereof.

In some embodiments, the first potential can be about −1.0V and the second potential can be about +0.8 V vs $Li^+/Li$, potential range may vary depending of working electrode and additives used, the number of cycles can be up to 20, and the additive can comprise 4-tert-butylbenzene diazonium salt; 4-methoxybenzene diazonium salt; 4-(dimethylamino) benzene diazonium salt; 4-nitrobenzene diazonium salt; 4-trifluoromethylbenzene diazonium salt, or combinations thereof.

Figure 9A:
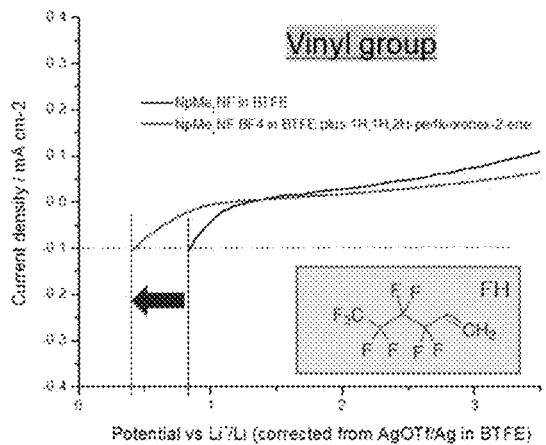
FIG. 9A and FIG. 9B outline exemplary improvements of negative potentials of additive grafted calcium anode in BTFE based electrolyte determined by linear sweep voltammograms (LSV)
Figure 9B:
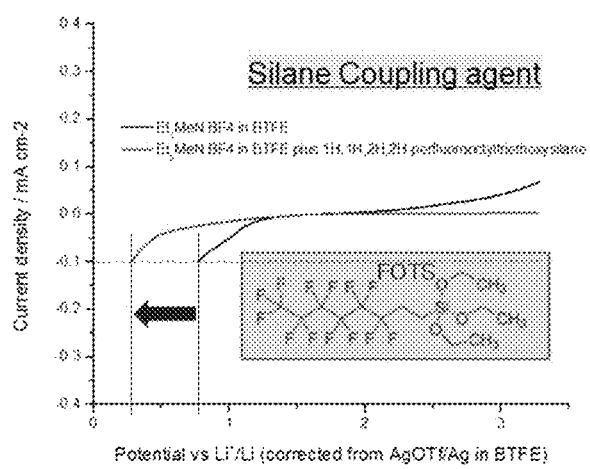

The anodes and SEI layer disclosed herein can enable improved potentials. FIG. 9A and FIG. 9B outline exemplary improvements of negative potentials of additive grafted calcium anode in BTFE based electrolyte determined by CV analysis: (FIG. 9A) FH grafted calcium anode in $NpMe_3NF$-BTFE electrolyte; and (FIG. 9B) FOTS grafted calcium anode in $Et_3MeN.BF_4$-BTFE electrolyte.

Figure 6:
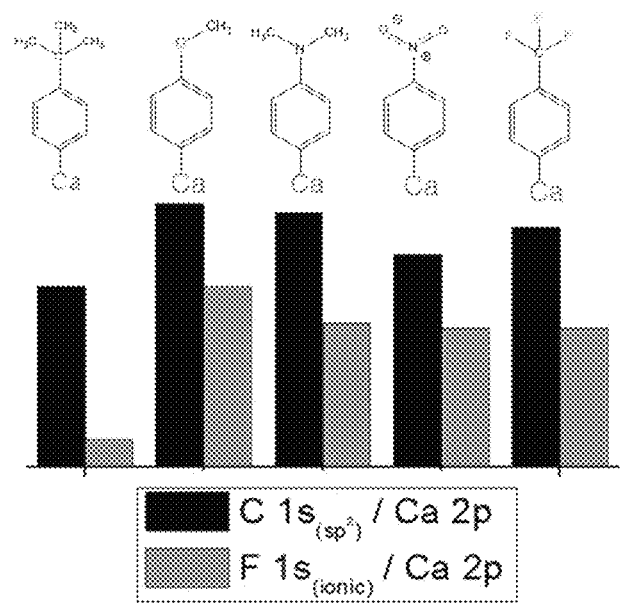
FIG. 6 outlines ratios between carbon atoms in a phenyl ring of diazonium molecules and calcium atoms from an electrode (i.e. C/Ca ratio) and ratios between fluoride ions in diazonium salt and calcium atom from an electrode (i.e. F/Ca ratio) according to some aspects of the present disclosure.

According to some aspects, the present disclosure is directed to a specialized anode for fluoride ion batteries comprising a metal (e.g., Ce, La, and Ca) as active anode material with a solid electrolyte interphase (SEI) layer on a surface of the anode. In some embodiments, the SEI layer can comprise a fluorinated compound. According to some aspects, as illustrated in FIG. 6, the layer on the surface of the anode can have various properties dependent upon properties of the compounds within the layer. In some embodiments, the SEI layer can comprise a chemical compound that is stable on the surface of the anode, for example, a reaction forming a covalent between a diazonium salt and a surface of the anode (FIG. 5), the diazonium salt having the structure of formula I:

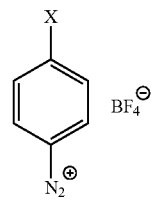

Formula I wherein X can be, for example, $-C(CH_3)_3$, $-OCH_3$, $-NMe_2$, $-NO_2$, or $-CF_3$.

Figure 10A:
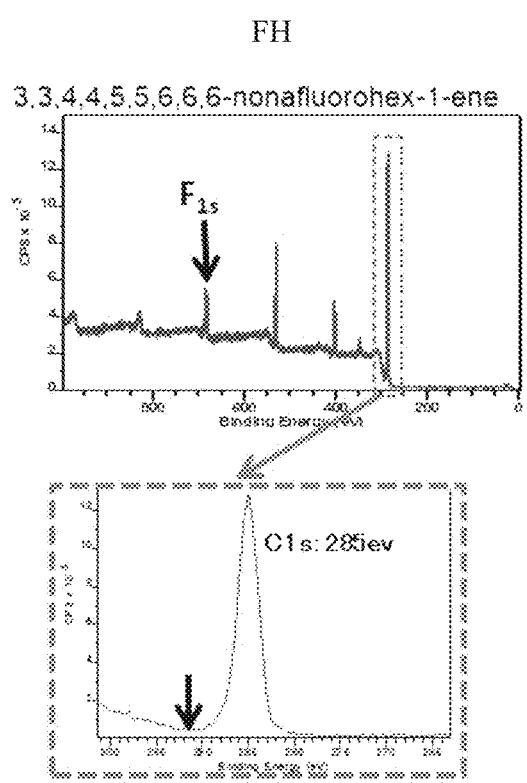
FIGS. 10A, 10B, and 10C outline exemplary XPS studies of FH SEI and FOTS SEI grafted on the surface of calcium anodes.
Figure 10B:
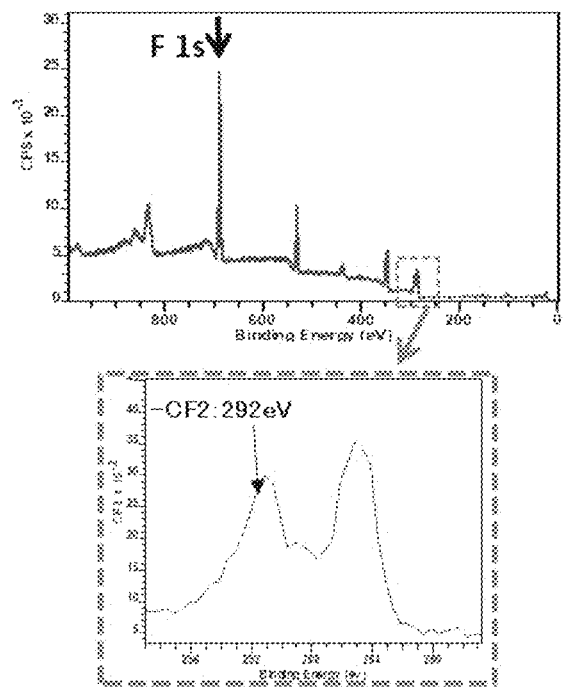
Figure 10C:
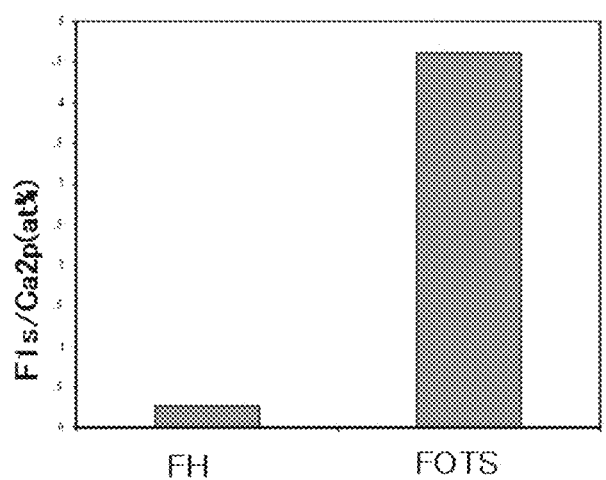
Figure 10D:
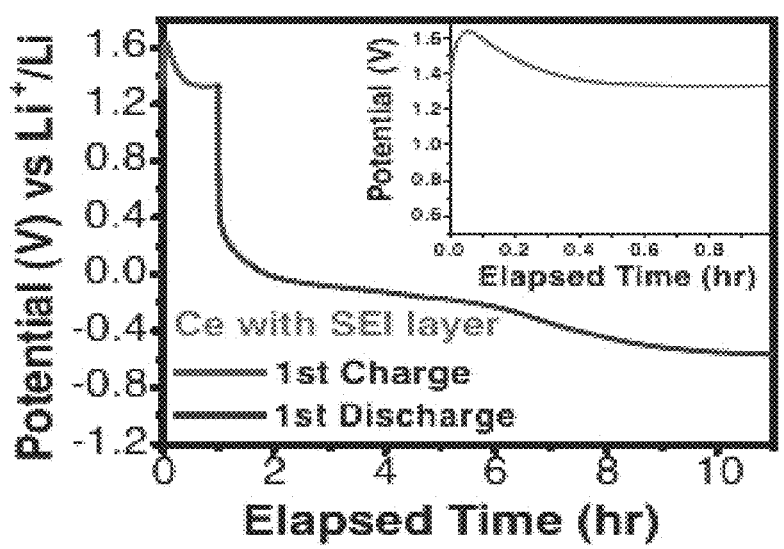
FIG. 10D shows fluorination/defluorination of a cerium (Ce) anode having an FOTS SEI layer.
Figure 10E:
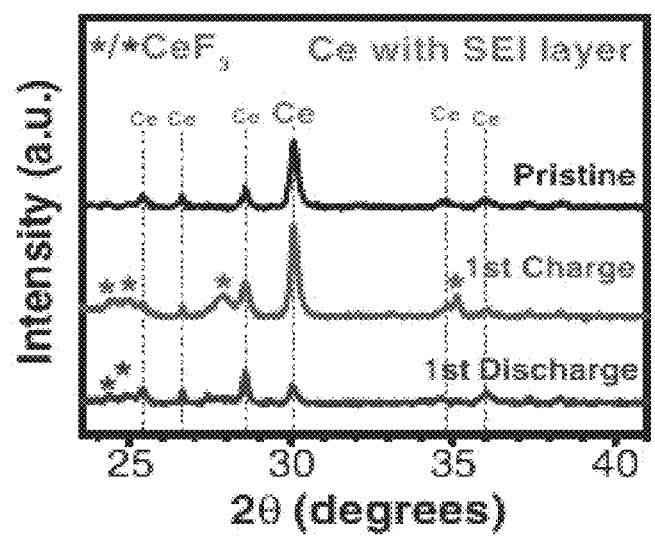
FIG. 10E shows pXRD patterns corresponding to pristine Ce, a Ce anode having an FOTS SEI layer after fluortination (charge), and the fluorinated Ce anode after delfuorination (discharge).
Figure 11:
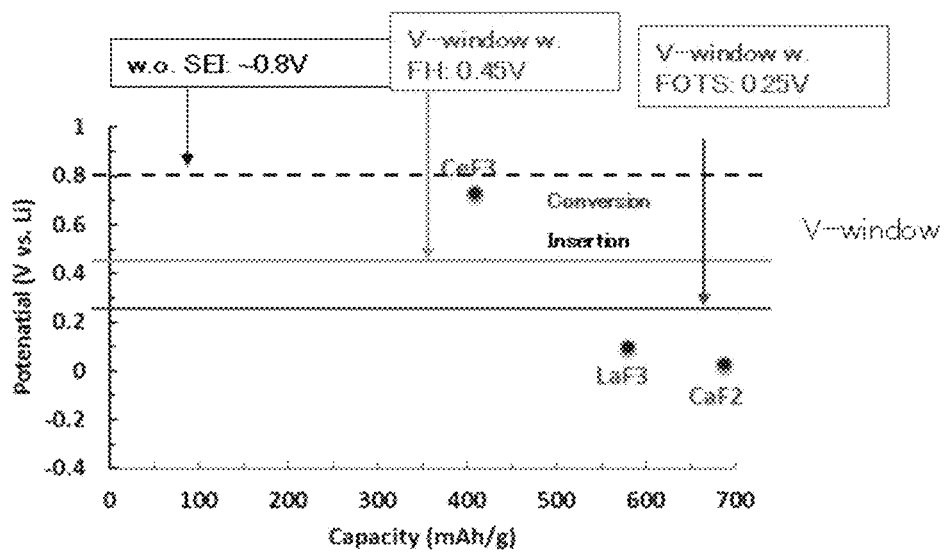
FIG. 11 outlines an exemplary reduction of anodic potential (V-windows expansion) caused by SEI layers and anodic potential of several non-limiting anode materials according to some aspects of the present disclosure.

Formation of the solid electrolyte interphase (SEI) layer can enable a durable anode for a fluoride ion battery. FIGS. 10A, 10B, and 10C outline exemplary XPS studies of FH SEI and FOTS SEI grafted on the surface of calcium anodes: FIG. 10A shows XPS spectra of FH SEI grafted on calcium anode; FIG. 10B shows XPS spectra of FOTS SEI grafted on calcium anode; FIG. 10C shows ratios (F/Ca) between fluorine in SEI layer and calcium active surface material for FH and for FOTS. In another example, FIG. 10D shows fluorination/defluorination of a cerium (Ce) anode having an FOTS SEI layer. FIG. 10E shows an XRD pattern corresponding to pristine Ce, a Ce anode having an FOTS SEI layer after fluortination (charge), and the fluorinated Ce anode after delfuorination (discharge).

In various embodiments, the anodes disclosed herein can be combined with the cathodes disclosed herein and a liquid electrolyte.

The SEI layer can be formed by any method known in the art, and the examples provided herein are non-limiting. In some embodiments, a reaction mechanism comprising one or more radicals can be utilized to provide the SEI layer. According to some aspects, vapor deposition of an SEI layer can be utilized.

Figure 7:
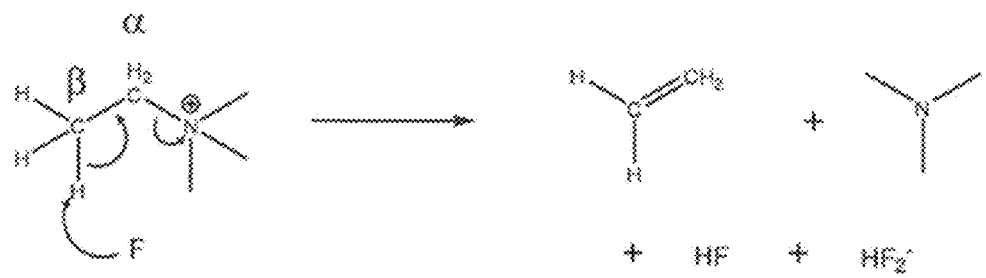
FIG. 7 is an illustration of decomposition of a tetraalkylammonium fluoride salt under drying conditions to form HF and $HF_2^-$.

Liquid electrolytes in fluoride ion batteries (with fluoride ions in solution) offer faster kinetics and can offer recharge at room temperatures, but the high reactivity of fluoride ions can cause short battery life (e.g.; dissolution of electrodes). Aqueous solutions containing fluoride anion ($F^-$), for electrolytes, show fast reactions of the fluoride ion with water, forming hydrofluoric acid (HF) and the complex ion $HF_2^-$ (FIG. 7). Formation of HF is highly corrosive and extremely toxic. Further, $HF_2^-$ is much less active than F— in electrochemical applications and, in extreme cases, may even be inactive. $HF_2^-$ is also undesirable because it will evolve $H_2$ at potentials below the cathodic reaction of interest, limiting the useful voltage window in electrochemical applications and potentially causing a failure of the battery comprising the electrolyte.

The use of non-aqueous $F^-$ electrolyte solutions can solve many problems associated with aqueous $F^-$ solutions. However, non-aqueous $F^-$ solutions have proven difficult to prepare with concentrations high enough to be useful (e.g., greater than or equal to 0.05 M). According to some aspects of the present disclosure, liquid electrolytes suitable for a fluoride ion battery (FIB) can include a fluoride salt and a non-aqueous solvent in which the fluoride salt is at least partially present in a dissolved state. The fluoride salt can be a metal fluoride or a non-metal fluoride. The solvent can be an organic liquid or an ionic liquid, or a mixture of the two. In some embodiments, electrolytes suitable for a FIB can include a composite electrolyte containing fluoride salt, a polymer and optionally an organic liquid, an ionic liquid, or a mixture of the two.

Metal fluoride electrolyte salts are typically insoluble in organics at concentrations >0.05 M. Organic fluoride electrolyte salts, like those with tetraalkylammonium ($R_4N^+$) cations could have improved solubility; however, these are non-trivial to synthesize in truly anhydrous form as decomposition of $F^-$ to $HF_2^-$ occurs readily through elimination processes at elevated temperatures. Neopentyl-substituted (Np, or 2,2-dimethylpropyl-) alkylammonium salts, as the Np chain is both branched (to improve solubility) and lacks β-hydrogens (to inhibit decomposition upon drying) were tested in organic solvents for application (e.g., solubility, durability) in fluoride ion batteries. After initial screening, for example, dry N,N,N-trimethyl-N-neopentylammonium fluoride ($Np_1F$) and N,N-dimethyl-N,N-dineopentylammonium fluoride ($Np_2F$) were synthesized in up to 100 g-batches using an HF-titration procedure and both demonstrated applicability to FIB compared to tetramethylammonium fluoride (TMAF).

Figure 8:
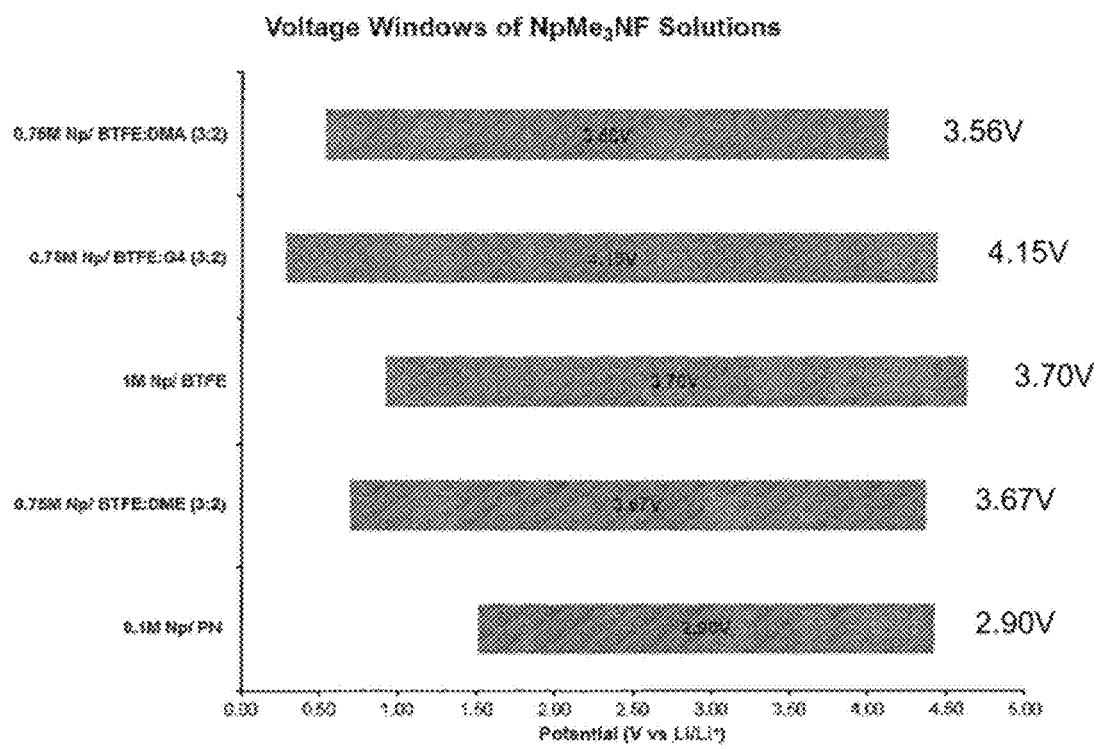
FIG. 8 is a bar graph of voltage windows measured from linear sweep voltammograms for non-limiting examples of electrolyte solutions of the present disclosure.

Various organic solvents provided different levels of electrolyte longevity. For example, BTFE (2,2,2-trifluoroethyl sulfone, bis(2,2,2-trifluoroethyl)ether) was found to provide suitable voltage windows (FIG. 8) and longevity of the electrolyte.

According to some aspects of the present disclosure, a liquid electrolyte for a FIB can comprise bis(2-methoxyethyl) ether, bis(2,2,2-trifluoroethyl) ether, N,N,N-trimethyl-N-neopentylammonium fluoride, N,N-dimethyl-N,N-dineopentylammonium fluoride, propionitrile, or combinations thereof. With a suitable electrolyte, further durable components for a room-temperature rechargeable FIB are disclosed herein, for example, due to the high energy density and high reactive potential of a FIB (FIG. 1A).

Figure 12A:
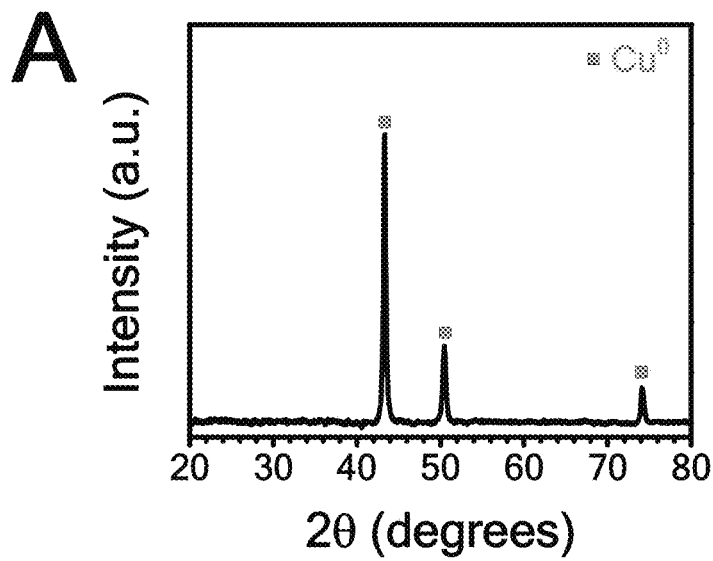
FIG. 12A shows pXRD characterization of pristine powder for synthesized copper nanoparticles. In the (Al $K_\alpha$) spectra of copper nanoparticles, characteristic peaks for metallic copper (peaks labeled with squares) are depicted.
Figure 12B:
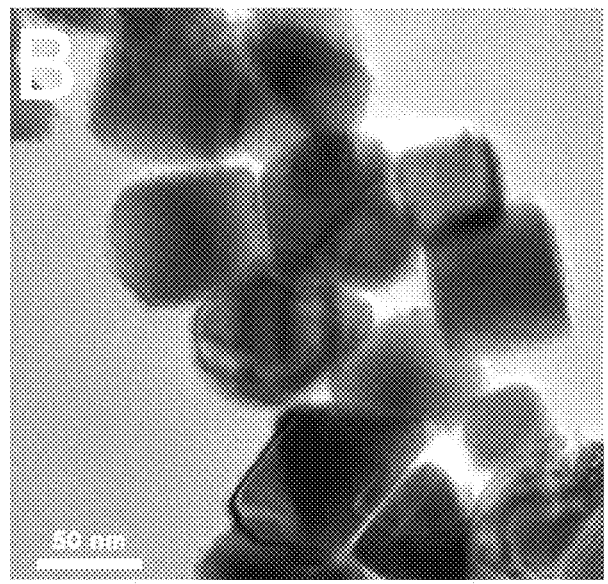
FIG. 12B shows a TEM image of synthesized copper nanoparticles (~50 nm diameter).
Figure 12C:
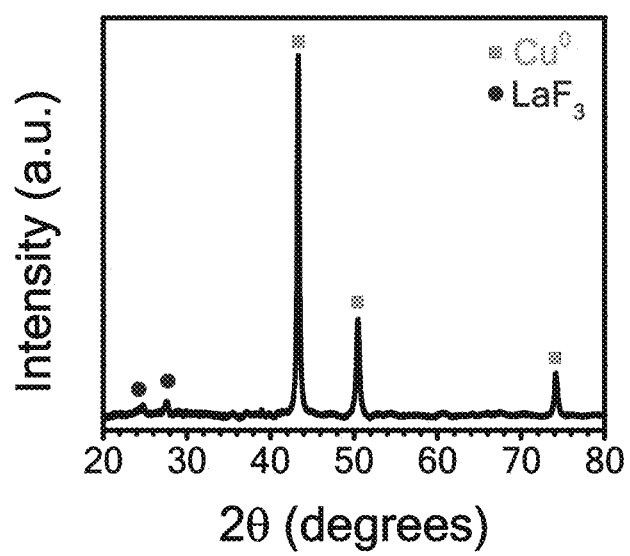
FIG. 12C shows pXRD characterization of pristine powder for the as-synthesized core@shell nanoparticles ($Cu@LaF_3$). Characteristic peaks for metallic copper (labeled with squares) and lanthanum trifluoride (labeled with circles) are depicted.

In some embodiments, cathode structures for fluoride ion batteries are disclosed herein. According to some aspects, a cathode transition metal or an electrochemically active material, as illustrated in FIG. 1B, further comprises one or more shells or layers. The cathode transition metal can have some dimensions on the nanometer scale to improve, for example, efficiency and charge transfer. In some embodiments, the cathode can contain a core-shell structure having a transition metal core and one or more shells at least partially surrounding the transition metal core, the outermost layer of the shell(s) in contact with a liquid electrolyte. A non-limiting example of a suitable copper core particle is shown in FIG. 12B, which is a TEM image of synthesized copper nanoparticles. According to some aspects, the cathode core structure or core may have a selected shape. For example, the core may comprise a nanoparticle (e.g., a spherical nanoparticle), nanocube, nanotube, nanowire, frame, flake, nanoporous sheet, thin film, foam, or a combination thereof. According to some aspects, the size of the core may be determined either by electron conductivity or $F^-$ ion mobility. In an illustrative example, 20 nm may be the distance limit of $F^-$ ion penetration in the core material. If the path of either an electron or $F^-$ ion is greater than this distance limit (in this example, 20 nm), electron conductivity and/or $F^-$ ion mobility will be reduced or prevented. As such, according to some aspects, the core may comprise at least one dimension that is less than or equal to about the distance limit. For example, the core may comprise a spherical nanoparticle having a diameter of less than or equal to about the distance limit, as such a spherical nanoparticle will provide a pathway for an electron or $F^-$ ion that is less than or equal to about the distance limit in all directions. It should be understood that the core may have one or more dimensions that are greater than about the distance limit so long as it has a pathway of about the distance limit or less in at least one direction. For example, the core may comprise a sheet having dimensions in the X and Y directions of greater than about the distance limit and a dimension in the Z direction of less than or equal to about the distance limit (e.g., a wire in FIG. 21). According to some aspects, the distance limit may be about 20 nm, optionally about 30 nm, optionally about 40 nm, and optionally about 50 nm. According to some aspects, the distance limit may be between about 20 and 80 nm, optionally between about 30 and 70 nm, and optionally between about 40 and 60 nm. According to some aspects, the distance limit corresponds at least in part to certain aspects of the core material, for example, and its shell. In particular, a shell having a relatively low ionic resistance will provide for a longer distance limit as F— ions are more easily able to traverse the shell to the core. A shell comprising a small thickness, for example less than 1 nm, can provide for a longer distance limit as F— ions are more easily able to traverse the shell to the core.

Examples of core structures (or cathode core particles) useful according to the present disclosure include, but are not limited to, a nanoparticle with a diameter of less than or equal to about the distance limit (FIG. 16), a nanowire with at least one dimension of less than or equal to about the distance limit (FIG. 21), a nanotube having a wall thickness of less than or equal to about the distance limit (FIG. 31), a flake (e.g., a triangle, rectangle, square, sheet, circle, or oval) having a thickness of less than or equal to about the distance limit (FIG. 32), a film having a thickness of less than or equal to about the distance limit, a foam having a pore wall thickness of less than or equal to about the distance limit, a sheet having a thickness of less than or equal to about the distance limit, a frame having a thickness of less than or equal to about the distance limit (FIG. 33), a mesh having a wire thickness of less than or equal to about the distance limit, and combinations thereof.

The electrochemically active cathode structure or core further comprises a shell that at least partially surrounds the core. For example, the shell may surround the core such that at least about 50% of the core's surface area is covered by the shell, optionally at least about 60%, optionally at least about 70%, optionally at least about 80%, optionally at least about 90%, optionally at least about 95%, and optionally at least about 100%. According to some aspects, the molecular coverage of the shell on the core may be between about 1 and 100 $nm^{-2}$, optionally between about 6 and 60 $nm^{-2}$. The molecular coverage can, for example, increase if the size of the core increases. In some embodiments, the shell can comprise self-healing or self-fixing, flexible properties as will be disclosed herein.

In some embodiments, the shell at least partially surrounding the core includes a thickness, wherein the ratio of thickness between the thickness of the metal nanostructure (cathode) core, at the thinnest dimension, and the thickness of the shell layer is from about 10:1 to about 1:1, optionally from about 9:1 to about 2:1, optionally from about 8:1 to about 3:1, optionally from about 7:1 to about 4:1, and optionally from about 6:1 to about 5:1.

According to some aspects, the shell at least partially surrounding the core has a thickness about 1 nm to 1 micron, optionally no more than 500 nm, optionally no more than 200 nm, optionally no more than 100 nm, optionally no more than 50 nm, no more than 10 nm, optionally about no more than 9 nm, optionally about no more than 8 nm, optionally about no more than 7 nm, optionally about no more than 6 nm, optionally about no more than 5 nm, optionally about no more than 4 nm, optionally about no more than 3 nm, optionally about no more than 2 nm, and optionally about no more than 1 nm. Further wherein all ranges can optionally be described as about 1-500 nm, 1-200 nm, 1-100 nm, 1-50 nm, 1-10 nm, 1-5 nm, and 1-2 nm.

According to some aspects, the shell may comprise a shell material that is compatible with a liquid type F-shuttle battery or fluoride ion battery. For example, the shell material may be selected such that dissolution of the cathode core material into the liquid electrolyte of the liquid type F-shuttle battery during charge and/or discharge may be reduced or eliminated. The shell material may be selected to further provide adequate charge time. As used herein, the term "charge time" refers to the length of time required for a discharged liquid type F-shuttle battery electrode to fully charge, that is, the length of time required for $F^-$ in the fluoride conducting electrolyte to travel from the anode to the cathode during the charge of the battery. According to some aspects, the charge time may be between about 1 and 20 minutes, optionally been about 1 and 10 minutes, and optionally between about 3 and 5 minutes. However, the charge time is not limited and can, for example, depend upon temperature and battery capacity.

According to some aspects, methods of making a cathode for a fluoride ion battery are disclosed herein, an example method comprising providing a solid transition metal and treating the solid transition metal with lanthanum and fluorine to form a $LaF_3$ shell at least partially surrounding the solid transition metal. As non-limiting examples, the solid transition metal can comprise bismuth, lead, copper, or combinations thereof. The treating can comprise dispersing the solid transition metal in an aqueous solution of hydrazine hydrate and contacting the solid transition metal with an aqueous solution of lanthanum ions and fluoride ions. The aqueous solution of lanthanum ions and fluoride ions can comprise lanthanum nitrate hexahydrate and sodium fluoride. In some embodiments, the treating can comprise radio frequency sputtering of $LaF_3$ onto a solid transition metal. In some embodiments, the transition metal cathode core can comprise a transition metal and the shell can comprise $LaF_3$.

According to some aspects, the shell material may comprise a "soft shell" material. As used herein, "soft" refers to a material as described herein, and in particular, a material that includes at least one material capable of self-assembly as described herein. Examples of soft shell materials include, but are not limited to, surfactants, certain polymers, a non-surfactant molecule having one or more specific functional groups, and combinations thereof. According to some aspects, the shell material may comprise an organic material, and in particular, an organic material that includes at least one material capable of self-assembly as described herein. Examples of organic shell materials include, but are not limited to, organic soft shell materials such as organic surfactants, organic or organic molecule-containing polymers, non-surfactant organic molecules having one or more specific functional groups, and combinations thereof.

According to some aspects, the specific functional groups as described herein may be selected from the group consisting of —COOH, —NH$_2$, —COH, —OH, —SH, —PO$_3$H, —SO3H, —CN, —NC, —R$_2$P, —COO$^-$, —COO—OOCR, ene-diol, —C≡N, —N≡N$^+$(BF$_4^-$), —Sac, —SR, —SSR, —CSSH, —S$_2$O$_3^-$ Na$^+$, —SeH, —SeSeR, —R$_2$P═O, —PO$_3^{2-}$/—P(O)(OH)$_2$, —PO$_4^{2-}$, —N≡C, —HC═CH$_2$, —C≡CH, —SiH$_3$, —SiCl$_3$, —OCH$_2$CH$_3$, formula (I), formula (II), formula (III), and combinations thereof, wherein formula (I) is:

formula (II) is:

and formula (III) is:

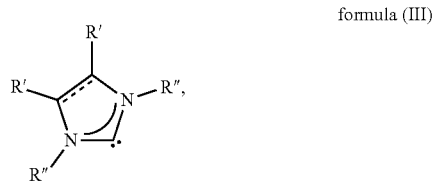

wherein R' and R" are each independently an organic chain, particularly an organic chain capable of being partially or fully fluorinated, or an aromatic group, either alone or in combination with another R' or R", particularly an aromatic group substituted with one or more fluorophilic groups. Example organic chains useful for R' and R" include, but are not limited to, —(CF$_2$)$_n$CF$_3$, (CH$_2$CF$_2$)nCF$_3$, and (CF$_2$CH$_2$O)$_n$CF$_3$. Examples of functional groups according to formula (III) having at least one aromatic group are shown below as formula (IV):

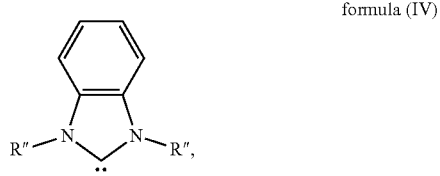

and as formula (V):

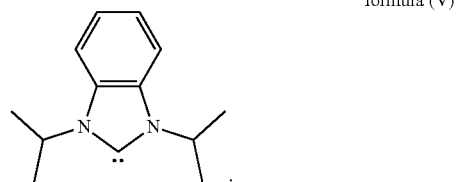

formula (V)

It should be understood that each R' and R" may be the same as another R' or R", or may be different. According to some aspects, each R' may show acceptable fluorination characteristics and/or each R" may show acceptable stabilization characteristics. It should further be understood that the carbon atom having the unshared valence electrons in the carbene shown in formula (III) may be configured for attachment to one or more molecules comprised by the core, as described herein.

According to some aspects, the surfactant may comprise a surfactant useful for preparing the core as described herein, such as a surfactant having one or more functional groups selected from the group consisting of a polar head (e.g., a polar head comprising one or more of the specific functional groups as described herein), a carbon-containing tail (e.g., alkanes, alkynes, alkenes, and aromatic rings), a fluorocarbon-containing tail (e.g., aliphatic chains such as $(CF_2)_n$, $(CHF)_n$, $(CH_2CF_2)_n$, and $(CH_2OCH_2CF_2)_n$, and/or aromatic groups such as $(C_{6-x}F_x-)_n$), and combinations thereof. Examples of surfactants useful according to the present disclosure may include, but are not limited to, oleylamine, oleic acid, tris(trimethylsilyl)silane, 3, 3, 4, 4, 5, 5, 6, 6, 7, 7, 8, 8, 9, 9, 10, 10, 10-heptadecafluorodecanethiol, 2-(trifluoromethoxy)-benzenethiol, P-[12-(2, 3, 4, 5, 6-pentafluorophenoxy)dodecyl]-Phosphonic acid, P-(3, 3, 4, 4, 5, 5, 6, 6, 7, 7, 8, 8, 9, 9, 10, 10, 10-heptadecafluorodecyl)-Phosphonic acid, pentafluoro benzylphosphonic acid, perfluorododecanoic acid and combinations thereof.

According to some aspects, the certain polymers may comprise polymers capable of being formed via in-situ polymerization, particularly polymers capable of being formed via in-situ polymerization from their monomers or from shorter oligomeric species. Additionally or alternatively, the certain polymers may be capable of self-healing through hydrogen bonding. For example, the certain polymers may be capable of hydrogen bonding so as to autonomously and repeatedly "self-heal" imperfections in the shell, such as cracks and/or gaps that may result at least in part from volume expansion and/or contraction of the core during charge and discharge, as illustrated in Table 1 (below) and in FIG. 38. Examples of such polymers include, but are not limited to, polyvinylpyrrolidone (PVP), poly(methyl methacrylate) (PMMA), amino-terminated, and C=O bond included cross linked polymers.

According to some aspects, the shell may comprise one or more monolayers. According to some aspects, the shell may comprise one, two, three, or more monolayers. According to some aspects, each of the monolayers may be the same or different.

According to some aspects of the present disclosure, the shell material may comprise inorganic materials, such as metal salts. Examples of the metal salts used to form the shell include alkali metal salts, alkaline earth metal salts, group three elements, group thirteen elements, lanthanides, actinides, and transition metal salts. As used herein, "group three elements" refers to the group consisting of scandium (Sc), yttrium (Y), and lanthanide and actinide series elements. As used herein, "group thirteen elements" refers to the group consisting of boron (B), alimunium (Al), gallium (Ga), indium (In), and thallium (Tl). In certain embodiments, the metal salt used to form the shell includes lanthanum salts, cerium salts, and magnesium salts. In certain embodiments, the metal salt used to form the shell is selected from the group consisting of lanthanum salts and cerium salts. In certain embodiments, the metal salt is a lanthanum salt. In a preferred embodiment, the lanthanum salt is lanthanum nitrate. In some embodiments, the halide salt is sodium fluoride. In a non-limiting example, the shell comprises a metal fluoride or metal oxyfluoride containing material (i.e. $CeF_3$, CeOF, LaOF, $LaF_3$). In some embodiments, the shell of the core-shell nanoparticles may be formed by mixing isolated metal nanoparticles used to form the core with, for example, a metal salt solution and a halide salt solution that react to form the metal halide shell on the core. In some preferred embodiments, the metal salt solution can comprise barium nitrate and lanthanum nitrate in a ratio of about 1:10.

In some embodiments, a core-shell nanoparticle can be provided that comprises a metal core that is surrounded by a metal halide or a metal oxyhalide shell. A halide shell is provided that is tailored to protect the metal core nanoparticle from the environment of the electrode while maintaining the desired performance of the metal nanoparticle. In a non-limiting example, the core may comprise copper metal and the shell may comprise $LaF_3$. In another non-limiting example, the core may comprise copper metal, and the shell may comprise $Ba_xLa_{1-x}F_{3-x}$. In some embodiments, X can be from about 0 to 0.5, optionally X can be 0.03.

Useful protective coatings for a cathode structure include fluoride-ion conducting phases that are chemically and electrochemically stable in the presence of a liquid FIB electrolyte. Such phases permit the exchange of F— between the electrolyte and the active material. These comprise, for example, crystalline phases such as $LaF_3$, $CaF_2$, $SnF_2$, $PbF_2$, $PbSnF_4$, analogous doped and/or solid solution phases (e.g. $La_{0.9}Ba_{0.1}F_{2.9}$, $Ca_{0.8}Y_{0.2}F_{2.2}$, $Ca_{0.5}Ba_{0.5}F_2$, and $Pb_{0.75}Bi_{0.25}F_{2.25}$), glassy phases such as $35InF_3 \cdot 30SnF_2 \cdot 35PbF_2$, and mixed fluoride/other anion phases such as LaOF. Any material or phase that permits the exchange of F— between the electrolyte and the active material, with bulk ionic conductivity above 10-10 S/cm at 298K is within the scope of the present disclosure. These phases are chosen with constituents selected to be electrochemically stable at the potentials required for reaction of the species contained within the coatings by considering the standard redox potentials of the shell constituents and the inner species available in standard texts.

Alternative protective coatings include polymers that are conducting for fluoride ions, for example boronate-functionalized polymers, alkylammonium-functionalized polymers, or those featuring suitable functional groups.

The thickness of the protective coating is chosen so that exchange of F— between the electrolyte and the active material occurs on a timescale such that charge/discharge of the electrochemical cell can be achieved at suitable rates of operation around 298K (e.g C-rate, corresponding to full charge or discharge of the energy stored in the electrochemical cell in one hour), and will depend on the ionic conductivity of the coating material or phase. For example, a coating of $LaF_3$ or $Ba_xLa_{1-x}F_{3-x}$, is most usefully between 1-200 nm thick, such as between about 5 nm and about 20 nm thick, or any integer or subrange in between. More generally, the coating thickness can be from about 1 nm to about 1 µm.

The electrode coatings disclosed herein can be made by any suitable methods. These may include solution chemistry techniques such as the formation of the coating by precipitation of a solid from a solution containing the fluoride or its constituent precursors, sol-gel or other soft chemistry or "chimie douce" methods, hydrothermal synthesis, vacuum methods such as chemical vapor deposition, physical vapor deposition, sputtering, laser ablation and molecular beam epitaxy, electrochemical deposition, or fluorination of a material after deposition by reaction with a fluorine source. For example, one preferred method for the preparation of a $LaF_3$ coating is a sol-gel synthesis. The coating as prepared may, optionally, be subjected to elevated temperature either in air or inert gas such as Ar for an annealing step, as desired. For example, a $LaF_3$ coating prepared by the sol-gel method may be heated to 500° C. in air to anneal the coating and assist with removal of impurities such as solvent. In this manner, fluoride-conducting coating phases may be synthesized as desired by adjusting the precursor materials, their stoichiometric ratios, and the post-initial reaction annealing step. This sol-gel synthesis of the $LaF_3$ coating may also modified to prepare a coating of $Ba_xLa_{1-x}F_{3-x}$. In some embodiments, a sol-gel approach can be used to make a $La_2O_3$ coating, followed by post-fluorination using $F_2$ or HF to convert a substantial portion of this oxide to LaOF and/or $LaF_3$.

In another example, the $LaF_3$ coating can be obtained from precipitation, by slowly adding $NH_4F$ into $La(NO_3)_3$ aqueous solution with nanoparticles of the core material suspended therein. Since $LaF_3$ is extremely insoluble in water, its crystallization will start on the surface of the suspended nanoparticles. The precipitation synthesis of the $LaF_3$ coating may also be modified to prepare a coating of $Ba_xLa_{1-x}F_{3-x}$.

Fluoride-conducting encapsulants and/or coating phases and materials may be prepared on a three-dimensional structure (e.g. a metal or metal fluoride nanoparticle, or aggregate of nanoparticles), a two-dimensional structure (e.g. a metal or metal fluoride thin film), or a one-dimensional structure (e.g. a fiber or tube of metal or metal fluoride) as required. Similarly, fluoride-conducting phases may be prepared on the external and/or internal surfaces of complex micro- or mesoporous structures such as a zeolite or highly ordered templated material. This can include, but is not limited to mesoporous silicas such as MCM-41 or SBA-15, or metal-organic frameworks or similar coordination polymers.

A non-limiting example of a method of making a suitable core-shell nanoparticle may comprise providing a first mixture comprising a metal nanoparticle and a reducing agent, and mixing the first mixture with a solution comprising one or more metal salts and a halide salt to form a metal halide or oxyhalide shell on the metal nanoparticles. In a non-limiting example, the solution comprises a metal salt and a halide salt. In another non-limiting example, the solution comprises two metal salts and a halide salt. In some such examples, one of the two metal salts is a barium salt. In other such examples, the two metal salts comprise a barium salt and a lanthanum salt. Another example method of making a core-shell nanoparticle or nanostructure may comprise sputter coating. In some embodiments, the sputter coating can comprise radio frequency sputtering of $LaF_3$ or $Ba_xLa_{1-x}F_{3-x}$ onto a solid transition metal.

In some examples, synthesis of core materials is disclosed herein. In general, metal nanoparticles for use as a cathode metal core may be synthesized by reacting a metal salt solution with a reducing agent in the presence of one or more stabilizers. In an illustrative example, the metal salt solution comprises a copper (II) nitrate hemipentahydrate ($Cu(NO_3)_2.2.5H_2O$) as the metal salt. The metal salt is mixed with CTAB (cetyl trimethyl ammonium bromide) and water, and the pH of the mixture may be adjusted to a pH of about 10-11, with for example, ammonium or sodium hydroxide.

Prior to addition of the reducing agent to the metal salt solution, the reducing agent may be mixed with one or more stabilizers and water, and mixed for a period of time, for example, about twenty minutes, prior to combining with the metal salt solution. The reducing agent is selected from the group consisting of hydrazine, sodium borohydride, sodium cyanoborohydride, sodium dithionate, sodium dithionite, iron (II) sulfate, tin (II) chloride, potassium iodide, oxalic acid, formic acid, ascorbic acid, thiosulfate salts, dithionate salts, phosphorous acid, phosphite salts, and hypophosphite salts. In a preferred embodiment, the reducing agent is hydrazine.

The metal salt solution and the reducing agent are combined to form the metal nanoparticles. Synthesis of the metal nanoparticles is performed in an atmosphere free of oxygen. Illustrative examples of atmospheres free of oxygen include, but are not limited to, nitrogen, argon, helium, hydrogen, and mixtures thereof. Following synthesis, the metal nanoparticles are isolated from the synthesis solution. It is to be understood that the method of isolating the metal nanoparticles is not limited, and may include one or more techniques such as filtering, decanting, and centrifuging. The metal nanoparticles may be washed one or more times with a solvent, such as ethanol, to remove any residual stabilizer or other organic material from the surface thereof.

In general, the isolated metal nanoparticles may be redispersed in an aqueous solution containing additional reducing agent under an atmosphere that is free of oxygen. The mixture containing the isolated metal nanoparticles and reducing agent is then mixed under an atmosphere free of oxygen with a metal salt solution and a halide salt solution used to form the metal halide shell on the metal nanoparticle core. The metal salt solution and the fluoride salt solution used to form the shell may be added sequentially to the nanoparticle mixture, or the metal salt solution and the fluoride salt solution used to form the shell may be added simultaneously to the nanoparticle mixture. In some embodiments, the metal salt solution comprises a single metal salt. In other aspects, the metal salt solution comprises two metal salts. In some such aspects, the metal salt solution comprises a barium salt. In some such aspects, the metal salt solution comprises a barium salt and a lanthanum salt. In some such aspects, the metal salt solution comprises barium nitrate and lanthanum nitrate. In some such aspects, the metal salt solution comprises barium nitrate and lanthanum nitrate in a ratio of about 1:10.

According to some aspects, useful structures and compositions include those in which a metal or metal fluoride is encapsulated within a fluoride-ion conductive coating such that there exists sufficient void space within the encapsulation for the volume change between metal and metal fluoride phases (or, between a lower-valent metal fluoride species MFm and a higher-valent metal fluoride species MFn where n>m for the same metal M) to be accommodated upon conversion without rupture of the coating phase or material. Such structures and compositions are sized to fit within an fluoride-conducting encapsulant, in certain cases with at least enough void space available for up to 100% of the encapsulated metal atoms to be converted to the appropriate metal fluoride phase (e.g. for the process Fe→FeF$_3$ at least 211% void space is required compared to the starting volume of Fe, from Table 1 below). In other cases, the degree of conversion may be controlled electrochemically (e.g. by controlling the voltage limits and/or charge/discharge capacity) so that the encapsulant does not rupture during cycling in the cases whereby there is not enough void space for 100% conversion to be achieved. In addition, structures and compositions are also contemplated where the fluoride-conducting encapsulant is conformal or has a void space insufficient to fully accommodate conversion from the metal to metal fluoride, but has suitable flexibility to stretch or contract without rupture or cracking of the encapsulant. Such compositions may be two-dimensional (e.g. film-void-coating), or three-dimensional (e.g. nanoparticle-void-coating, or a more complex arrangement such as metal-impregnated zeolite-void-coating) as desired.

In some embodiments, multiple, concentrically arranged encapsulants are disclosed herein. The respective concentrically arranged encapsulants can be separated by voids, and may be constructed of the same or different materials. In still other embodiments of concentrically arranged encapsulants, the active material and the outermost encapsulant (that contacts the electrolyte) may be separated by a polymer or other flexible material that is able to permit the passage of fluoride ions and is dimensionally able accommodate the volume changes upon cycling with rupturing the outermost encapsulant as shown in Table 1.

TABLE 1

Volume Change In Metal To Metal Fluoride Conversion

| Metal | Metal Fluoride | Volume Change During Conversion $M + nF^- \rightarrow MF_n$ |
| --- | --- | --- |
| Fe | FeF$_3$ | 311% |
| Pb | PbF$_2$ | 73% |
| Bi | BiF$_3$ | 134% |
| Co | CoF$_3$ | 351% |
| Cu | CuF$_2$ | 238% |
| Sn | SnF$_2$ | 113% |
| La | LaF$_3$ | 46% |
| Ca | CaF$_2$ | −5% |
| Mg | MgF$_2$ | 42% |
| Li | LiF | −24% |

Such significant volume changes are encompassed by the coatings encapsulating an FIB electrode material particle disclosed herein, and one particular state of charge will not necessarily be conformal with the particle in a different state of charge, due to the volume changes. Disclosed herein are compositions and processes that protect the electrode active material from side reactions with the electrolyte, allow ion conduction through an encapsulant, and have sufficient void space within the encapsulant and/or encapsulant expansion/contraction properties to accommodate the volume changes of the active material during charge and discharge without permitting direct contact between the active material and the electrolyte. In some embodiments, sufficient void space may be no void space, depending on the composition of the electrode active material.

As will be understood, an active material completely surrounded and positioned within an encapsulant, but with at least some remaining void space and/or compressible non-active material (such as a polymer) can be referred to as a "yolk-shell" nanocomposite structure. Such fully encapsulated structures can be based on various compositional arrangements of active material and fluoride-conducting encapsulant. However, other arrangements that include an active material only partially surrounded by a fluoride-conducting protective coating are also contemplated. Such structures may include two or three dimensional non-fluoride conducting support structures (e.g. films, open sided cells, tubes, or the like) containing an active material having one or more sides coated with a fluoride conducting material to allow ion transport. Such support structures can include void space or dimensionally flexible polymer or other material to accommodate the volume changes upon cycling without rupturing the support structure or the encapsulant.

Suitable preparative strategies for "yolk-shell" nanocomposites useful in FIB electrochemical cells are outlined herein. In certain examples, Cu metal or CuF$_2$ will be used as examples of the active material "yolk" and LaF$_3$ will be used as an example of an encapsulant or "shell" material; as before, these are not limiting of the invention as any material that can accommodate or release fluoride ions upon electrochemical reaction can be envisaged to constitute the "yolk" and any phase or material that permits the exchange of F— between the electrolyte and the active material can be envisaged to constitute the encapsulant or shell. In certain embodiments the active material is less than 1 micron in diameter, and most usefully, the active material "yolk" is between 1 and 500 nm in diameter and the encapsulant is from 2 to 100 nm thick.

Figure 39:
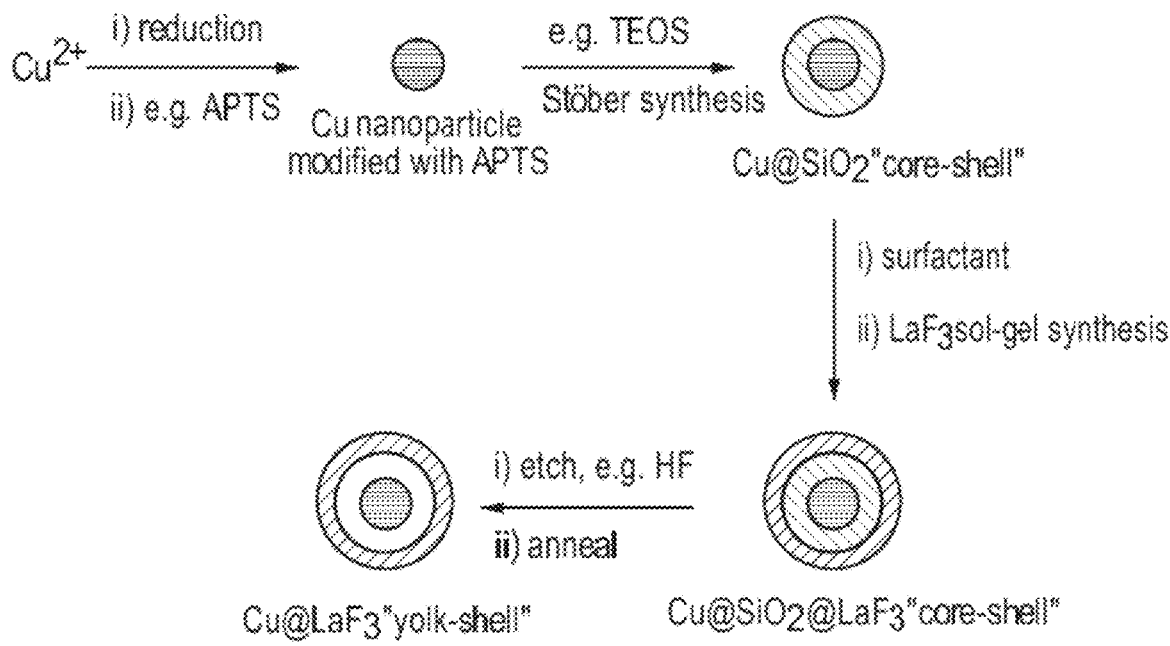
FIG. 39 outlines a general route to cathode "yolk-shell" composites using a sacrificial inorganic "middle" layer.

FIG. 39 outlines a general route using a sacrificial inorganic "middle" layer such as SiO$_2$. For example, Cu nanoparticles can be prepared by reduction of a solution of Cu$^{2+}$ ions using hydrazine or similar reducing agent in the presence of stabilizing and/or coordinating species such as sodium citrate and/or surfactant (e.g. cetyltrimethylammonium bromide). Exposure of Cu nanoparticles to a surface-modifying ligand such as aminopropyl trimethoxysilane, APTS, (or other suitable bifunctional species such that one part of the molecule coordinates to the Cu surface, and the other part is presents a reactive silicon moiety to the external environment) followed by addition of hydrolyzable silica source such as tetraethylorthosilicate (TEOS) or sodium silicate solution (water glass) under appropriate conditions (e.g., Stber synthesis or sol-gel reaction) results in conformal coating of the Cu nanoparticles with SiO$_2$. The thickness of the SiO$_2$ layer (and, hence, the resulting void space) can be controlled by modification of the amount of SiO$_2$ precursor used and the reaction conditions. The SiO$_2$-coated Cu nanoparticles are then coated with an outer layer of LaF$_3$ by sol-gel reaction (optionally in the presence of surfactant such as Lutensol AO), whereby the thickness of this coating can be modified by the amount of LaF$_3$ precursors used and the reaction conditions. This step can be done after separation and/or purification of the intermediate Cu@SiO$_2$ material, or can be performed in the same reaction mixture after formation of the SiO$_2$ layer. The resulting Cu@SiO$_2$@LaF$_3$ composite may, optionally, undergo an annealing step, and/or the SiO$_2$ layer is then removed by exposure of the composite to a SiO$_2$ etchant material such as NaOH or HF under appropriate conditions to afford the Cu@LaF$_3$ "yolk-shell" composition. This material may subsequently undergo a final annealing step, optionally in the presence of a reducing agent such as H$_2$ to purify the Cu surface.

Figure 40:
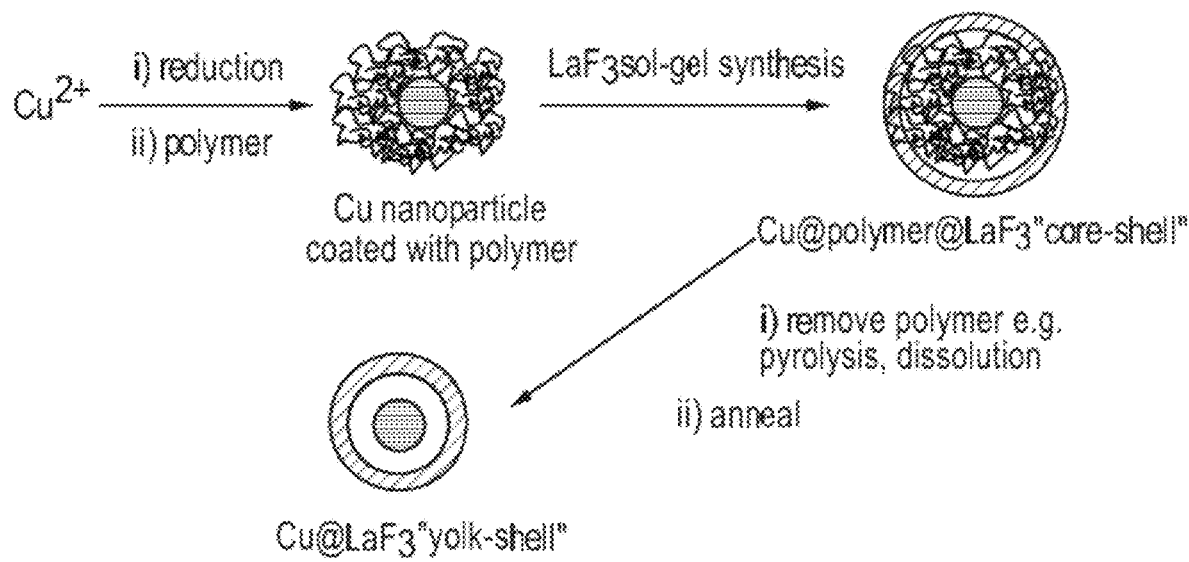
FIG. 40 outlines a route to cathode "yolk-shell" composites using a sacrificial polymer "middle" layer.

FIG. 40 describes a similar route using a sacrificial polymer "middle" layer. For example, Cu nanoparticles are coordinated by a polymer shell, by formation of Cu nanoparticles in the presence of a polymer or copolymer that features amino-, hydroxyl-, carboxylate or other ionizable functional groups (such as poly(acrylic acid), poly(ethyleneimine), poly(vinyl alcohol), poly(styrene sulfonate), a protein, a polysaccharide, or gelatin), or by growth of a polymer from the surface of suitably-modified Cu nanoparticles (e.g. poly(styrene sulfonate) grown by atom transfer radical polymerization from a 11-aminoundecyl 2-bromoisobutyrate functionalized surface). The thickness of the polymer layer (and, hence. the resulting void space) can be controlled by the polymer concentration and/or molecular weight. A shell of $LaF_3$ is grown around the outside of this Cu@polymer nanocomposite by sol-gel reaction to afford a Cu@polymer@$LaF_3$ nanocomposite. The polymer layer is then removed by decomposition at elevated temperature (in air or under inert gas such as Ar) or dissolution in suitable solvent (e.g. toluene, dichloromethane or acetone) to give the desired Cu@$LaF_3$ "yolk-shell" composition. This material may subsequently undergo a final annealing step, optionally in the presence of a reducing agent such as $H_2$ to purify the Cu surface. Alternatively, a polymer core-shell architecture such as the hollow latex-type particles may be employed as a template in which Cu nanoparticles are entrapped (either by exposure of Cu nanoparticles to preformed hollow latex particles or by coordination of Cu ions in solution to the ionizable pre-polymer or copolymer, followed by reduction of the Cu ions to give Cu nanoparticles and then generation of the hollow structure through e.g. solvent removal), followed by growth of $LaF_3$ shell, removal of polymer and annealing, as necessary, to generate a Cu@$LaF_3$ "yolk-shell" composition.

Figure 41:
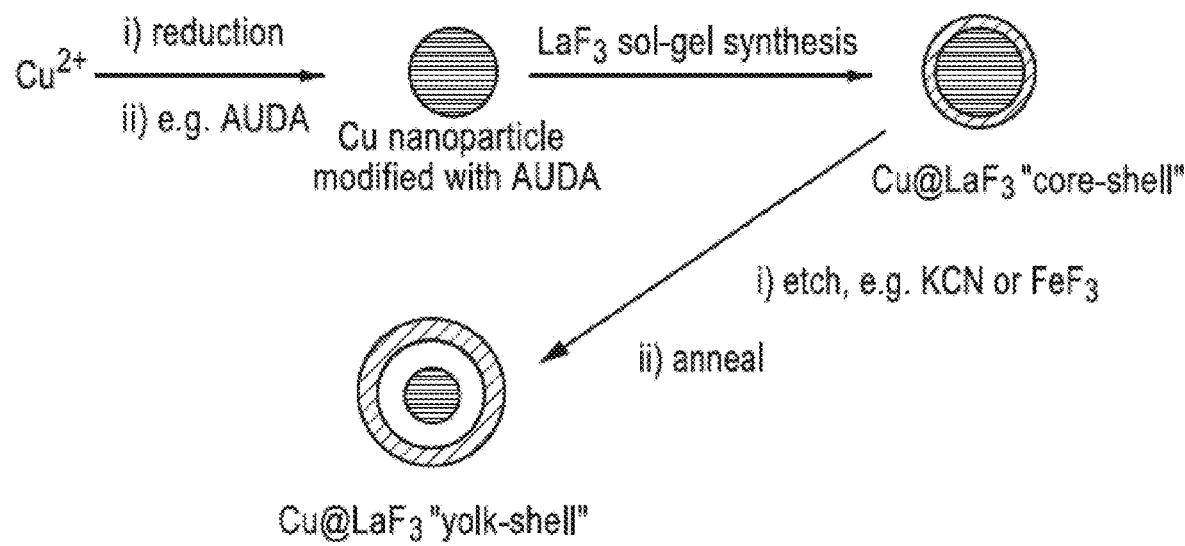
FIG. 41 delineates an alternative route to cathode "yolk-shell" composites in the absence of a sacrificial "middle" layer.

FIG. 41 delineates an alternative route in the absence of a sacrificial "middle" layer. For example, Cu nanoparticles are treated with a suitable surface-modifying ligand (e.g. 11-aminoundecanoic acid, AUDA) before an outer layer of $LaF_3$ is grown by sol-gel reaction to give a Cu@$LaF_3$ "core-shell" composite, which may then, optionally, subsequently undergo an annealing step. Partial etching of the Cu "core" using an appropriate etchant (for example, KCN, $HCl/H_2O_2$ or $FeCl_3$; suitable etchants are known in the art, and may be chosen so as to not affect the "shell" material) enabled through control over the reaction conditions (e.g. etchant concentration, temperature, reaction time) generates void space in the Cu@$LaF_3$ particle, affording a "yolk-shell" Cu@$LaF_3$ composition. This material may subsequently undergo a final annealing step, optionally in the presence of a reducing agent such as $H_2$ to purify the Cu surface.

Figure 42:
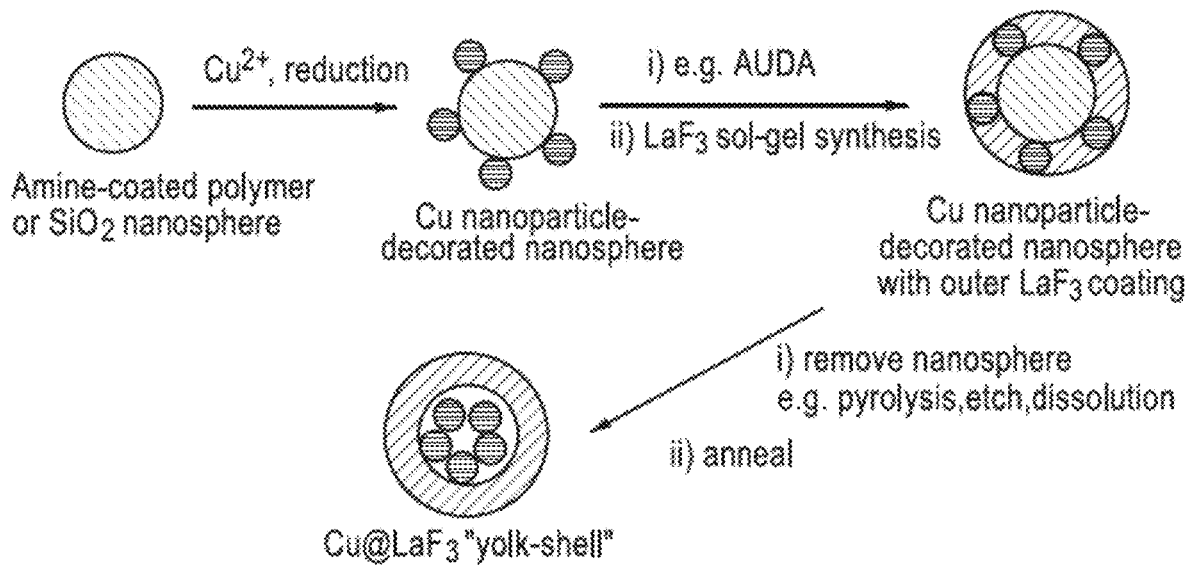
FIG. 42 depicts a variation on "sacrificial" syntheses of cathode "yolk-shell" composites, whereby nanoparticles of the active material are grown on the surface of a "sacrificial" material.

FIG. 42 depicts a variation on the "sacrificial" syntheses described above, whereby nanoparticles of the active material are grown on the surface of a "sacrificial" material (here, it is the innermost material that is removed). For example, one or more Cu nanoparticles are grown on the surface of amino-functionalized poly(styrene) or $SiO_2$ particles. The resulting composite material is treated with a suitable Cu surface-modifying ligand, after which an outer layer of $LaF_3$ is grown by sol-gel reaction. The innermost material is removed by thermal decomposition, etching or dissolution, resulting in a "yolk-shell" Cu@$LaF_3$ composition featuring one or more Cu nanoparticles. This material may subsequently undergo a final annealing step, optionally in the presence of a reducing agent such as $H_2$ to purify the Cu surface(s) and, optionally, to aggregate the Cu nanoparticles.

Figure 43:
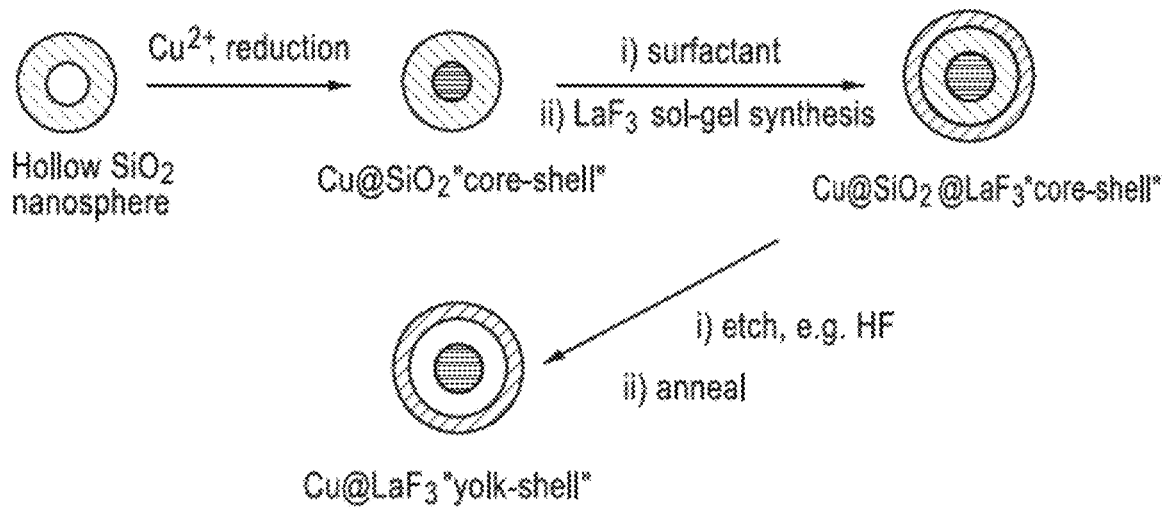
FIG. 43 outlines the (cathode) growth of active material in the internal structure or pores of a pre-formed "sacrificial" material.

FIG. 43 outlines an alternative strategy, in which active material is grown in the internal structure or pores of a pre-formed "sacrificial" material. For example, Cu nanoparticles may be grown inside hollow $SiO_2$ nanospheres. These Cu@$SiO_2$ "core-shell" nanocomposites are then coated with an outer layer of $LaF_3$ by sol-gel reaction (optionally in the presence of surfactant such as Lutensol AO), whereby the thickness of this coating can be modified by the amount of $LaF_3$ precursors used and the reaction conditions. The resulting Cu@$SiO_2$@$LaF_3$ composite may, optionally, undergo an annealing step, and/or the $SiO_2$ layer is then removed by exposure of the composite to a $SiO_2$ etchant material such as NaOH or HF under appropriate conditions to afford the Cu@$LaF_3$ "yolk-shell" composition. This material may subsequently undergo a final annealing step, optionally in the presence of a reducing agent such as $H_2$ to purify the Cu surface. In related syntheses, micro- or mesoporous materials such as zeolites may be used as the "template" for Cu nanoparticle formation, followed by subsequent Cu@$LaF_3$ "yolk-shell" generation in analogous fashion.

Figure 44:
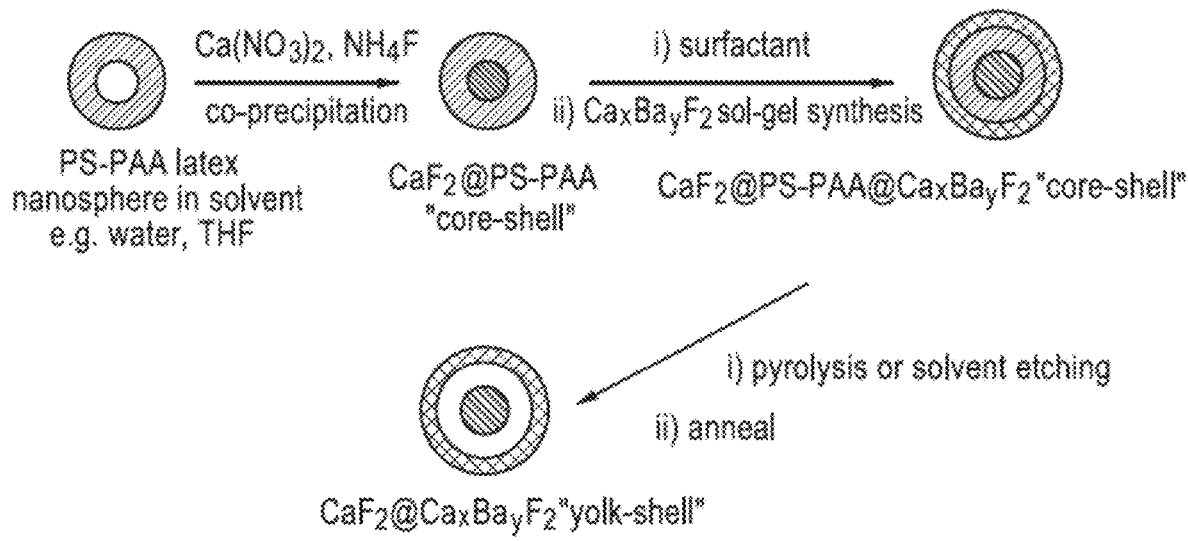
FIG. 44 outlines the growth of (cathode) active material in the internal structure or pores of a pre-formed "sacrificial" material where the shell constituents are chosen to be electrochemically-inactive at the electrochemical reaction potentials of interest.

FIG. 44 also depicts an analogous alternative strategy whereby a highly-electropositive metal or its metal fluoride, such as $CaF_2$, is grown within the interior space of a hollow material such as a poly(styrene)-poly(acrylic acid) latex copolymer in a suitable solvent. These polymer-encapsulated $CaF_2$ nanocrystals are then coated with an outer layer of fluoride-ion conducting material of suitable electrochemical stability so as not to be itself reduced at the conversion potential of $CaF_2$ to Ca (~0.2 V vs. $Li^+$/Li). Examples of suitable protective materials include solid solutions such as $Ca_xBa_yF_2$ (x+y=1) where the $Ca^{2+}$ and $Ba^{2+}$ ions in the protective shell are not substantially reduced during the conversion reaction of $CaF_2$ particles within the shell; in contrast a shell featuring a less electropositive metallic element (e.g. $LaF_3$) would itself be reduced in preference to the inner $CaF_2$ particles. The resulting $CaF_2$@polymer@$Ca_xBa_yF_2$ composite may, optionally, undergo an annealing step, and/or the polymer layer is then removed by exposure of the composite to high temperature or a suitable solvent etchant material that removes the polymer to the $CaF_2$@$Ca_xBa_yF_2$ "yolk-shell" composition.

Using the described encapsulated active material and/or yolk-shell nanocomposite electrodes, along with electrolytes, anode with SEI, binders, additives, separators, battery casing or packaging, current collectors, electrical contacts, electronic charge and discharge controllers, and other elements of battery construction known to those skilled in the art, one can create useful fluoride ion batteries operable at temperatures ranging from −40 degrees to 200 degrees Celsius. Such electrochemical cells can have substantially irreversible electrochemical reactions during discharge, making them suitable for forming galvanic cells or primary batteries. Alternatively, certain structures and compositions having an electrochemical reaction is at least partially reversible through application of electrical charge, secondary (rechargeable) batteries can be formed.

Figure 1C:
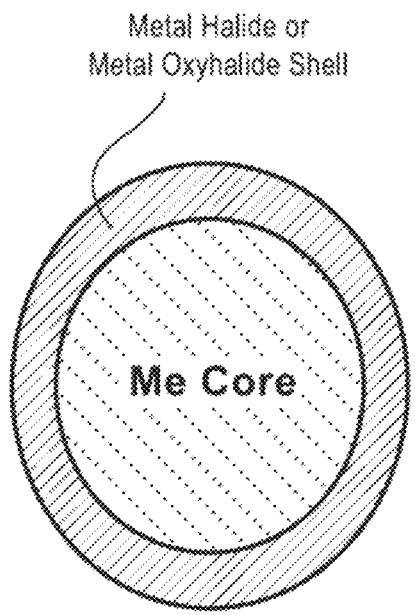
FIG. 1C shows a cross section of a core-shell nanoparticle including a core comprising a metal nanoparticle, and a shell comprising a metal halide or a metal oxyhalide in an aspect of the present disclosure.
Figure 2:
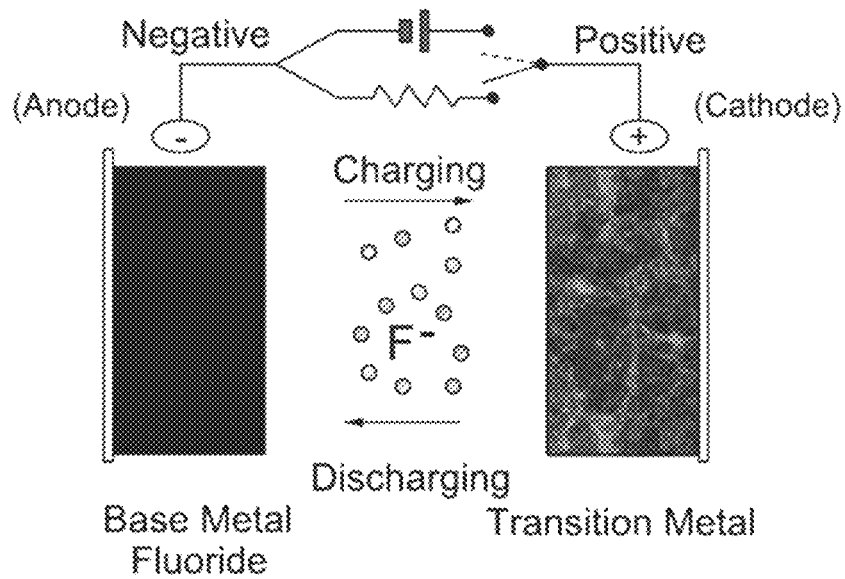
FIG. 2 is a schematic illustration of a fluoride ion electrochemical cell in an aspect of the present disclosure.

In some embodiments as shown in FIG. 1C, the core-shell nanoparticles include a core that comprises a metal or metal alloy ("Me"), and a shell that comprises a metal halide or a metal oxyhalide. The metal of the core may be the same as the metal of the metal halide shell. In some embodiments, the metal of the core and the metal of the metal halide or metal oxyhalide shell are different metals. In some embodiments, the metal halide shell may itself comprise two metals. The core-shell nanoparticles of the present disclosure may be incorporated into a variety of methods and applications including, but not limited to, electrodes for use in electrochemical cells, including fluoride shuttle batteries as illustrated in FIG. 2. The energy densities of various types of batteries are illustrated in FIG. 1A and in Table 2 below:

TABLE 2

Energy Densities of F-Shuttle Batteries and Lithium Ion Batteries

|  | AN (−) | CA (+) | Specific Energy (Wh/kg) | Volumetric Energy (Wh/L) |
|---|---|---|---|---|
| F-Shuttle Battery | $MgF_2$ | Co | 1354 | 6207 |
|  | $CaF_2$ | Fe | 1086 | 4597 |
|  | $CaF_2$ | Co | 1404 | 6165 |
|  | $MgF_2$ | Bi | 716 | 4727 |
|  | $MgF_2$ | Ni | 1067 | 4894 |
|  | $LaF_3$ | Ni | 1014 | 6918 |
|  | $YF_3$ | Cu | 1042 | 5348 |
|  | $LaF_3$ | Bi | 725 | 5924 |
| Li Ion Battery | Graphite | $LiCoO_2$ | 380 | 953 |
|  | Graphite | $LiFePO_4$ | 407 | 936 |

In some embodiments, the metal nanoparticles used to form the core can be synthesized in the presence of a stabilizer that prevents or otherwise inhibits oxidation of the metal nanoparticles during synthesis, and is readily removable from the metal nanoparticles prior to formation of the metal halide or metal oxyhalide shell thereon. For example, bulky polymers such as polyvinylpyrrolidone (molecular weight of 55,000 g/mol) used during metal nanoparticle synthesis inhibit oxidation of metal nanoparticles. However, such stabilizers are not readily removable from the metal nanoparticles following synthesis. Without being limited to any particular theory, residual stabilizer can form an additional layer between the core formed by the metal nanoparticles and the metal halide or oxyhalide shell that detracts from the performance of the core-shell nanoparticle in the desired system. For example, it is desirable to maintain the conductivity of core-shell nanoparticles used as electrode material in an F shuttle battery. However, core-shell materials including an additional layer of residual stabilizer between the core and the shell will likely result in an increased space between electrode materials; the additional layer of residual stabilizer and/or the resulting increased space may decrease the conductivity of the core-shell material. Without wishing to be bound to any particular theory, the additional layer of stabilizer may impede contact between the core and the shell to conduct fluoride ion, while the absence of the stabilizer may increase the likelihood of conducting fluoride ion from the core to the shell.

Therefore, a stabilizer may be used in the synthesis of the metal nanoparticles used to form the core that is readily removable therefrom to minimize the amount of stabilizer on the surface of the core prior to formation of the metal halide or metal oxyhalide shell directly thereon. In a non-limiting example, the one or more stabilizers that may be used in the synthesis of the metal nanoparticles includes a molecular weight (either individually or a weight average) of less than 1000 g/mol, optionally less than 500 g/mol, optionally less than 375 g/mol, and optionally less than 350 g/mol. Illustrative examples include hexadecyltrimethylammonium bromide (CTAB) with a molecular weight of 364 g/mol, citric acid with a molecular weight of 192 g/mol, and mixtures thereof.

In a non-limiting example, the shell is deposited directly on the metal core and may entirely surround the core as shown in FIG. 1C. In some embodiments, the shell of the core-shell nanoparticles may be formed by mixing isolated metal nanoparticles used to form the core with, for example, a metal salt solution and a halide salt solution that react to form the metal halide shell on the core. In some embodiments, the metal salt used to form the shell is selected from the group consisting of alkali metal salts, alkaline earth metal salts, and transition metal salts. In certain embodiments, the metal salt used to form the shell is a transition metal salt. In certain embodiments, the metal salt used to form the shell is selected from the group consisting of lanthanum salts, cerium salts, and magnesium salts. In certain embodiments, the metal salt used to form the shell is selected from the group consisting of lanthanum salts and cerium salts. In certain embodiments, the metal salt is a lanthanum salt. In a preferred embodiment, the lanthanum salt is lanthanum nitrate. In some embodiments, the halide salt is sodium fluoride. In a non-limiting example, the shell comprises a metal fluoride or metal oxyfluoride containing material (i.e. $CeF_3$, CeOF, LaOF, $LaF_3$). In some embodiments, the metal salt solution can comprise barium nitrate and lanthanum nitrate. In some embodiments, the metal salt solution comprises barium nitrate and lanthanum nitrate in a ratio of about 1:10.

In other embodiments, as discussed above, the core (or electrode active material) may be separated from the shell (or encapsulant) by a void space. Compositions and processes according to such embodiments may protect the electrode active material from side reactions with the electrolyte, allow ion conduction through an encapsulant, and have sufficient void space within the encapsulant and/or encapsulant expansion/contraction properties to accommodate the volume changes of the active material during charge and discharge, without permitting direct contact between the active material and the electrolyte.

The terms core and electrode active material are used interchangeably herein. Similarly, the terms shell, layer, and encapsulant are used interchangeably herein.

In other embodiments, the present disclosure is directed to an electrode comprising the core-shell nanoparticles disclosed herein. All aspects and embodiments described with respect to the core-shell nanoparticles and methods of making thereof apply to the electrode. In a non-limiting example, the electrode is part of an F-shuttle or fluoride ion battery system.

In some embodiments, the present disclosure is directed to an electrochemically active structure, comprising: a core comprising an active material, and a fluoride-containing shell at least partially surrounding the active material, wherein the fluoride-containing shell comprises a first metal and a second metal, and the first metal is barium.

In some embodiments, the active material (core) comprises copper nanoparticles. In some embodiments, the fluoride-containing shell core can be directly attached to the core. In some embodiments, the second metal is lanthanum. In some embodiments, the barium and the lanthanum are present in a ratio of x to 1−x. In some embodiments, x is about 0.03 to about 0.15. In some embodiments, x is about 0.03. In some embodiments, the present disclosure is directed to an electrode comprising: a core comprising copper nanoparticles, and a fluoride containing shell at least partially surrounding the copper nanoparticles, wherein the fluoride-containing shell comprises barium and lanthanum in a ratio of x to 1−x. In some embodiments, x can be about 0.03 to about 0.15.

In some embodiments, the present disclosure is directed to a method of making coated metal nanoparticles, the method comprising: a) providing a water/metal nanoparticle mixture; b) exposing the water/metal nanoparticle mixture to an inert atmosphere; and c) forming a fluoride-containing shell around a metal nanoparticle core, wherein the fluoride-containing shell comprises a first metal and a second metal, and the first metal is barium.

In some embodiments, the forming the fluoride-containing shell comprises adding a first metal salt, a second metal salt, and a fluoride-containing salt to the water/metal nanoparticle mixture to create a fluoride-containing shell around the metal nanoparticle core, wherein the first metal is a barium salt. In some embodiments, the second metal is a lanthanum salt. In some embodiments, the first metal salt is barium nitrate and the second metal salt is lanthanum nitrate. In some embodiments, the barium nitrate and the lanthanum nitrate are used in a molar ratio of about 1:10.

The core-shell particle having a transition metal core and a shell at least partially surrounding the transition metal core can, for example, be applied to a metal cathode or can be supported by various means for utilization in a fluoride ion battery. According to some aspects, an agglomerate of transition metal core and a shell at least partially surrounding the transition metal core is formed for a suitable cathode. In some embodiments, the suitable cathode has larger dimensions extending from the shell, while the shell covers the nanometer dimensions.

According to some aspects, a core-shell particle having a transition metal core and a shell at least partially surrounding the transition metal core can form a paste, can be combined with other compounds, can be dried, can be formed, can be agglomerated, or can be utilized by any means known in the art. In some embodiments, a core-shell particle having a transition metal core and a shell at least partially surrounding the transition metal core can be made into a paste with poly(vinylidene fluoride), PVDF and/or SP (Super P carbon black), pressed into stainless steel mesh, and dried under vacuum for an electrode assembly.

An "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof.

A "reducing agent" is a substance that causes the reduction of another substance, while it itself is oxidized. Reduction refers to a gain of electron(s) by a chemical species, and oxidation refers to a loss of electron(s) by a chemical species.

A "metal salt" is an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

A "halide salt" is an ionic complex in which the anion(s) is(are) halide ion(s), including but not limited to fluoride ion(s), chloride ion(s), bromide ion(s), and iodide ion(s). A "fluoride salt" is an ionic complex in which the anion(s) is(are) fluoride ion(s). According to the present disclosure, the cation of the halide salt or the fluoride salt may be any positively charged chemical species.

A "metal fluoride" is an ionic complex in which the cation is one or more metal ion(s) and the anion(s) is(are) fluoride ion(s). According to some aspects of the present disclosure, the metal salt(s) and the fluoride salt react to create a metal fluoride shell around the metal nanoparticle core. Similarly, a "metal halide" is an ionic complex in which the cation is one or more metal ion(s) and the anion(s) is(are) halide ion(s).

A "fluoride-containing" salt is an ionic complex in which the anion(s) contain fluoride ion but are not limited to being solely fluoride. Instead, "fluoride-containing" salts include ionic complexes where the anion(s) contain fluoride itself in complex with other ions or atoms. "Fluoride-containing" salts suitable for use in aspects of the present disclosure include those known to persons of ordinary skill in the art, including, but not limited to, fluoride salts, non-metal fluoroanions such as tetrafluoroborate salts and hexafluorophosphate salts, and oxyfluoride salts. In some embodiments of the present disclosure, the fluoride-containing salts may include quaternary ammonium fluorides and fluorinated organic compounds. According to some aspects of the present disclosure, the metal salt and the fluoride-containing salt react to create a fluoride-containing shell around the metal nanoparticle core.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than(xi) the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science, including thin electrode designs, such as thin film electrode configurations.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries, and electrolysis systems.

"Electrolyte" refers to an ionic conductor which can be in the solid state, the liquid state (most common), or more rarely a gas (e.g., plasma).

Figure 13A:
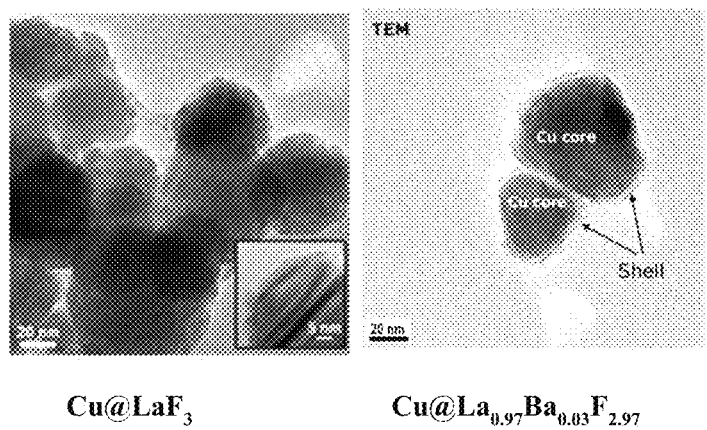
FIG. 13A depicts TEM images of $Cu@LaF_3$ core-shell nanoparticles and $Cu@La_{0.97}Ba_{0.03}F_{2.97}$ core-shell nanoparticles, respectively. The inset in the TEM image of $Cu@LaF_3$ nanoparticle is the zoom-in image of Cu (core) and $LaF_3$ (shell) areas.

Example 1, Cu Nanoparticles Encapsulated in LaF3 and Barium-Doped LaF3 Shells. FIG. 13A depicts TEM images of Cu@LaF$_3$ core-shell nanoparticles and Cu@La$_{0.97}$Ba$_{0.03}$F$_{2.97}$ core-shell nanoparticles, respectively. In FIG. 13A, the central black areas correspond to the copper core, and the peripheral black and white areas correspond to the LaF$_3$ or La$_{0.97}$Ba$_{0.03}$F$_{2.97}$ shells. The figure shows homogeneous coverage of the copper core directly coated with the LaF$_3$ or La$_{0.97}$Ba$_{0.03}$F$_{2.97}$ shells.

Figure 13B:
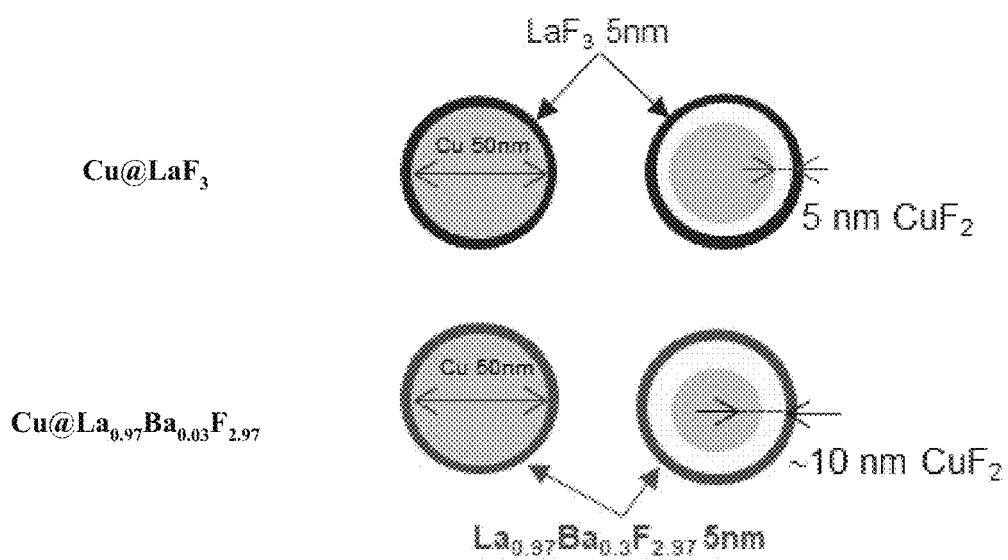
FIG. 13B shows schematic representations of $Cu@LaF_3$ and $Cu@La_{0.97}Ba_{0.03}F_{2.97}$ nanoparticles before/after fluorination, respectively, according to some aspects of the present disclosure. $F^-$ ions can penetrate Cu around 5 nm with $LaF_3$ shell and around 10 nm with $La_{0.97}Ba_{0.03}F_{2.97}$ shell, respectively. With the Ba-doped $LaF_3$ shell, Cu utilization is improved due to its higher ionic conducity compared to $LaF_3$. The calculations are based on charge/discharge profile in FIG. 14A.

Core-shell nanoparticles with shells of the formula Cu@La$_{0.97}$Ba$_{0.03}$F$_{2.97}$ are shown schematically in FIG. 13B; Cu@LaF$_3$ is included for comparison. Initially, the copper nanoparticle core may be up to about 50 nm in diameter before use and the LaF$_3$ or La$_{0.97}$Ba$_{0.03}$F$_{2.97}$ coating may be about 5 nm thick. The CuF$_2$ layer that forms around the Cu core during battery charging can grow to a thickness of about 3 nm in Cu@LaF$_3$ nanoparticles. However, by doping Ba into the LaF$_3$ shell, the CuF$_2$ layer can grow to a greater thickness, e.g., around 10 nm in FIG. 13B.

Figure 14A:
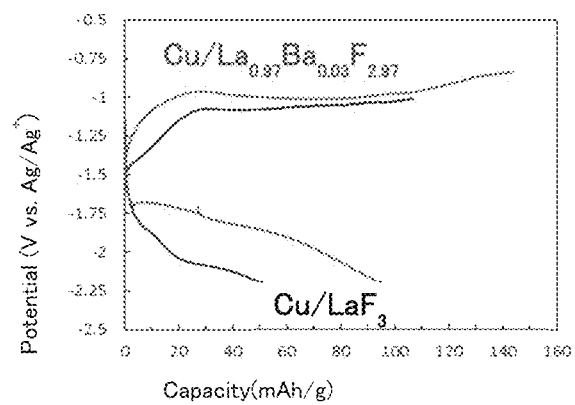
FIG. 14A shows the voltage profile of the first charge-discharge cycle of a $Cu@LaF_3$ electrode or a $Cu@La_{0.97}Ba_{0.03}F_{2.97}$ electrode, compared to the $Ag/Ag^+$ reference electrode, according to some aspects of the present disclosure.
Figure 14B:
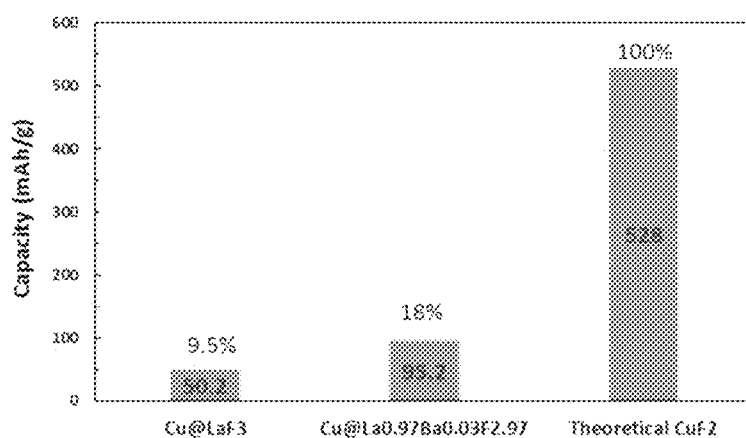
FIG. 14B shows a comparison of the capacity achieved for $Cu@LaF_3$ (9.5% of theoretical capacity), for $Cu@La_{0.97}Ba_{0.03}F_{2.97}$ (18% of theoretical capacity), and for $CuF_2$ (theoretical capacity of 528 mAh/g) according to some aspects of the present disclosure.
Figure 15:
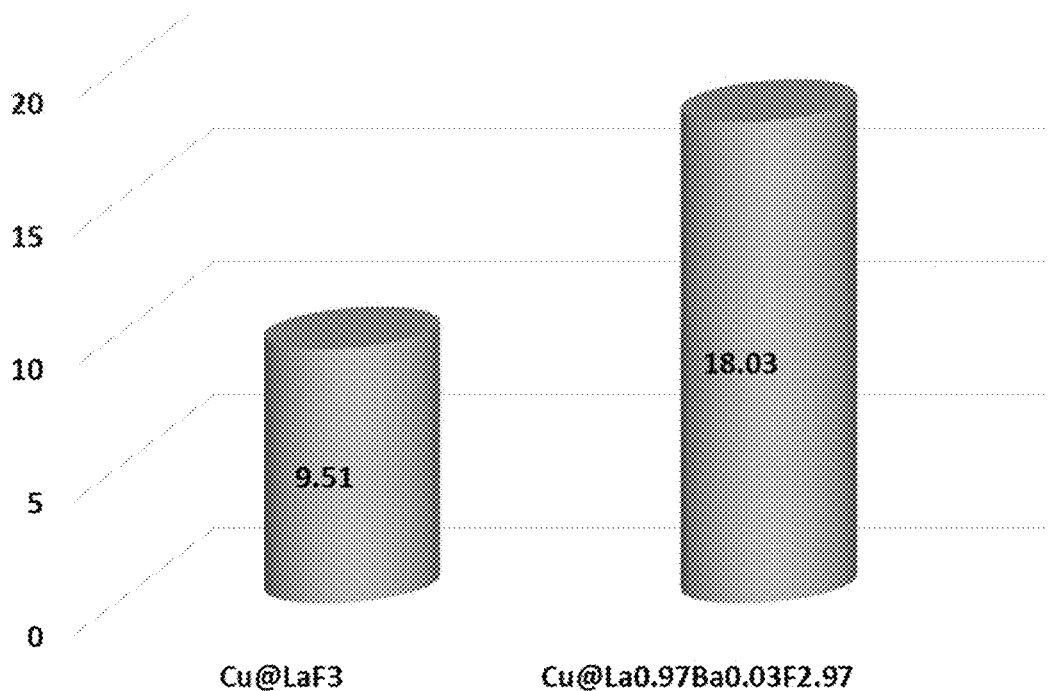
FIG. 15 shows the percentage of energy densities achieved by copper based F-shuttle batteries, which is normalized by theoretical capacity of $CuF_2$ (528 mAh/g).

FIGS. 14A and 14B demonstrate the capacity improvement achieved upon Ba-doping. FIG. 14A shows the voltage profile of the first charge-discharge cycle of a Cu@LaF$_3$ electrode or a Cu@La$_{0.97}$Ba$_{0.03}$F$_{2.97}$ electrode, compared to the Ag/Ag$^+$ reference electrode. The capacity delivery of the Ba-doped electrode (Cu@La$_{0.97}$Ba$_{0.03}$F$_{2.97}$) reaches 95.2 mAh/g compared to only 50.2 mAh/g for Cu@LaF$_3$ (FIG. 14B). Thus, Ba-doping of the LaF$_3$ shell nearly doubles the capacity of cathodic electrode. With Ba doping, the ionic conductivity of the LaF$_3$ shell is improved about 100 times. Fluoride ion can more readily travel through the shell to react with Cu to form CuF$_2$, and the amount of CuF$_2$ formation directly determines the capacity of the battery. The more CuF$_2$ that is formed, the higher the capacity of the battery. Therefore, the utilization of Cu can be nearly doubled by Ba-doping of the LaF$_3$ shell. Cu or CuF$_2$ is useful as a cathode material for liquid type F-shuttle batteries. These materials are relatively inexpensive and are light weight, which provides a high capacity and a high energy density. Theoretical capacity of CuF$_2$ is 528 mAh/g. However, pure Cu or CuF$_2$ is easily dissolved into liquid electrolytes during charge and discharge. To solve this issue, the Cu core is coated with LaF$_3$ or Ba doped LaF$_3$ shell structures, which effectively prevents Cu from dissolution during charge/discharge cycling. For Cu@LaF$_3$, for example, the LaF$_3$ shell effectively prevents Cu from dissolution during charge/discharge. As a result, Cu can be converted to CuF$_2$ during charge, and CuF$_2$ can be reduced to Cu during discharge. With a Ba-doped shell (e.g., La$_{0.97}$Ba$_{0.03}$F$_{2.97}$), the ionic conductivity of the shell can be improved 100 times compared to that of a LaF$_3$ shell, i.e., the shell has low resistance. F$^-$ ions more easily pass through the shell so that more Cu can be fluorinated to CuF$_2$ during charge. Capacity is doubled compared to the undoped LaF$_3$ shell. (See FIGS. 14A and 14B and FIG. 15).

Figure 45:
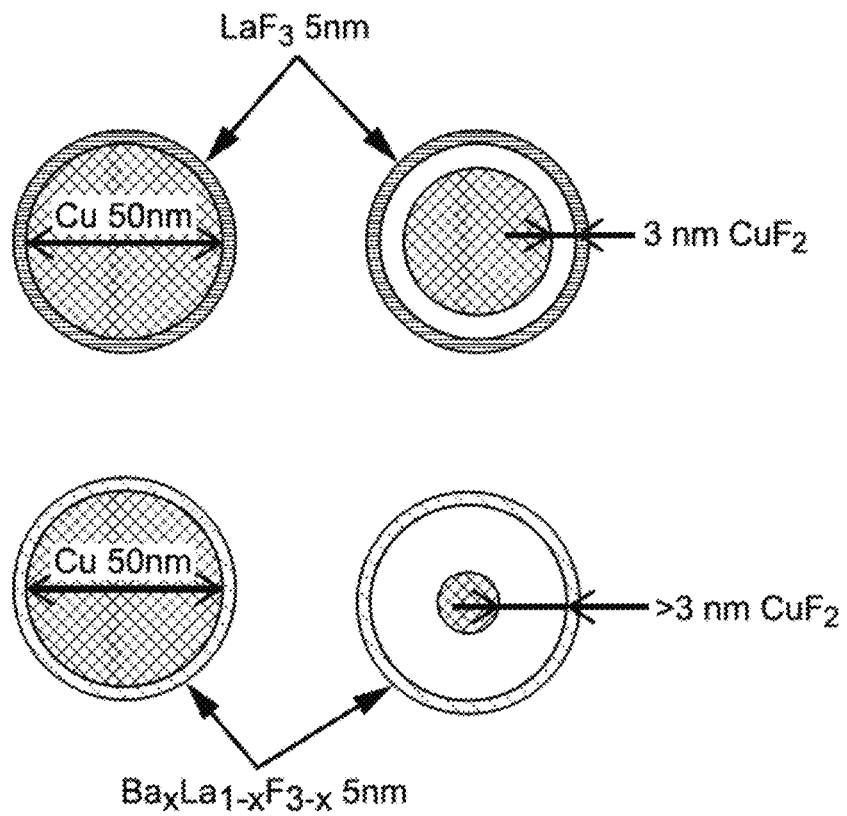
FIG. 45 shows illustrative dimensional representations of initial 50 nm dia. Cu@$LaF_3$ and Cu@$Ba_xLa_{1-x}F_{3-x}$, nanoparticles and fluorinated Cu@$LaF_3$ and Cu@$Ba_xLa_{1-x}F_{3-x}$, according to some aspects of the present disclosure. Ba-doped $LaF_3$ shells own higher ionic conductivity compared to $LaF_3$ so that fluoride ions can penetrate Cu core deeper (>3 nm) to form more $CuF_2$ during fluorinaton. Optimizing Ba-doped shell is able to utilize Cu core effectively to improve its practical capacity, Ideally close to theoretical capacity of 528 mAh/g.

Core-shell nanoparticles with shells of the formula Cu@Ba$_x$La$_{1-x}$F$_{3-x}$, are illustrated schematically in FIG. 45; Cu@LaF$_3$ is included for comparison. Initially, the copper nanoparticle core may be up to about 50 nm in diameter and the LaF$_3$ or Ba$_x$La$_{1-x}$F$_{3-x}$ coating may be about 5 nm thick. The CuF$_2$ layer that forms on the Cu core during battery charging can grow to a thickness of about 3 nm in Cu@LaF$_3$ nanoparticles. However, by doping in Ba into the LaF$_3$ shell, the CuF$_2$ layer can grow to a greater thickness.

Example 2, Designs and Synthesis of Cu Nanostructures. Due to poor electrical and ionic conductivities of many metal fluorides, it is necessary to design the structures of the metal fluorides to fully utilize the active materials and achieve their specific capacities and energy densities.

In one embodiment, for better utilization of the Cu/CuF$_2$ electrode materials to achieve an energy density close to its theoretical capacity (i.e. 843.5 mAh/g for Cu and 528 mAh/g for CuF$_2$), structural designs tailored to satisfy the requirement of no more than 20 nm thickness of Cu nanomaterials along at least one direction or one axis of the Cu nanostructure are preferred. Among these structures, Cu may be the electrode active material having a LaF$_3$ or La$_{1-x}$Ba$_x$F$_{3-x}$ coating/coverage in the range of ~5-20 nm.

Examples of such Cu nanostructures include: nanoparticles, nanotubes, nanowires, nanoframes, nanoflakes, nano porous, sheets, and thin films. According to some aspects, such Cu nanostructures can comprise Cu thin films with a thickness no more than 20 nm. In some embodiments, such Cu nanostructures can comprise Cu nanofoams with a porous wall having a thickness no more than 20 nm. In some embodiments, such Cu nanostructures can comprise Cu mesh with a wire having a thickness no more than 20 nm.

(i) Cu Nanoparticles ("NP").

Figure 16:
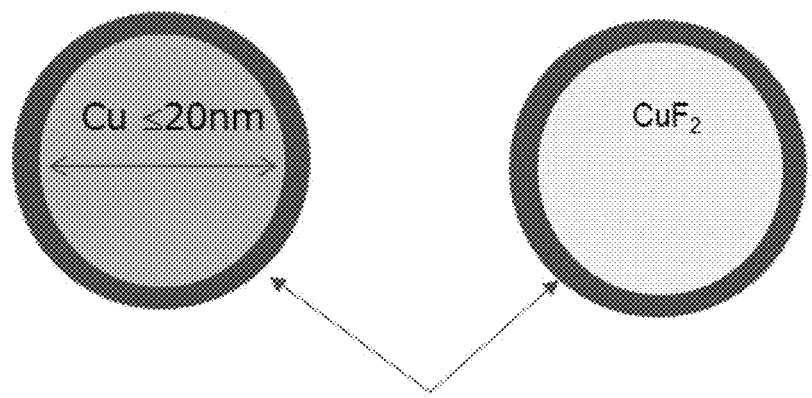
FIG. 16 illustrates an ideal structure proposed of Cu core nanoparticles (≤20 nm dia.) with Ba-doped $LaF_3$ ($Ba_xLa_{1-x}F_{3-x}$) or $LaF_3$ shell which can be fully charged to form $CuF_2$ based on calculations from the charge/discharge profile in FIG. 14A.

A structural design of Cu core nanoparticles is illustrated in FIG. 16 where the Cu core nanoparticles have a diameter no more than 20 nm and a LaF$_3$ or La$_{1-x}$Ba$_x$F$_{3-x}$ coating/shell. In FIG. 16, in any direction, the thickness/diameter of Cu core nanoparticles is no more than 20 nm due to their spherical shape.

Synthesis of Cu Nanoparticles ("NP")

Figure 17:
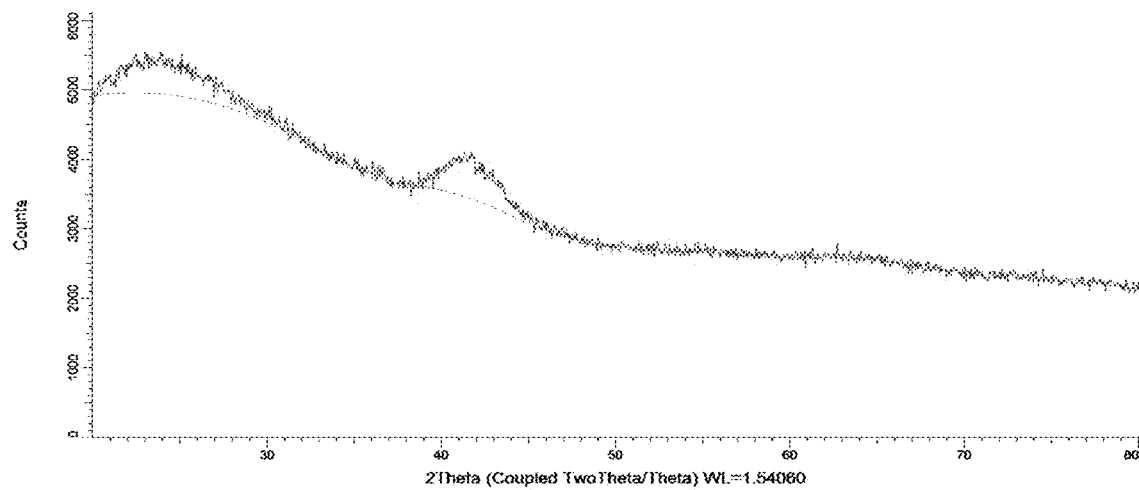
FIG. 17 shows pXRD spectra of 6 nm Cu nanoparticles.
Figure 19A:
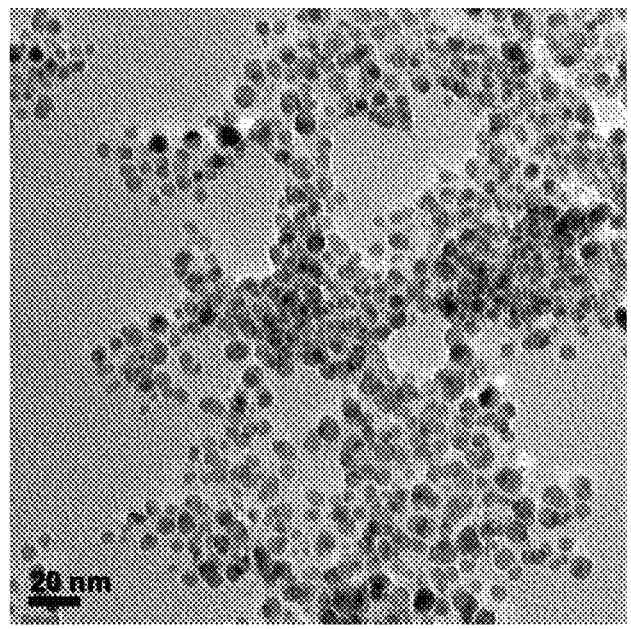
FIG. 19A illustrates a TEM image of 6 nm Cu core nanoparticles after initial synthesis.

NH$_4$OH (0.5 mL, 14.5 M) was added to a stirring solution of CuCl$_2$.2 H$_2$O (0.24 g, 1.4 mmol) and cetrimonium bromide (CTAB, 0.68 g, 1.87 mmol) in water (93 mL, DI) in an argon atmosphere at 23° C. Hydrazine hydrate (50-60%, 3 mL, 17.66 M) was added to a solution of CTAB (0.68 g, 1.87 mmol) and citric acid monohydrate (0.036 g, 0.18 mmol) in water (57 mL, DI). The hydrazine solution was immediately transferred to a 60 mL syringe and added over 5 minutes via a syringe pump to the Cu precursor solution. Once the addition of the hydrazine solution was complete the argon line was removed and the reaction was stirred open to air. Once exposed to air a solution of citric acid monohydrate (0.21 g, 1.0 mmol) in water (5 mL) was injected all at once. The mixture was then stirred for 1 hour, open to air. The Cu NP were isolated via centrifuge (12,000 rpm for 5 min.), the supernatant was discarded and the Cu NP were washed with EtOH (10 mL) twice. The product exhibited small, broad Cu peaks by XRD as is shown in FIG. 17. The average size of the Cu nanoparticles was about 6 nm (FIG. 19A).

Synthesis of Cu Nanoparticle Shell

Figure 18:
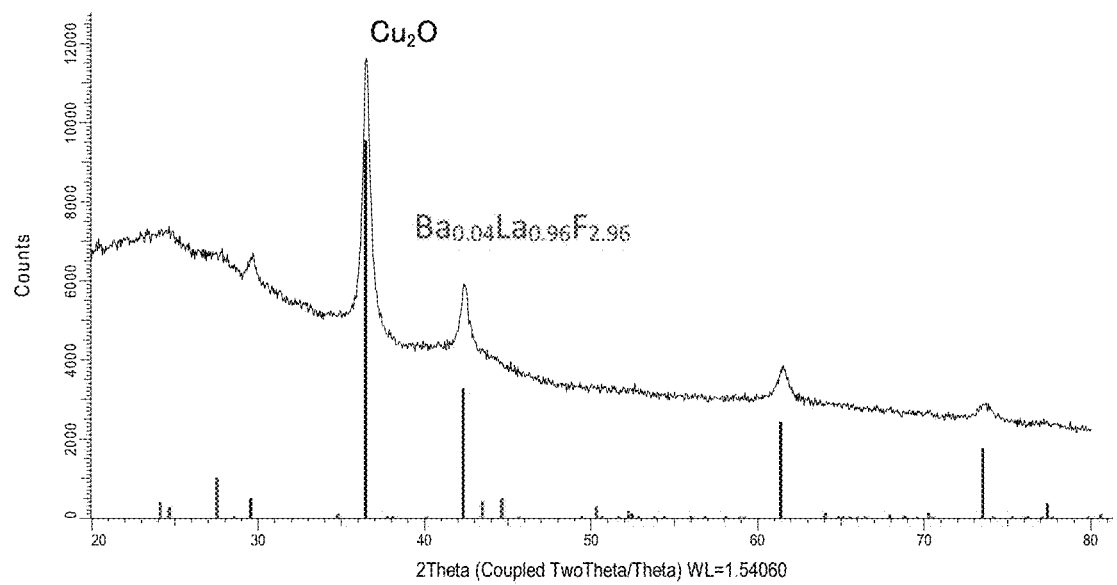
FIG. 18 shows pXRD spectra of 6 nm $Cu@LaF_3$ (Cu nanoparticles with $LaF_3$ shell) after initial synthesis. Cu is oxidized to $Cu_2O$.
Figure 19B:
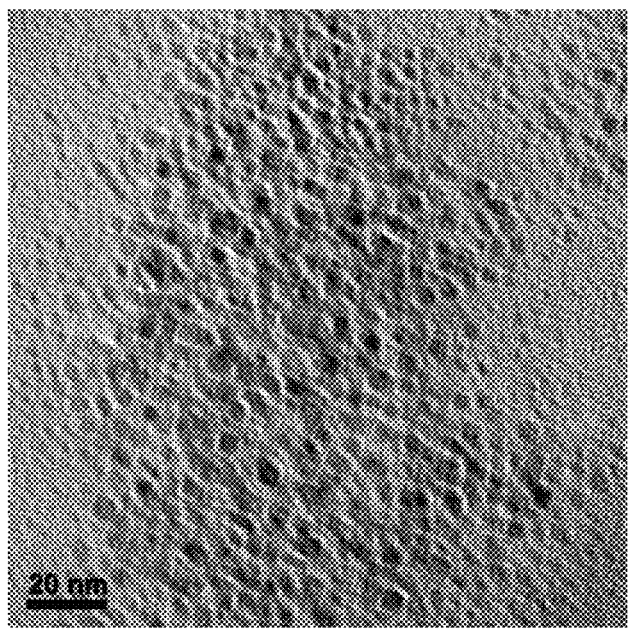
FIG. 19B shows a TEM image of 6 nm Cu core with a $LaF_3$ shell after initial synthesis.
Figure 20:
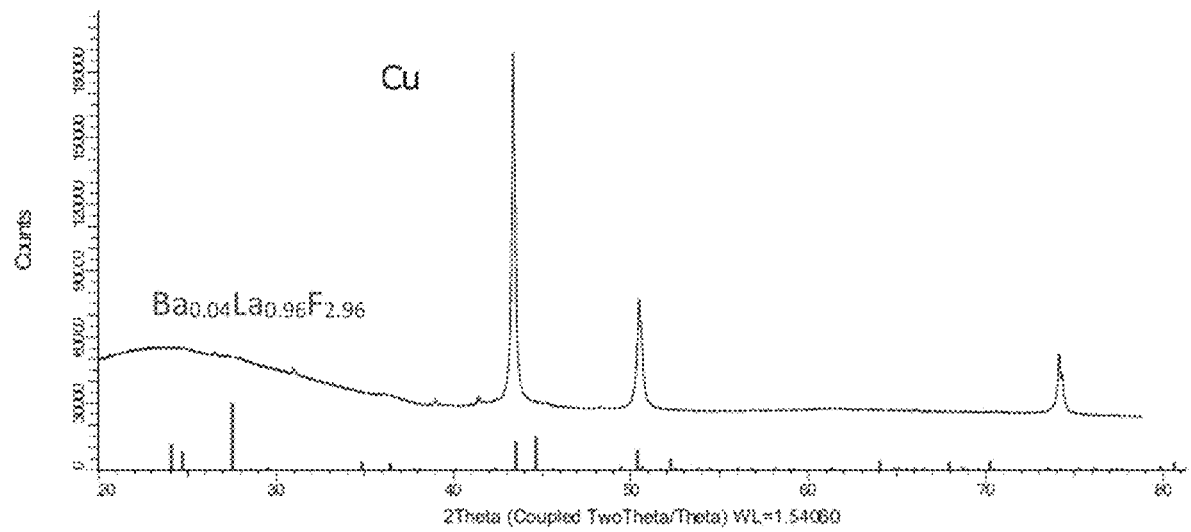
FIG. 20 shows XRD spectra of 6 nm Cu core NP with a $LaF_3$ shell after reduction of $Cu_2O$. $Cu_2O$ is reduced to Cu.

The Cu nanoparticles (NP) (6 nm) were isolated and washed once with water (20 mL). The Cu NP were re-dispersed in water (300 mL), a solution of La(NO$_3$)$_3$ 6H$_2$O (0.43 g, 1.0 mmol) in water (60 mL) was added, and the mixture was stirred (60 min.) in an argon atmosphere. The sample was isolated (12,000 rpm for 10 min) and re-dispersed in water (300 mL). To the stirring solution NaF (0.042 g, 1.0 mmol) in water (60 mL) was injected at 6 mL/min then stirred (60 min.) in an argon atmosphere. The sample was isolated via centrifuge (12,000 rpm for 10 min) and washed twice with EtOH (20 mL). XRD showed complete oxidation of the Cu core sample to Cu$_2$O with a LaF$_3$ shell. See FIG. 18. The TEM images of 6 nm Cu core NP and 6 nm Cu core NP with a LaF$_3$ shell are depicted in FIGS. 19A and 19B, respectively.

Reduction of Cu$_2$O to Cu in 6 nm Cu Core NP with a LaF$_3$ Shell.

The Cu$_2$O in the core nanoparticles was effectively reduced to Cu by a mixture of H$_2$ and N$_2$ gases under heat treatment of 300° C. for six hours. The particle size of Cu NP increased during the reduction reaction.

(ii) Cu Nanowires ("NW") Encapsulated in LaF$_3$ or Ba-Doped LaF$_3$ Shells ("Hard Shells").

Figure 21:
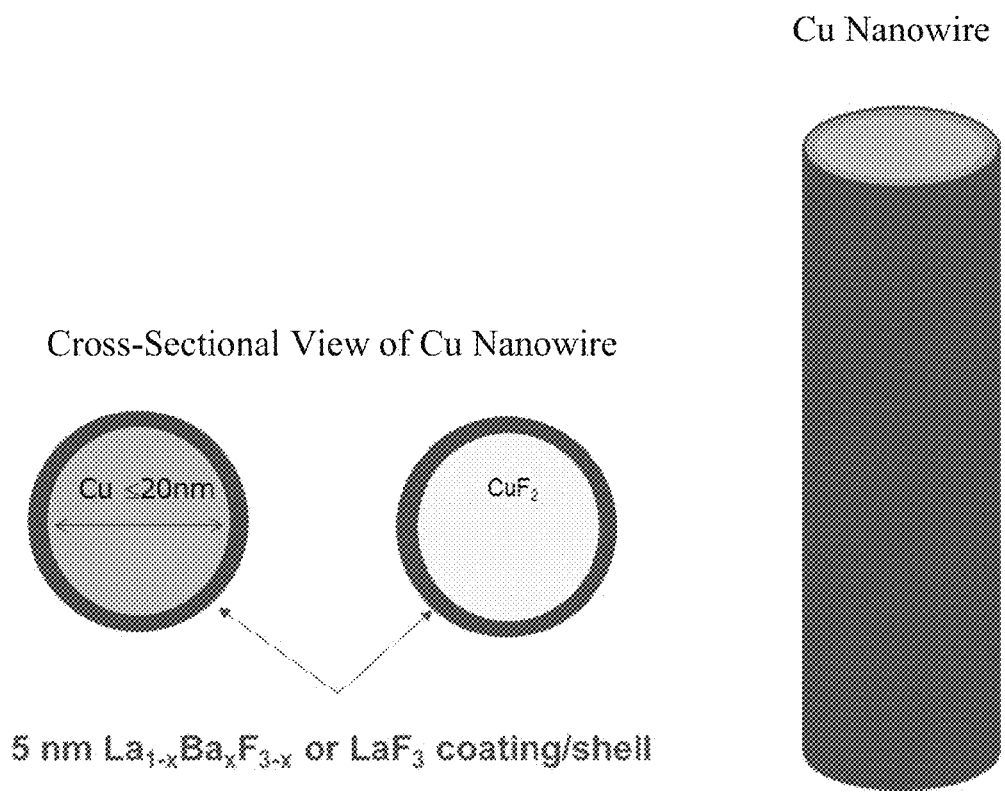
FIG. 21 illustrates the designed structure of Cu nanowires with a $La_{1-x}Ba_xF_{3-x}$ or $LaF_3$ coating and a cross-sectional view of the Cu and fluorinated Cu nanowires.

The structural design of Cu core nanowires is illustrated in FIG. 21 where the Cu nanowires have a cross-sectional diameter no more than 20 nm and a LaF$_3$ or La$_{1-x}$Ba$_x$F$_{3-x}$, coating. In FIG. 21, the cross-sectional diameter of Cu core in the nanowire is no more than 20 nm and the thickness of a La$_{1-x}$Ba$_x$F$_{3-x}$ or LaF$_3$ shell/coating is about 5 nm.

Two Phase Shell Formation on Cu Nanowires

About 20 mg of Cu nanowires were dispersed in 50 ml toluene. A first portion of tetrabutylammonium bromide (0.322 g, 1.0 mmol) was added into the Cu nanowires toluene suspension. A solution of La(NO$_3$)$_3$ 6H$_2$O (0.866 g, 2.0 mmol) in water (50 mL) was injected at 5 mL/min into the toluene suspension. This mixture was stirred very rapidly for 2 hours. The water layer was removed via a separatory funnel and a second portion of tetrabutylammonium bromide (0.322 g, 1.0 mmol) was added to the toluene layer. A solution of NaF (0.084 g, 2.0 mmol) in water (50 mL) was injected at 5 mL/min into the stirring toluene suspension. This mixture was stirred very rapidly for an additional 2 hours. The water layer was removed via separatory funnel and ethanol (20 mL) was added to distribute the product. The product was isolated via centrifuge (12,000 rpm for 10 min) then washed twice with EtOH (20 mL).

As described above, the two phase shell formation method can be applied to nanowires. However, the applications of the same coating method is not limited to nanowires. Even further the core material is not limited to copper.

Figure 23A:
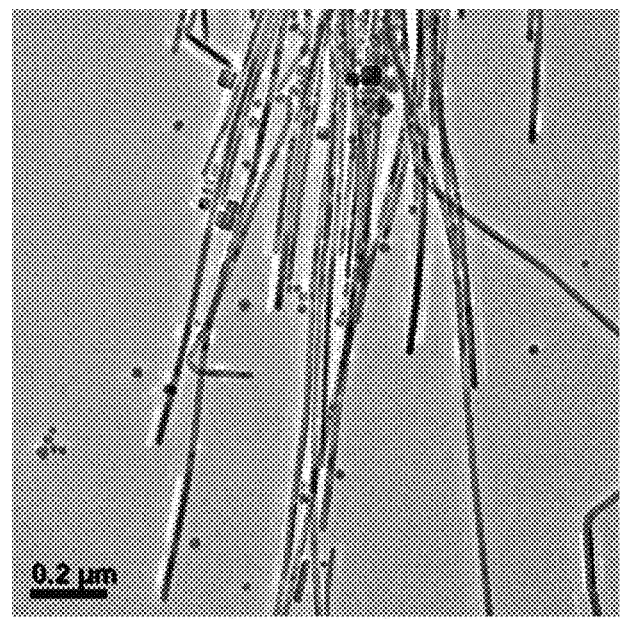
FIG. 23A and FIG. 23B show TEM images of Cu nanowires (without a $La_{1-x}Ba_xF_{3-x}$ or $LaF_3$ coating) having a cross-sectional diameter of about 20 nm.
Figure 23B:
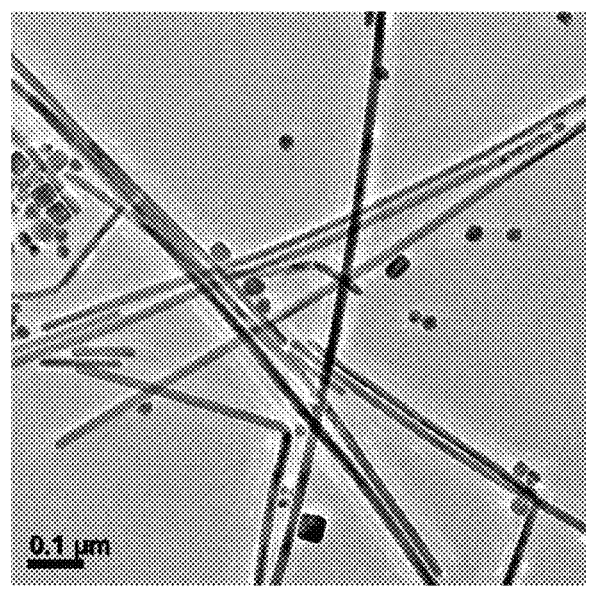
Figure 24:
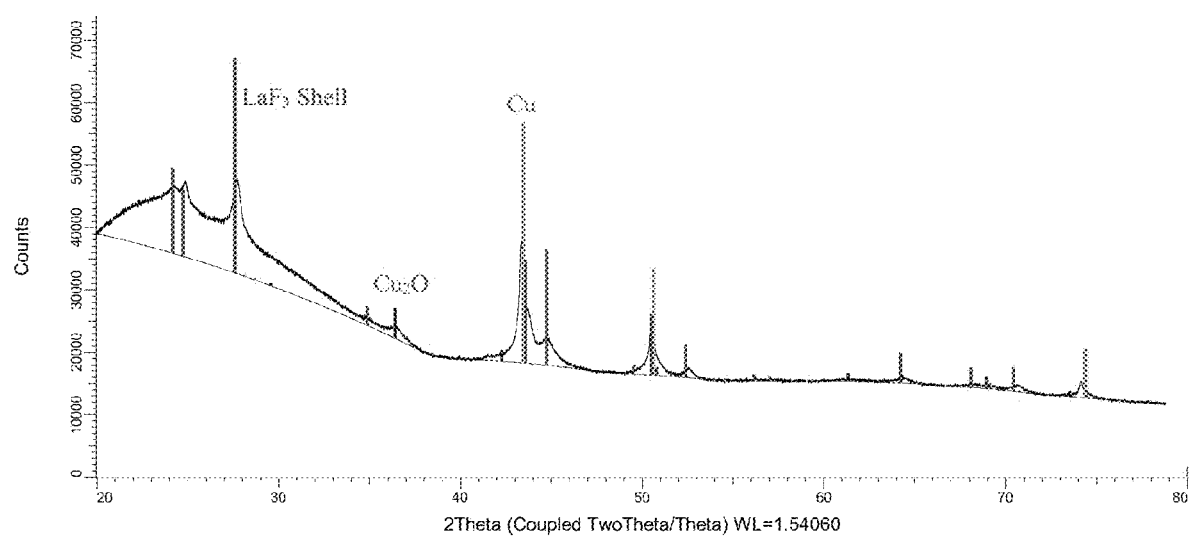
FIG. 24 shows the XRD spectra of Cu nanowires (with a diameter about or less than 20 nm), small amount of $Cu_2O$ after shell formation, and $LaF_3$ shell of Cu nanowires, according to some aspects of the present disclosure.
Figure 25A:
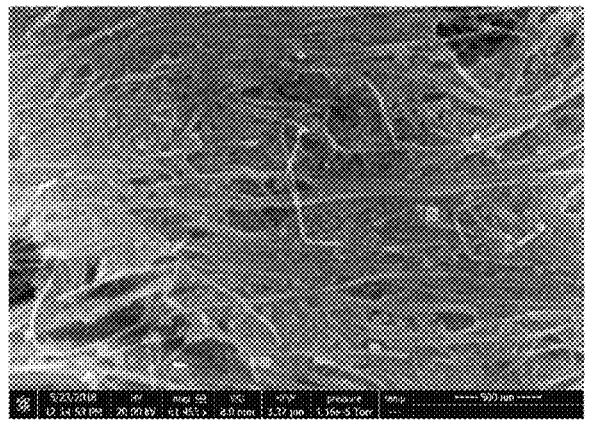
FIG. 25A shows a SEM image of Cu nanowires after initial synthesis and before the two phase shell formation, according to some aspects of the present disclosure.
Figure 25B:
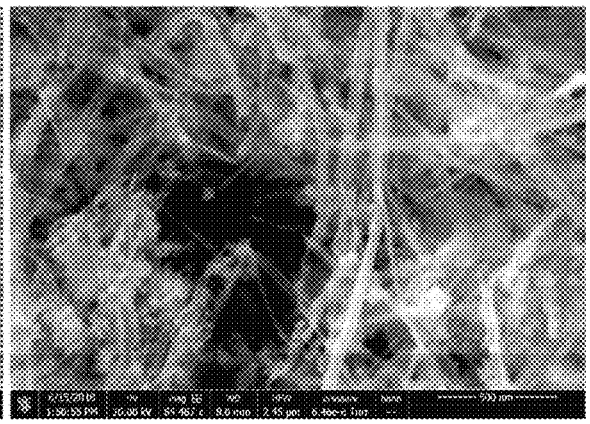
FIG. 25B shows a SEM image of two phase $LaF_3$ shell formation on Cu nanowires, according to some aspects of the present disclosure.
Figure 26A:
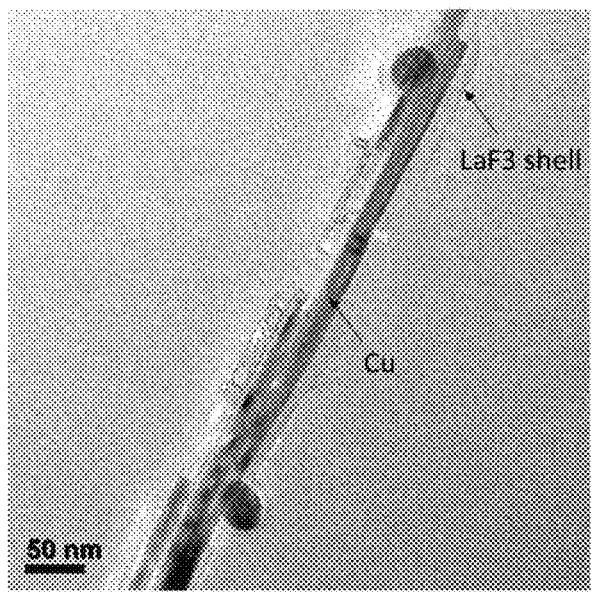
FIGS. 26A, 26B, and 26C show TEM images of $LaF_3$ formation on/around Cu nanowires under different magnifications/resolutions, according to some aspects of the present disclosure.
Figure 26B:
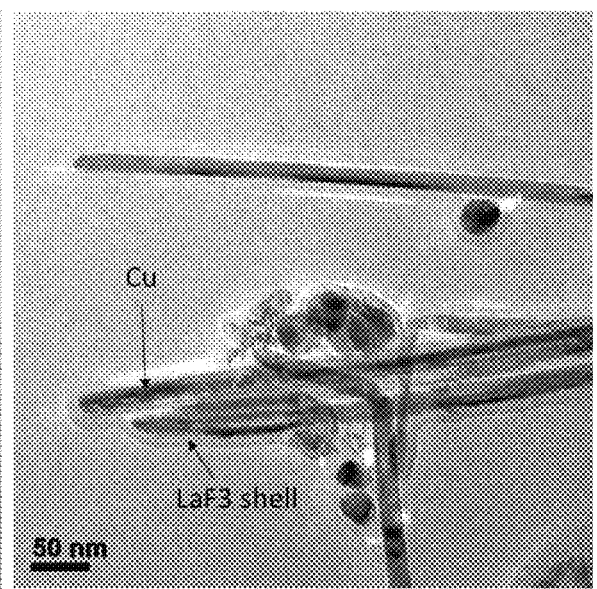
Figure 26C:
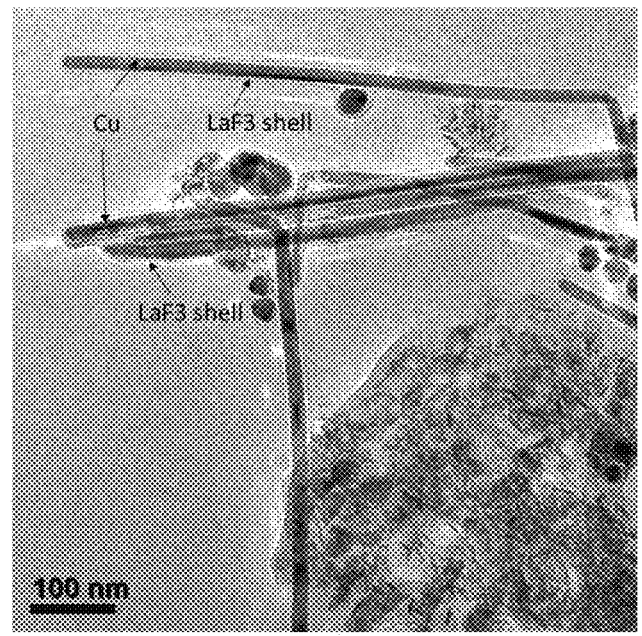

TEM images of Cu nanowires without shell are shown in FIG. 23A and FIG. 23B. The XRD spectra of Cu nanowires, a small amount of Cu$_2$O after shell formation, and the LaF$_3$ shell of Cu nanowires are depicted in FIG. 24. FIGS. 25A and 25B delineate SEM images of Cu nanowires prior to and after two phase LaF$_3$ shell formation, respectively. TEM images with different magnifications in FIGS. 26A, 26B, and 26C show the formation of LaF$_3$ shells around Cu nanowires. In the images, the grey areas surrounding the Cu nanowires are the LaF$_3$ shells.

Figure 27:
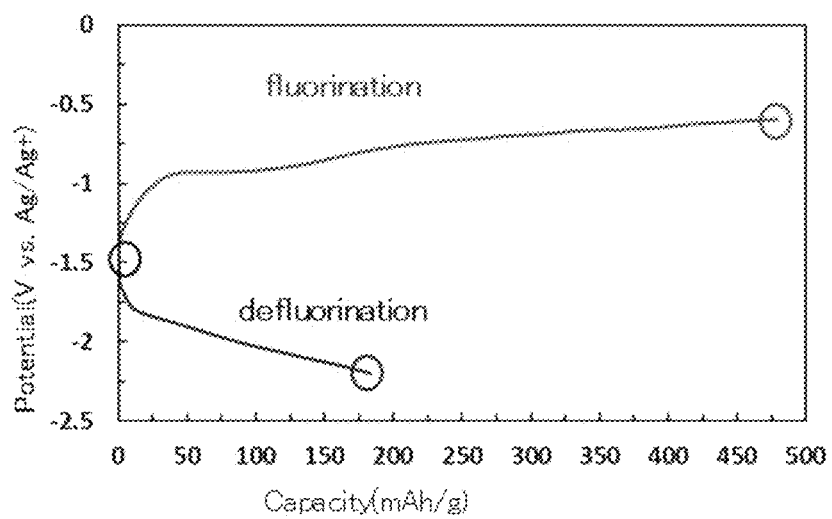
FIG. 27 shows the voltage profile of the charge-discharge cycle of an electrode made of Cu nanowires encapsulated in $LaF_3$ shells (CuNW@$LaF_3$), according to some aspects of the present disclosure.
Figure 35:
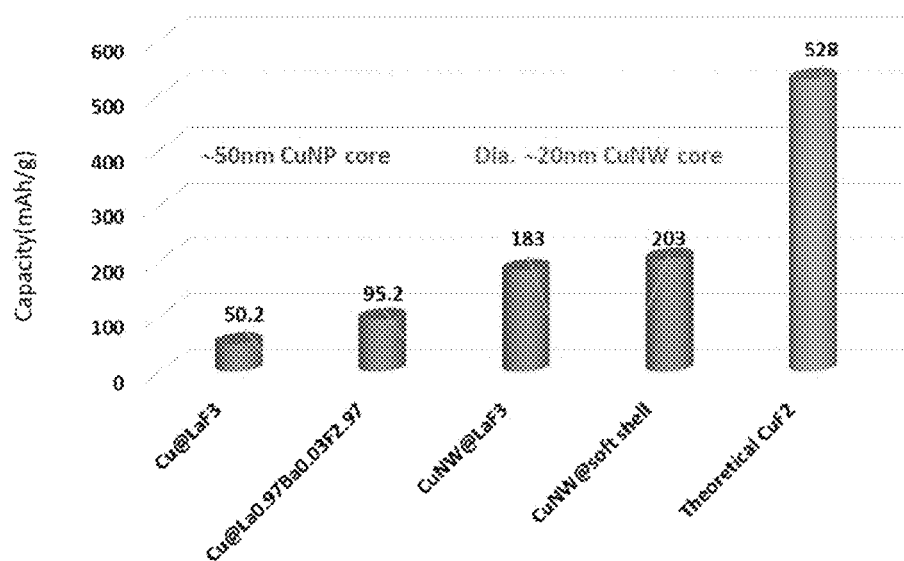
FIG. 35 shows a comparison of the capacity achieved for about 50 nm CuNP@$LaF_3$, about 50 nm CuNP@$La_{0.97}Ba_{0.03}F_{2.97}$, about 20 nm dia. CuNW@$LaF_3$, about 20 nm dia. CuNW@soft shell, and the theoretical capacity of $CuF_2$, according to some aspects of the present disclosure.
Figure 36:
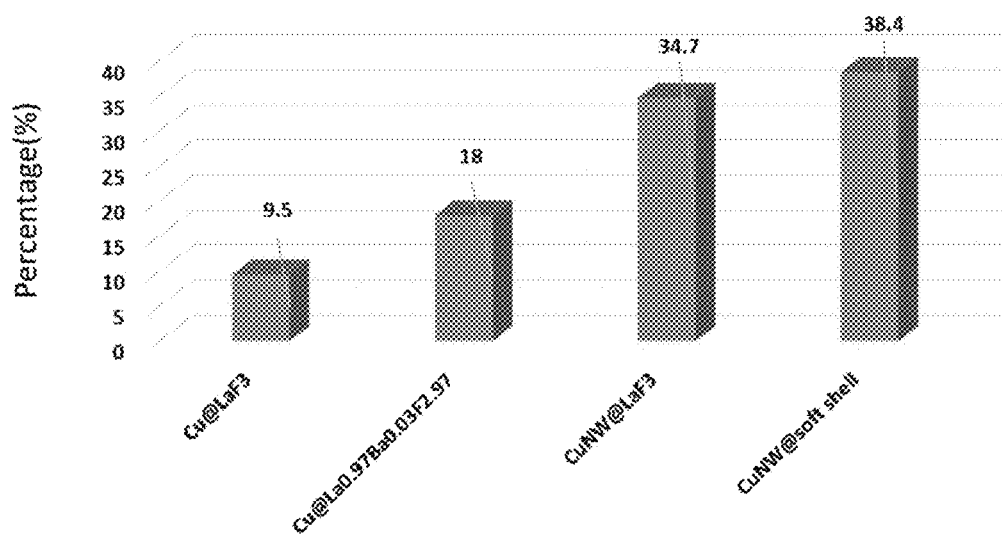
FIG. 36 demonstrates percentage capacity achieved for about 50 nm CuNP@$LaF_3$, about 50 nm CuNP@$La_{0.97}Ba_{0.03}F_{2.97}$, and about 20 nm dia. CuNW@$LaF_3$, about 20 nm dia. CuNW@soft shell, which are normalized by the theoretical capacity of $CuF_2$ (528 mAh/g).

FIG. 27 shows the voltage profile of the charge-discharge cycle of an electrode made of Cu nanowires encapsulated in LaF$_3$ shells (CuNW@LaF$_3$) compared to the Ag/Ag$^+$ reference electrode. FIG. 35 illustrates the capacity delivery of an electrode made of CuNW encapsulated in LaF$_3$ shells reaches 183 mAh/g compared to 95.2 mAh/g for Cu@La$_{1-x}$Ba$_x$F$_{3-x}$ and 50.2 mAh/g for Cu@LaF$_3$, respectively. Thus, the electrode made of Cu nanowires encapsulated in LaF$_3$ shells nearly doubles the capacity of Cu@La$_{1-x}$Ba$_x$F$_{3-x}$ and nearly has four times the capacity of Cu@LaF$_3$. Without wishing to be bound to any particular theory, it is believed that the amount of CuF$_2$ formation directly determines the capacity of the battery. The more CuF$_2$ that is formed, the higher the capacity of the battery can be achieved. Therefore, the utilization of Cu can be significantly increased by Cu nanowires coupled with LaF$_3$ encapsulation. In one embodiment, CuNW@LaF$_3$ can reach about 35% of theoretical capacity of CuF$_2$, whereas Cu@La$_{1-x}$Ba$_x$F$_{3-x}$ and Cu@LaF$_3$ can reach about 18% and 9.5% of the theoretical capacity of CuF$_2$, respectively (FIG. 36).

Figure 28:
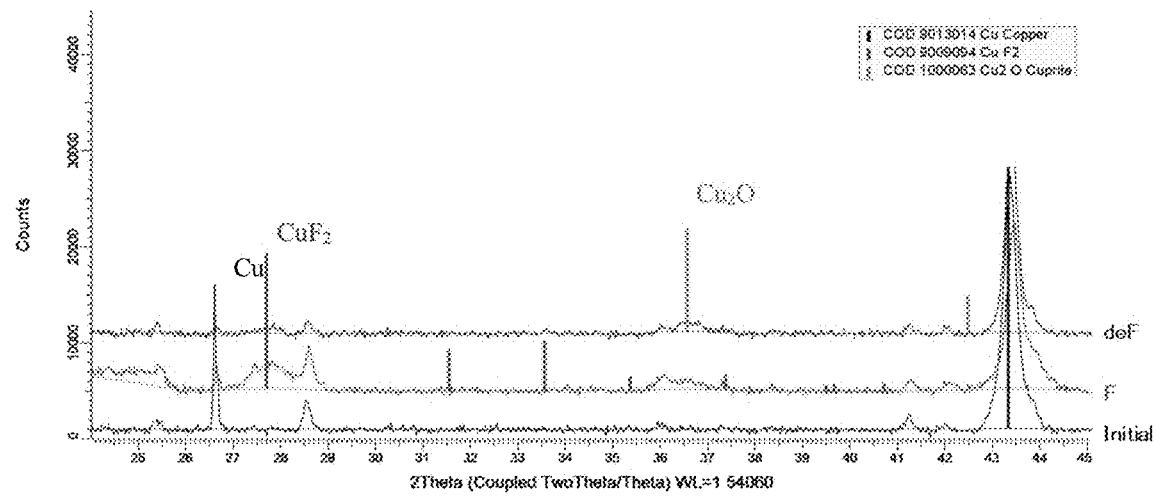
FIG. 28 shows the XRD spectra of CuNW@$LaF_3$ in initial condition, after a charge (fluorination, 'F'), and a subsequent discharge (defluorination, 'deF'), according to some aspects of the present disclosure.

FIG. 28 shows the XRD spectra of CuNW@LaF$_3$ in initial condition, i.e., in an electrode before a use, and then after a charge (fluorination) and a subsequent discharge (defluorination), respectively. CuF$_2$ can be formed after charge and then reduced to Cu after discharge. FIG. 28 indicates that Cu in the form of nanowires coupled with LaF$_3$ shells can be cycled in liquid electrolytes.

(iii) Cu Nanotubes.

Figure 31:
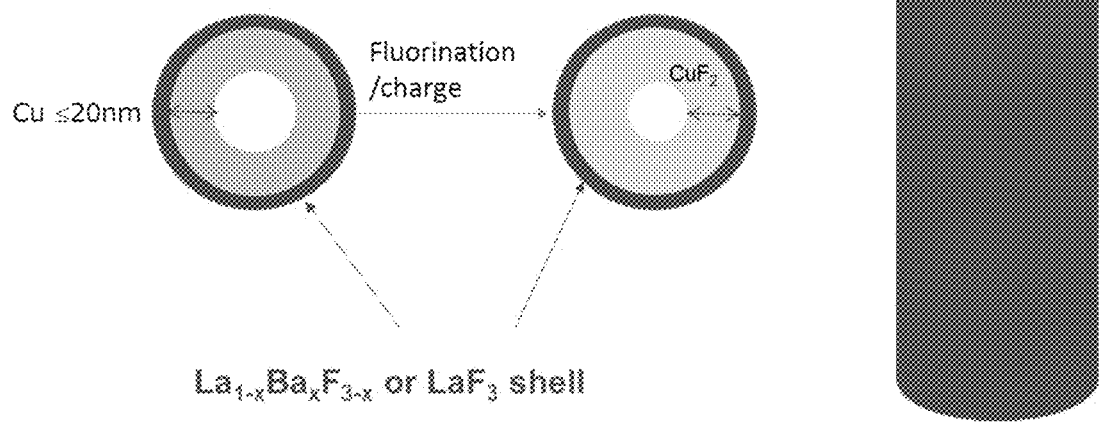
FIG. 31 illustrates the designed structure of Cu nanotubes with a $La_{1-x}Ba_xF_{3-x}$ or $LaF_3$ coating and a cross-sectional view of the Cu and fluorinated Cu nanotubes.

The structural design of Cu nanotubes is illustrated in FIG. 31 where the Cu nanotubes have a Cu inner wall with a cross-sectional thickness of no more than 20 nm and a La$_{1-x}$Ba$_x$F$_{3-x}$ coating layer. In FIG. 31, the cross-sectional thickness of Cu inner wall of nanotubes is no more than 20 nm.

(iv) Cu Nanoflakes and Nanosheets with a Thickness No More Than 20 nm.

Figure 32:
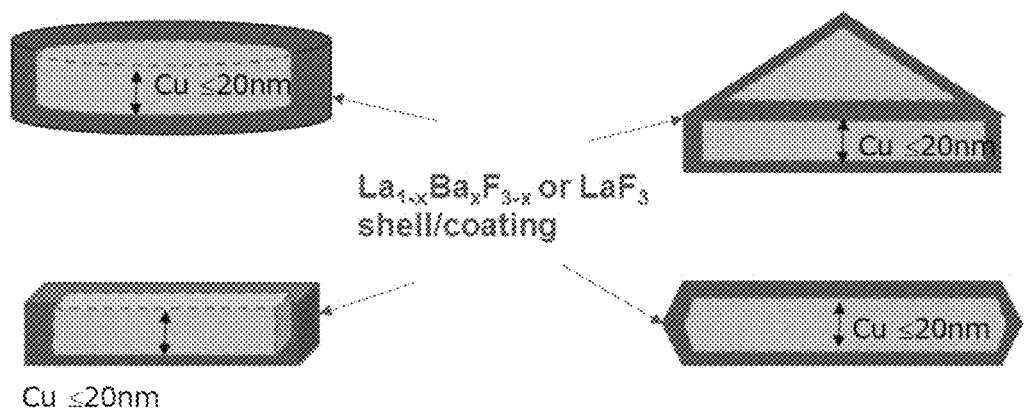
FIG. 32 illustrates the designed structure of Cu nanoflakes and Cu nanosheets with a $La_{1-x}Ba_xF_{3-x}$ or $LaF_3$ coating. The minimum thickness of these structures is no more than 20 nm.

Cu flakes may take many shapes, such as triangle, rectangle, square, circle, oval etc. The structure of Cu nanoflakes is illustrated in FIG. 32 where the Cu nanoflakes have a minimum thickness of no more than 20 nm and a LaF$_3$ or La$_{1-x}$Ba$_x$F$_{3-x}$ coating. In FIG. 32, at least along one direction or one axis, the thickness of the Cu nanoflakes is no more than 20 nm. The structural design of Cu nanosheets is also illustrated in FIG. 32 where the shortest direction of the Cu nanosheets has a thickness no more than 20 nm.

(v) Cu Nanoframes.

Figure 33:
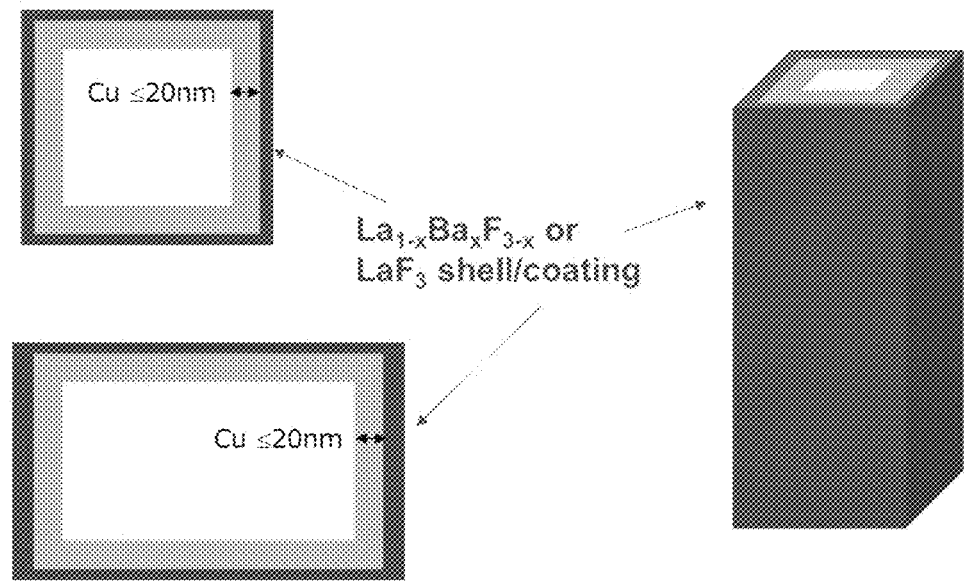
FIG. 33 illustrates the designed structure of hollow Cu nanoframes with a $La_{1-x}Ba_xF_{3-x}$ or $LaF_3$ coating. An inner copper wall within the Cu nanoframe has a thickness no more than 20 nm.

The structural design of hollow Cu nanoframes is illustrated in FIG. 33 where the Cu nanoframes have an inner layer of Cu with a thickness no more than 20 nm. In FIG. 33, the inner copper wall within the Cu nanoframe has a thickness no more than 20 nm.

In the present disclosure, the metal nanostructures suitable for making a cathodic electrode are not limited to copper. As shown in FIG. 1B, transition metals and any salts thereof can be used to prepare the nanostructures encapsulated in various coating layers as disclosed in the previous section. Suitable transition metal comprises metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

Figure 37A:
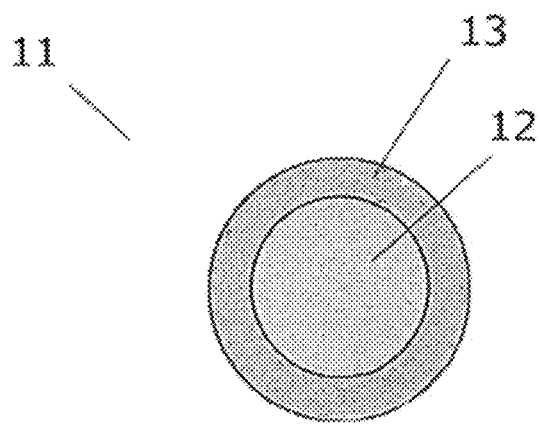
FIG. 37A shows an example electrochemically active structure according to some aspects of the present disclosure.

Example 3, Electrochemically Active Structure Encapsulated in Self-Assembed Shell ("Soft Shell"). FIG. 37A shows an example electrochemically active structure 11 according to aspects of the present disclosure. As shown in FIG. 37A, the electrochemically active structure 11 may comprise a core 12 as described herein and a monolayer 13 comprising a shell material as described herein. According to some aspects, the monolayer 13 may be, for example, a self-assembled monolayer (SAM) comprising a surfactant as described herein. It should be understood that in this example, monolayer 13 corresponds to the shell as described herein.

Figure 37B:
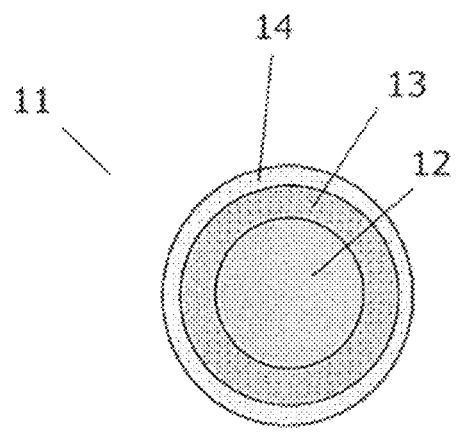
FIG. 37B shows an example electrochemically active structure according to various aspects of the present disclosure.

FIG. 37B shows an example electrochemically active structure 11 comprising a core 12 as described herein and a monolayer 13 comprising a shell material as described herein. FIG. 37B also shows a second monolayer 14 covering at least a portion of the first monolayer 13. The second monolayer 14 may also be a SAM that is either the same or different from the first monolayer 13. It should be understood that in this example, the first monolayer 13 and the second monolayer 14 may together correspond to the shell as described herein. Furthermore, the first and second monolayers can be self-assembled.

Figure 37C:
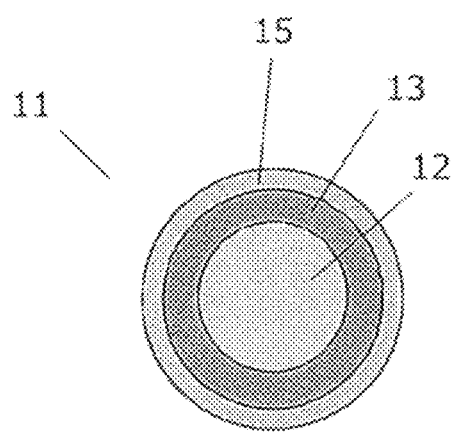
FIG. 37C shows an example electrochemically active structure according to aspects of the present disclosure.

FIG. 37C shows an example electrochemically active structure 11 comprising a core 12 as described herein and a monolayer 13 comprising a shell material as described herein. FIG. 37C also shows a polymer layer 15 covering at least a portion of the monolayer 13. The polymer layer 15 may comprise any of the polymers as described herein. It should be understood that in this example, the monolayer 13 and the polymer layer 15 may together correspond to the shell as described herein.

It should be understood that while FIGS. 37A-C show certain example shell configurations, the electrochemically active structure may comprise a shell having a different configuration. For example, the shell may comprise more than two SAMs and/or more than one polymer layer, wherein the position of the SAMs and/or polymer layer are in any arrangement with respect to each other.

Figure 38:
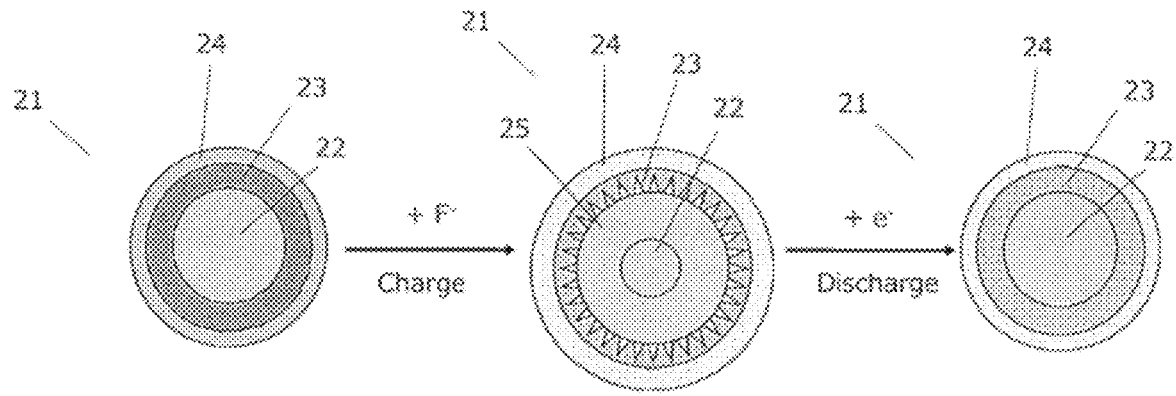
FIG. 38 shows an example schematic of charging and discharging an electrochemically active structure according to aspects of the present disclosure.

According to some aspects, the shell may be configured to accommodate the volume change of the electrochemically active material between charged and discharged states. For example, FIG. 38 shows an example schematic of charging and discharging an electrochemically active structure 21 as described herein. As shown in FIG. 38, the electrochemically active structure 21 may comprise a core 22 and a shell comprising a SAM 23 and a polymer layer 24 as described herein. The core may comprise any core as described herein, for example, a Cu core. FIG. 38 shows a schematic of charging the electrochemically active structure 21, e.g., when $F^-$ ions travel to a cathode comprising the electrochemically active structure 21. As shown in FIG. 38, $F^-$ ions are able to traverse the shell to the core 22 such that at least a portion of the Cu core 22 is converted to $CuF_2$ 25. As the Cu in the Cu core 22 is converted to $CuF_2$ 25, the volume of the core may expand. Without wishing to be bound by theory, as the volume of the core expands, SAM 23 may defect or crack, thereby accommodating the change in volume. As shown in FIG. 38, as the electrochemically active structure 21 is discharged, the $CuF_2$ 25 may be reduced back to Cu 22, and the volume of the core may contract. As the volume contracts, the SAM 23 may self-assemble or "self-heal" to its original configuration.

For example, Cu nanowires can be encapsulated in surfactant soft shells. The soft shells can comprise at least one organic surfactant. Examples of suitable surfactants include oleylamine, oleic acid, tris(trimethylsilyl)silane, 3, 3, 4, 4, 5, 5, 6, 6, 7, 7, 8, 8, 9, 9, 10, 10, 10-heptadecafluoro decanethiol, 2-(trifluoromethoxy)-benzenethiol, P-[12-(2, 3, 4, 5, 6-pentafluoro phenoxy) dodecyl]-Phosphonic acid, P-(3, 3, 4, 4, 5, 5, 6, 6, 7, 7, 8, 8, 9, 9, 10, 10, 10-heptadecafluoro decyl)-Phosphonic acid, pentafluorobenzylphosphonic acid, perfluoro dodecanoic acid and combinations thereof. More specifically, the suitable surfactants are selected from oleylamine, oleic acid, tris(trimethylsilyl) silane, or a combination thereof. The structure of CuNW@soft shell is similar as that of FIG. 21, except that the shell layer is made of surfactants.

According to some aspects, the surfactant soft shells can comprise organic or organic molecule-containing polymers, forming polymer shells; the structure of CuNW@soft shell comprising polymers is similar to that of FIG. 37A, except that the surfactant soft shell 13 comprises one or more polymers. The structure of CuNW@soft shell with polymer shells is also similar to that of FIGS. 37B, 37C, and 38 except that a CuNW is at the core, the shell layer is made of surfactants, while the polymer layer may comprise any of the polymers as described herein. According to some aspects, FIG. 37C can represent a cross-section of a CuNW, and the monolayer 13 and the polymer layer 15 may together correspond to the shell as described herein. According to some aspects in FIG. 37C, the monolayer 13 and the polymer layer 15 may correspond to a surfactant shell and a polymer shell, respectfully. It should be understood that while FIG. 37C shows certain example shell configurations as described for CuNW, the shell may comprise a different configuration. For example, the shell may comprise a surfactant shell and a polymer shell in different arrangements. For example, the shell may comprise more than one surfactant shell and more than one polymer shell, wherein the position of the surfactant shell and the polymer shell are in any arrangement with respect to each other.

For example, a solution of $CuCl_2$ $2H_2O$ (85 mg, 0.5 mmol) in oleylamine (5 g, 18.7 mmol) and oleic acid (0.1 g, 0.354 mmol) was sonicated in a glass vial until completely dissolved. Tris(trimethylsilyl)silane (0.5 g, 2.0 mmol) was added, and the mixture was heated up to 120° C. until the dark blue solution turned clear yellow. The mixture was heated further to 165° C. for 18 h. Cu nanowires were formed. The Cu nanowires were isolated via centrifuge (12,000 rpm for 10 min.) and washed three times with toluene (10 mL). The XRD spectrum and TEM images of the Cu nanowires produced in this example are illustrated in FIG. 22, FIG. 23A, and FIG. 23B, respectively.

About 20 mg of Cu nanowires were re-dispersed in 50 ml toluene. A first portion of tetrabutylammonium bromide (0.322 g, 1.0 mmol) was added into the Cu nanowires toluene suspension. A solution of $La(NO_3)_3$ $6H_2O$ (0.866 g, 2.0 mmol) in water (50 mL) was injected at 5 mL/min into the toluene suspension. This mixture was stirred very rapidly for 2 hours. The water layer was removed via a separatory funnel and a second portion of tetrabutylammonium bromide (0.322 g, 1.0 mmol) was added to the toluene layer. A solution of NaF (0.084 g, 2.0 mmol) in water (50 mL) was injected at 5 mL/min into the stirring toluene suspension. This mixture was stirred very rapidly for additional 2 hours. The water layer was removed via separatory funnel and ethanol (20 mL) was added to distribute the product. The product was isolated via centrifuge (12,000 rpm for 10 min) then washed twice with EtOH (20 mL).

Figure 22:
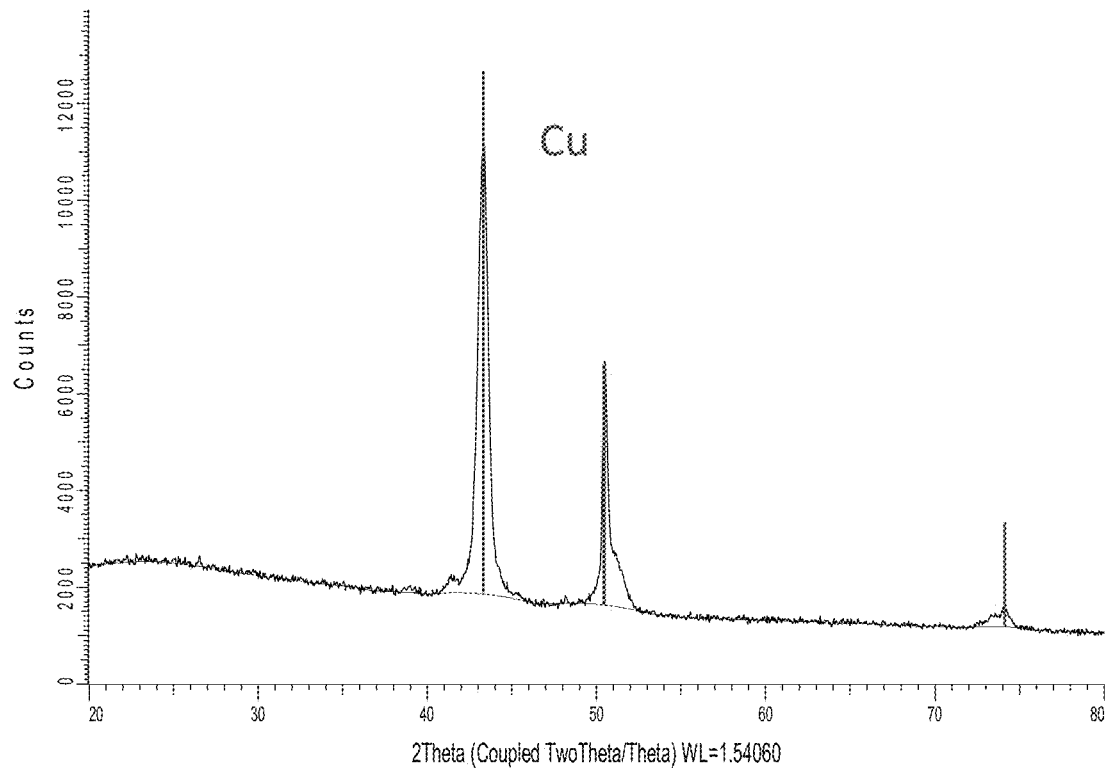
FIG. 22 shows a pXRD spectrum of Cu nanowires (without a $La_{1-x}Ba_xF_{3-x}$ or $LaF_3$ coating) having a cross-sectional diameter of about or less than 20 nm, according to some aspects of the present disclosure.

The XRD spectra of Cu nanowires, a small amount of $Cu_2O$ after shell formation, and the $LaF_3$ shell of Cu nanowires are depicted in FIG. 22 and FIG. 24, respectively. FIGS. 25A and 25B delineate SEM images of Cu nanowires prior to and after two phase $LaF_3$ shell formation, respectively. TEM images with different magnifications in FIGS. 26A, 26B, and 26C show the formation of $LaF_3$ shells around Cu nanowires. In the images, the grey areas surrounding the Cu nanowires are the $LaF_3$ shells.

The $LaF_3$ shell can comprise Ba-doping. FIG. 47 and FIG. 48 demonstrate the capacity improvement achieved upon Ba-doping according to some aspects of the present disclosure. FIG. 47 shows the voltage profile of the first charge-discharge cycle of a $Cu@LaF_3$ electrode or a $Cu@Ba_xLa_{1-x}F_{3-x}$ electrode, compared to the $Ag/Ag^+$ reference electrode. The capacity delivery of the Ba-doped electrode reaches 95.2 mAh/g compared to only 50.2 mAh/g for $Cu@LaF_3$ (FIG. 48). Thus, Ba-doping of the $LaF_3$ shell nearly doubles the capacity. With Ba doping, the ionic conductivity of the LaF$_3$ shell is improved (see FIG. 48). With Ba doping, fluoride ion can more readily travel thorugh the shell to react with Cu to form CuF$_2$, and the amount of CuF$_2$ formation directly determines the capacity of the battery. The more CuF$_2$ that is formed, the higher the capacity of the battery. Therefore, the utilization of Cu can be nearly doubled by Ba-doping of the LaF$_3$ shell.

FIG. 28 shows the XRD spectra of CuNW@LaF$_3$ in initial condition, i.e., in an electrode before a use, and then after a charge (fluorination) and a subsequent discharge (defluorination), respectively. CuF$_2$ can be formed after charge and then reduced to Cu after discharge. The data in FIG. 28 indicates that Cu in the form of nanowires coupled with LaF$_3$ shells can be reversibly cycled in liquid electrolytes.

Figure 29:
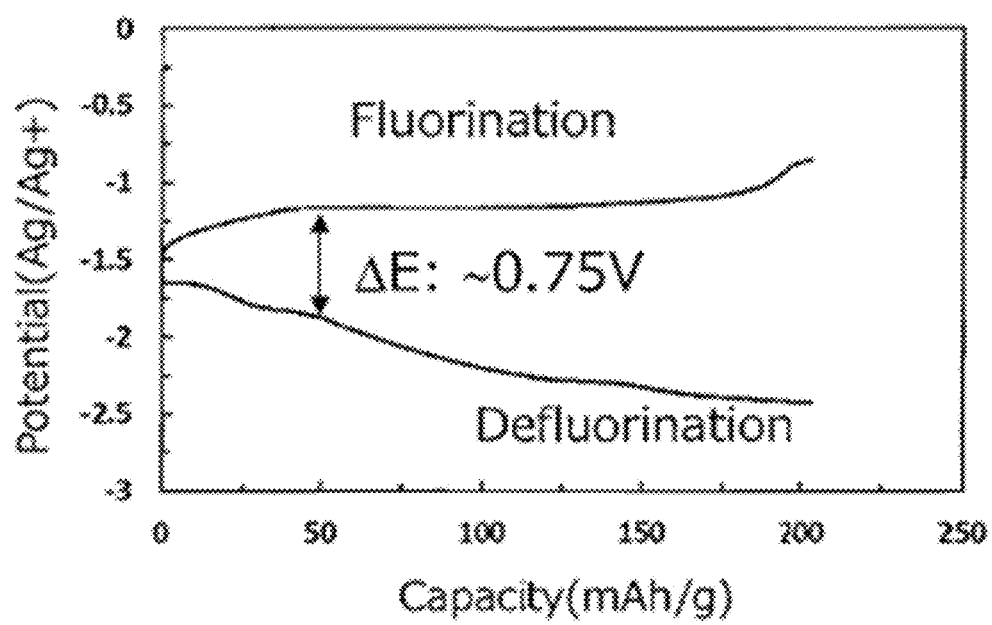
FIG. 29 shows the voltage profile of the charge-discharge cycle of an electrode made of Cu nanowires (with an average diameter about or less than 20 nm) encapsulated in soft shells (surfactant shells), according to some aspects of the present disclosure.
Figure 30:
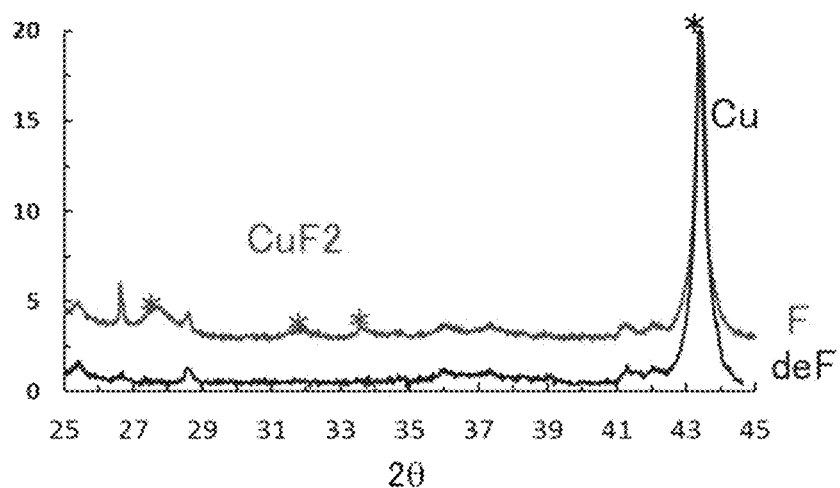
FIG. 30 shows the XRD spectra of CuNW@soft shell (surfactant shell) after a charge (fluorination) and after a subsequent discharge (defluorination), according to some aspects of the present disclosure. The Cu nanowires measured in FIG. 30 have an average diameter about or less than 20 nm.
Figure 46:
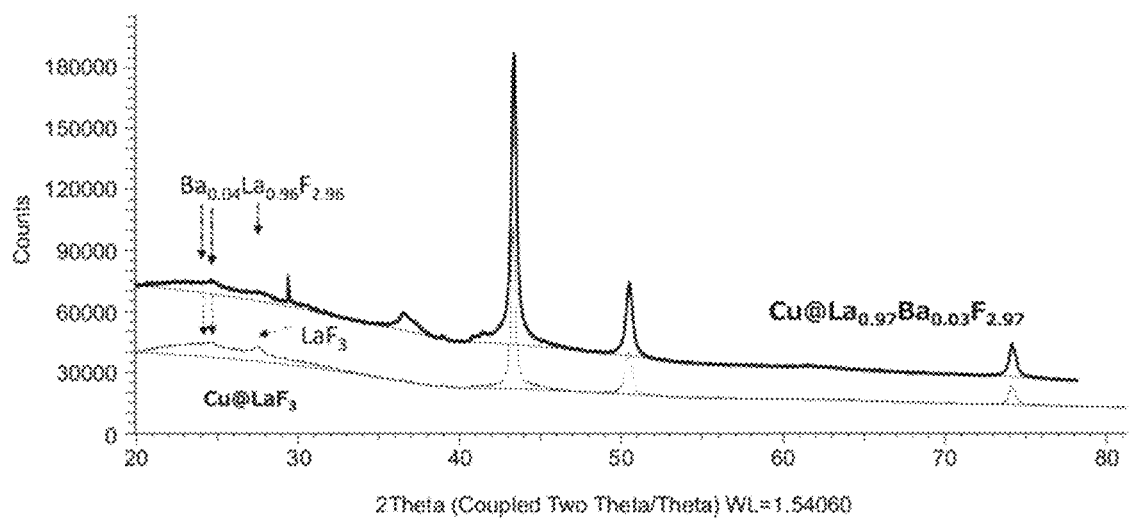
FIG. 46 shows XRD spectra for Cu@$LaF_3$ and Cu@$La_{0.97}Ba_{0.03}F_{2.97}$ according to some aspects of the present disclosure.

A cathodic electrode was prepared using a CuNW@soft shell nanomaterial. The average cross-sectional diameter of the CuNW core is about 20 nm. The voltage profile of the charge-discharge cycle of the CuNW@soft shell electrode is shown in FIG. 29. The Ag/Ag$^+$ electrode was used as the reference in the experiment. According to FIG. 29, the capacity of 20 nm CuNW@soft shell cathode may reach above 200 mAh/g. The CuNW@soft shell electrode was further characterized by XRD, and the experimental results are illustrated in FIG. 30. FIG. 30 shows the XRD spectra of CuNW@soft shell after a charge (fluorination) and after a subsequent discharge (defluorination), respectively. CuF$_2$ can be formed after charge and then reduced to Cu after discharge. XPS spectral data for a core@shell nanoparticle comprising Cu (64.83%), La (14.68%), Ba (0.28%), F (20.21%), where the shell itself comprises La (41.75%), Ba (0.79%), F (57.46%), confirm that the nanoparticles are Cu@La$_{0.97}$Ba$_{0.03}$F$_{2.97}$. XRD spectra of Cu@LaF$_3$ and Cu@La$_{0.97}$Ba$_{0.03}$F$_{2.97}$ are shown in FIG. 46.

Example 4. Comparison of Cathodes Made of Cu Nanostructures. A series of cathodes having Cu nanostructures for F-shuttle batteries had been prepared. The Cu nanostructures used in the preparation of cathodes are CuNP@LaF$_3$ with a core having an average diameter about 50 nm, CuNP@La$_{0.97}$Ba$_{0.03}$F$_{2.97}$ with a core having an average diameter about 50 nm, CuNW@LaF$_3$ with a core having an average cross-sectional diameter about 20 nm, and CuNW@soft shells with a core having an average cross-sectional diameter about 20 nm.

Figure 34:
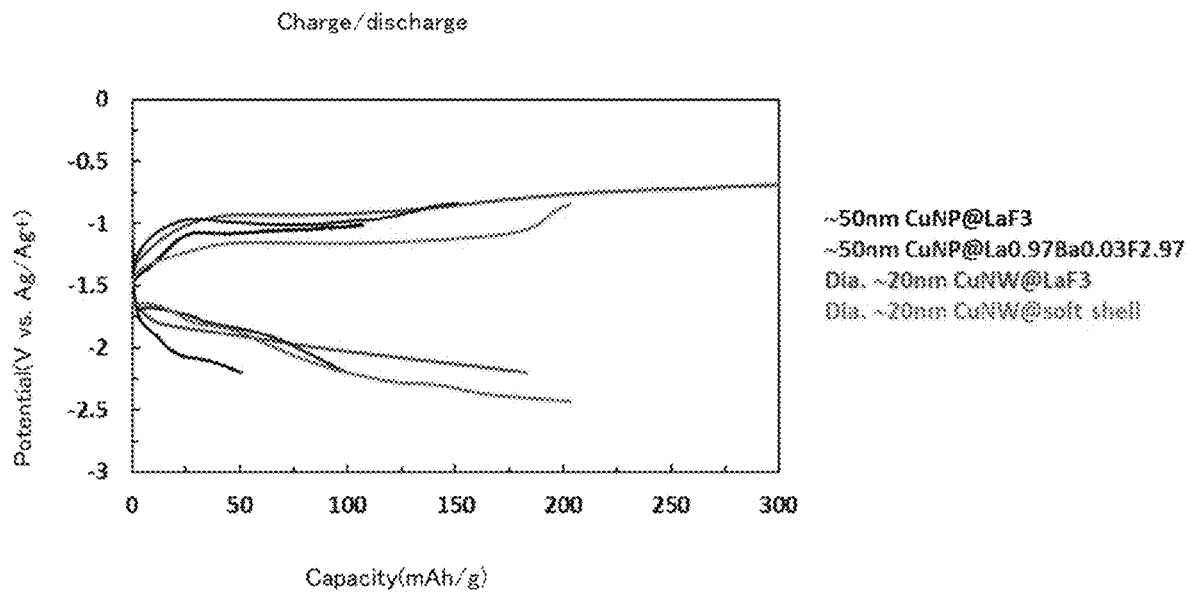
FIG. 34 depicts a comparison of the voltage profiles of the charge-discharge cycles of a variety electrodes. The electrodes in the figure are made of about 50 nm CuNP@$LaF_3$, about 50 nm CuNP@$La_{0.97}Ba_{0.03}F_{2.97}$, about 20 nm dia. CuNW@$LaF_3$, and about 20 nm dia. CuNW@soft shell, respectively.

FIG. 34 illustrates the voltage profiles of the charge-discharge cycles of a variety electrodes, which include about 50 nm CuNP@LaF$_3$, about 50 nm CuNP@La$_{0.97}$Ba$_{0.03}$F$_{2.97}$, about 20 nm CuNW@LaF$_3$, and about 20 nm CuNW@soft shell, respectively. The Ag/Ag$^+$ electrode was used as the reference in the experiment. In FIG. 34, capacities of 20 nm Cu nanowires encapsulated in either LaF$_3$ shells or in surfactant soft shells are clearly higher than 50 nm Cu nanoparticles encapsulated in either LaF$_3$ or La$_{0.97}$Ba$_{0.03}$F$_{2.97}$ shells.

As shown in FIG. 35, the capacities of electrodes made of 50 nm CuNP@LaF$_3$, 50 nm CuNP@La$_{0.97}$Ba$_{0.03}$F$_{2.97}$, 20 nm CuNW@LaF$_3$, and 20 nm CuNW@soft shell are 50.2, 95.2, 183, and 203 mAh/g, respectively. Thus, the electrodes made of Cu nanowires encapsulated in LaF$_3$ shells or soft shells nearly double the capacity of CuNP@La$_{0.97}$Ba$_{0.03}$F$_{2.97}$ and nearly has four times the capacity of CuNP@LaF$_3$. As a comparison, the theoretical capacity of electrode made of CuF$_2$ is about 528 mAh/g.

The capacity delivery of cathodes in FIG. 35 is normalized against the theoretical capacity of CuF$_2$ to obtain percentile capacity of each electrode. The percentile capacities of all the tested electrodes are illustrated in FIG. 36. FIG. 36 indicates that capacities of electrodes made of 20 nm Cu nanowires encapsulated in LaF$_3$ shells and surfactant soft shells can reach 34.7% and 38.4% of theoretical capacity of CuF$_2$, respectively.

What is claimed is:

1. A fluoride ion battery comprising:
   an anode containing an alkali earth metal, a rare earth metal, or a combination thereof, and having an outer solid electrolyte interphase layer;
   a cathode comprising a cathode core containing a transition metal, a lanthanide, an actinide, or a combination thereof and a fluoride-containing shell at least partially surrounding the cathode core, wherein the fluoride-containing shell comprises a first metal and a second metal, and the first metal is barium; and
   a liquid electrolyte comprising fluoride ions between the anode and the cathode,
   wherein the outer solid electrolyte interphase layer comprises a fluoroalkyl, the fluoroalkyl comprising CF$_3$(CF$_2$)$_x$CH$_2$, wherein x is 2-5.

2. The fluoride ion battery of claim 1, wherein the liquid electrolyte comprises bis(2-methoxyethyl) ether, bis(2,2,2-trifluoroethyl) ether, N,N,N-trimethyl-N-neopentylammonium fluoride, N,N-dimethyl-N,N-dineopentylammonium fluoride, propionitrile, or a combination thereof.

3. The fluoride ion battery of claim 1, wherein the cathode core has at least one dimension less than or equal to about 25 nm.

4. The fluoride ion battery of claim 1, wherein the cathode core comprises a transition metal selected from the group consisting of copper, iron, lead, bismuth, cobalt, alloys thereof, fluorides thereof, and combinations thereof.

5. The fluoride ion battery of claim 1, wherein the alkali earth metal is calcium, and the rare earth metal is selected from cerium and lanthanum.

6. The fluoride ion battery of claim 1, wherein the outer solid electrolyte interphase layer is covalently attached to the anode, and wherein the fluoroalkyl comprises CF$_3$(CF$_2$)$_5$CH$_2$, CF$_3$(CF$_2$)$_2$CH$_2$, or a combination thereof.

7. The fluoride ion battery of claim 1, wherein the second metal is a transition metal, an alkali metal, an alkaline earth metal, a group three element, a group thirteen element, a lanthanide, an actinide, or a combination thereof.

8. The fluoride ion battery of claim 1, wherein the fluoride-containing shell contains La$_{1-x}$Ba$_x$F$_{3-x}$, wherein X=0-0.5.

9. The fluoride ion battery of claim 1, wherein the fluoride-containing shell contains La$_{1-x}$Ba$_x$F$_{3-x}$, wherein X=0.03.

10. The fluoride ion battery of claim 1, wherein fluoride-containing shell has an average thickness of no more than 5 nm.

11. A fluoride ion battery comprising:
    an anode containing an alkali earth metal, a rare earth metal, or a combination thereof, and having an outer solid electrolyte interphase layer;
    a cathode comprising a cathode core containing a transition metal, a lanthanide, an actinide, or a combination thereof and a fluoride-containing shell at least partially surrounding the cathode core, wherein the fluoride-containing shell comprises a first metal and a second metal, and the first metal is barium; and
    a liquid electrolyte comprising fluoride ions between the anode and the cathode,
    wherein the outer solid electrolyte interphase layer comprises a reaction derivative formed between a diazonium salt and a surface of the anode.

12. The fluoride ion battery of claim 11, wherein the comprises 4-tert-butylbenzene diazonium salt; 4-methoxybenzene diazonium salt; 4-(dimethylamino)benzene diazonium salt; 4-nitrobenzene diazonium salt; 4-trifluoromethylbenzene diazonium salt; or a combination thereof.

* * * * *